United States Patent
Xu

(10) Patent No.: US 12,455,684 B2
(45) Date of Patent: *Oct. 28, 2025

(54) METHOD FOR DISPLAYING A PLURALITY OF WINDOWS IN SPLIT-SCREEN MANNER, AND ELECTRONIC DEVICE

(71) Applicant: Huawei Technologies Co., Ltd., Shenzhen (CN)

(72) Inventor: Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,020

(22) Filed: Jun. 10, 2024

(65) Prior Publication Data

US 2024/0329831 A1 Oct. 3, 2024

Related U.S. Application Data

(63) Continuation of application No. 18/004,010, filed as application No. PCT/CN2021/103949 on Jul. 1, 2021, now Pat. No. 12,039,162.

(30) Foreign Application Priority Data

Jul. 3, 2020 (CN) .......................... 202010632219.9

(51) Int. Cl.
*G06F 3/041* (2006.01)
*G06F 3/04817* (2022.01)
(Continued)

(52) U.S. Cl.
CPC ...... *G06F 3/04886* (2013.01); *G06F 3/04817* (2013.01); *G06F 3/0485* (2013.01);
(Continued)

(58) Field of Classification Search
CPC .. G06F 3/0481; G06F 3/04817; G06F 3/0485; G06F 3/0488; G06F 3/04883;
(Continued)

(56) References Cited

U.S. PATENT DOCUMENTS 9,733,815 B2 8/2017 Xia
2015/0350143 A1 12/2015 Yang
(Continued)

FOREIGN PATENT DOCUMENTS

CN 103324435 A 9/2013
CN 104503682 A 4/2015
(Continued)

OTHER PUBLICATIONS

Francis, Adrian, "Split-Screen Is Like Having Multiple Monitors", Using Technology Better, Mar. 22, 2018 XP093093000, pp. 1-6.

*Primary Examiner* — Joe H Cheng
(74) *Attorney, Agent, or Firm* — Slater Matsil, LLP

(57) ABSTRACT

A method for displaying a plurality of windows in a split-screen manner is applied to an electronic device. The electronic device displays a first window in full screen, detects a screen splitting operation of a user on the first window, responds to the screen splitting operation, and displays a second window on one side of the first window, to display the first window and the second window in the split-screen manner.

14 Claims, 74 Drawing Sheets

(51) Int. Cl.
  *G06F 3/0485* (2022.01)
  *G06F 3/04886* (2022.01)

(52) U.S. Cl.
  CPC .............. *G06F 2203/04803* (2013.01); *G06F 2203/04808* (2013.01)

(58) Field of Classification Search
  CPC ....... G06F 3/04886; G06F 2203/04803; G06F 2203/04808
  See application file for complete search history.

(56) References Cited

U.S. PATENT DOCUMENTS

| | | | |
|---|---|---|---|
| 2016/0132188 A1 | 5/2016 | Li | |
| 2018/0095809 A1 | 4/2018 | Hong | |
| 2022/0317873 A1* | 10/2022 | Wang | G06F 3/0482 |
| 2022/0334684 A1 | 10/2022 | Sun | |

FOREIGN PATENT DOCUMENTS

| | | |
|---|---|---|
| CN | 104750405 A | 7/2015 |
| CN | 105824495 A | 8/2016 |
| CN | 105843535 A | 8/2016 |
| CN | 106648420 A | 5/2017 |
| CN | 106843637 A | 6/2017 |
| CN | 107305462 A | 10/2017 |
| CN | 109062467 A | 12/2018 |
| CN | 109062469 A | 12/2018 |
| CN | 109684024 A | 4/2019 |
| CN | 110244893 A | 9/2019 |
| CN | 110489043 A | 11/2019 |
| CN | 111045578 A | 4/2020 |
| CN | 112578982 A | 3/2021 |
| EP | 3951575 A1 | 2/2022 |
| EP | 3985492 A1 | 4/2022 |
| JP | H06242760 A | 9/1994 |
| JP | H09146750 A | 6/1997 |

* cited by examiner

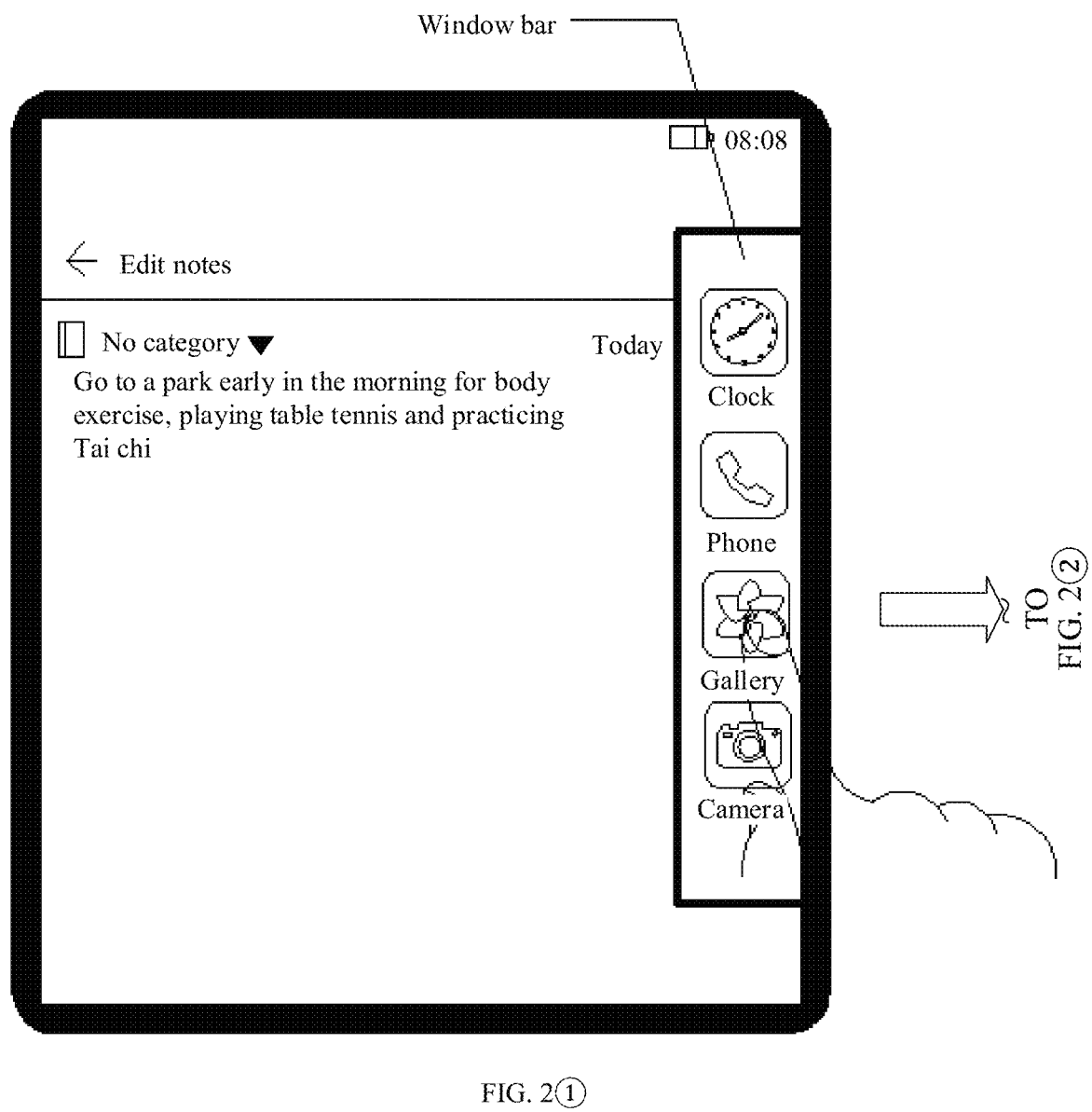
FIG. 2①

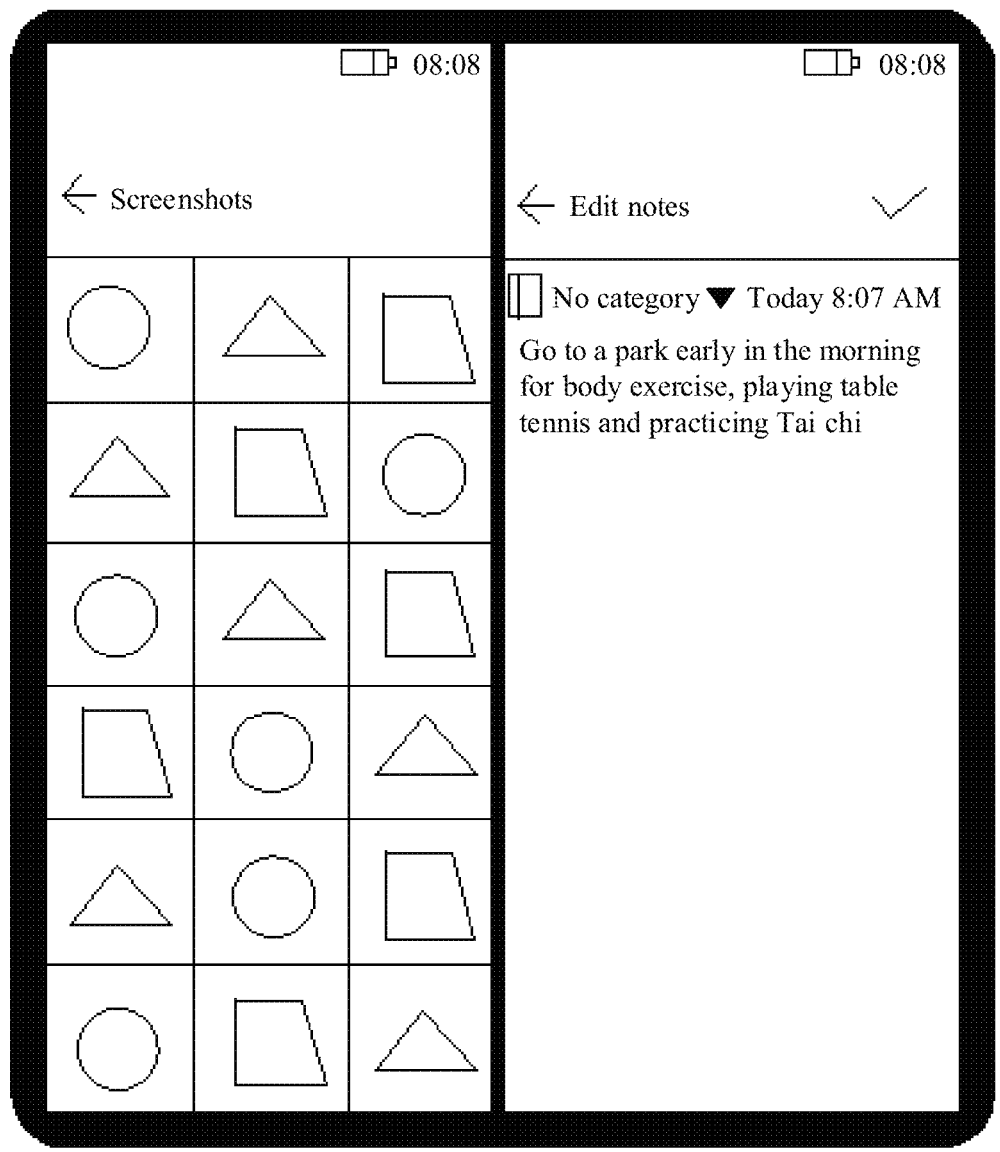
FIG. 2②

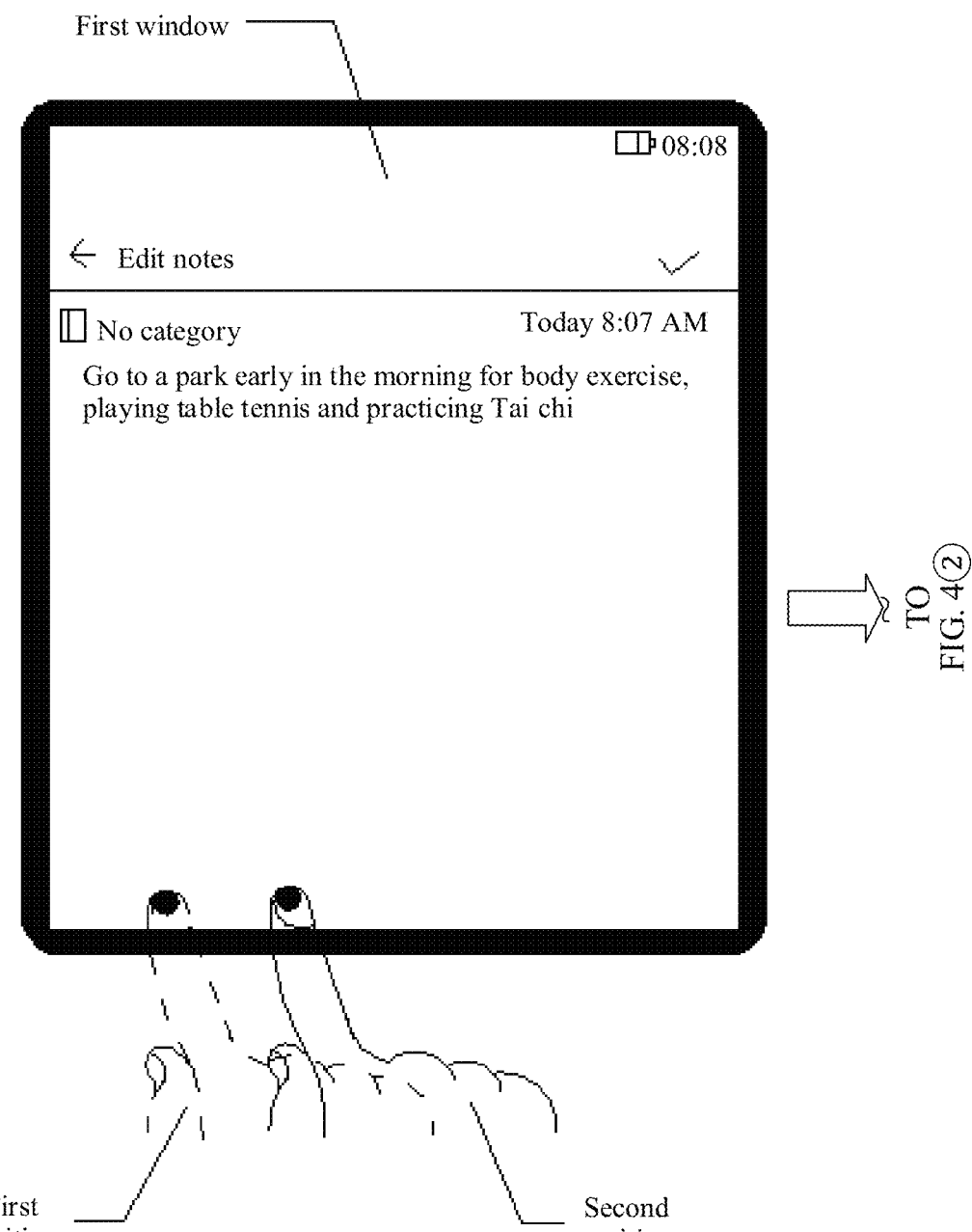
FIG. 4①

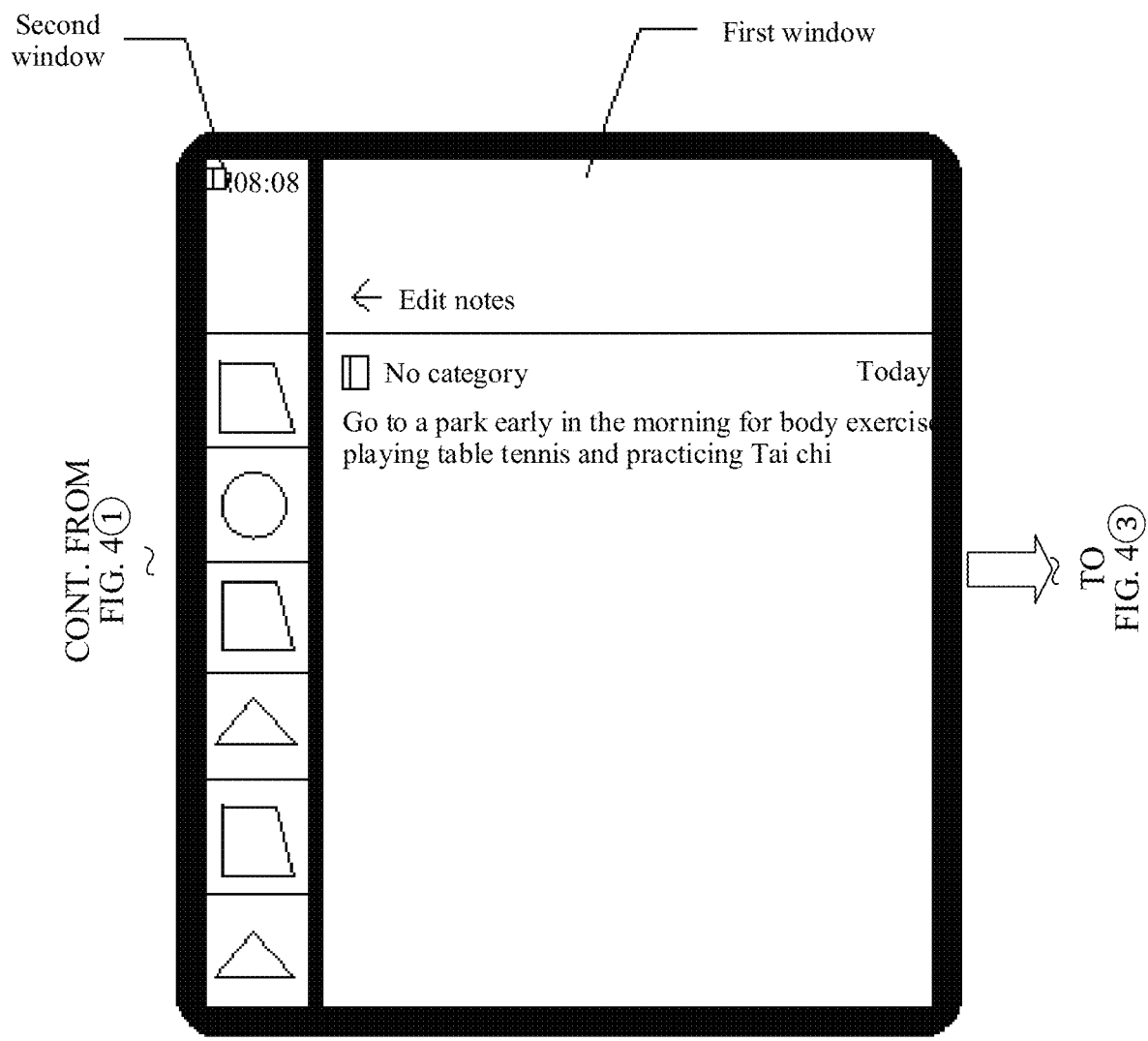
FIG. 4②

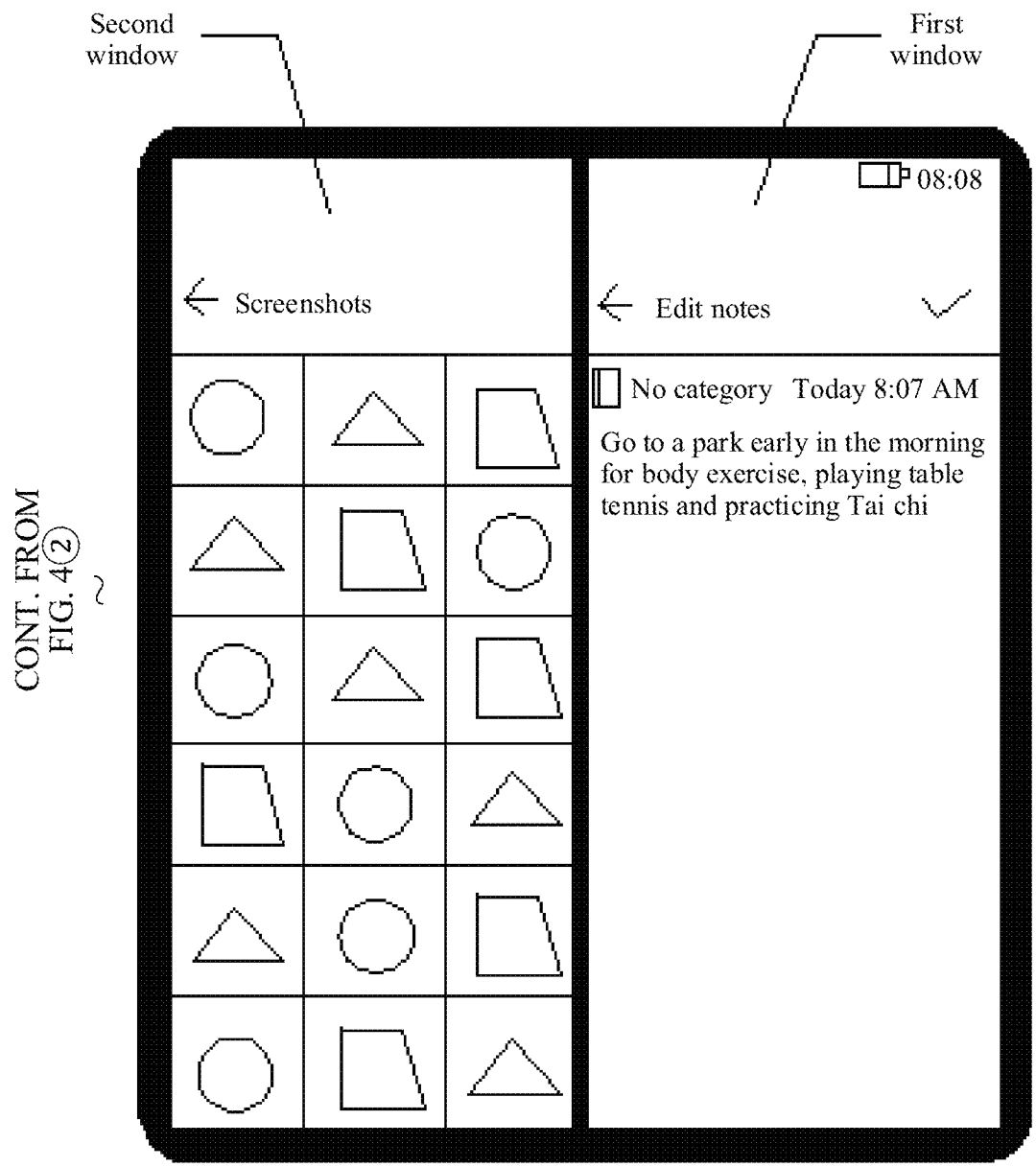
FIG. 4③

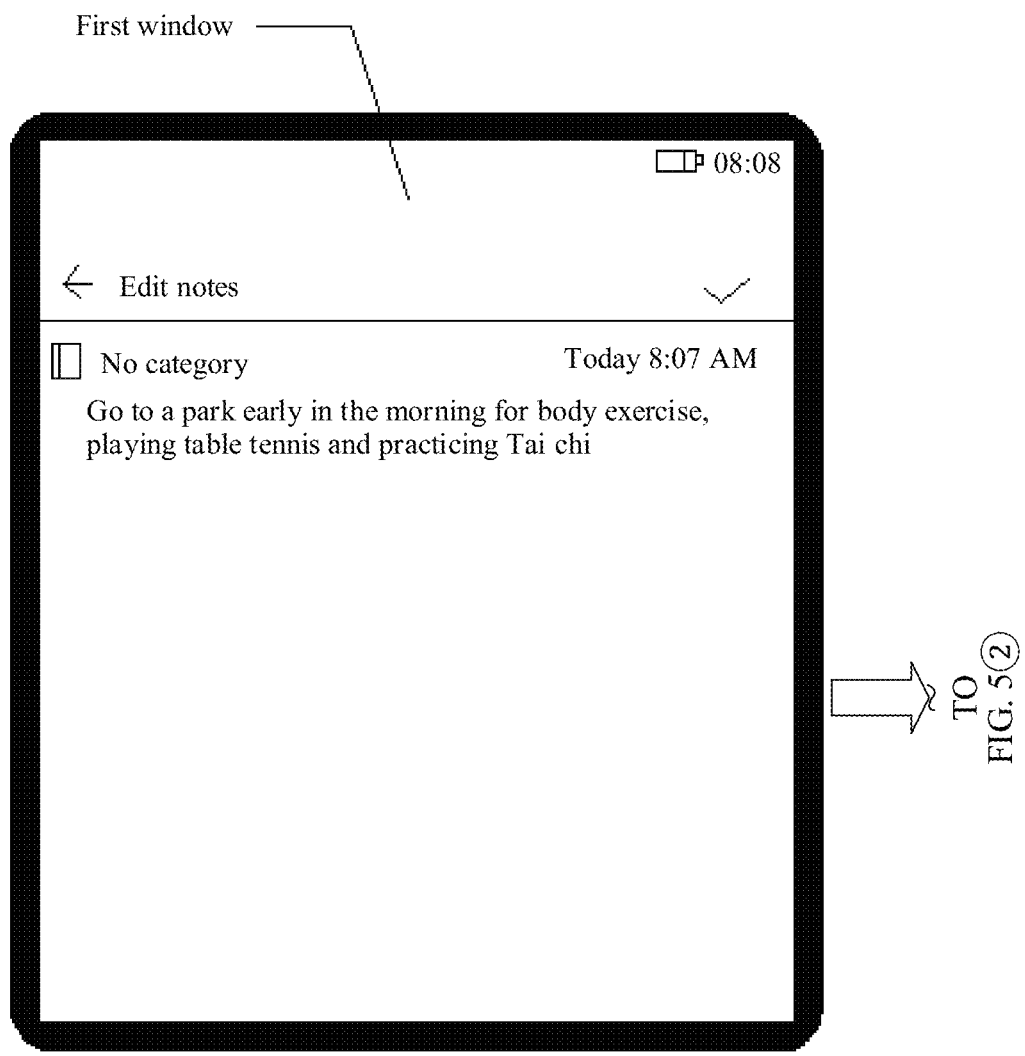
FIG. 5①

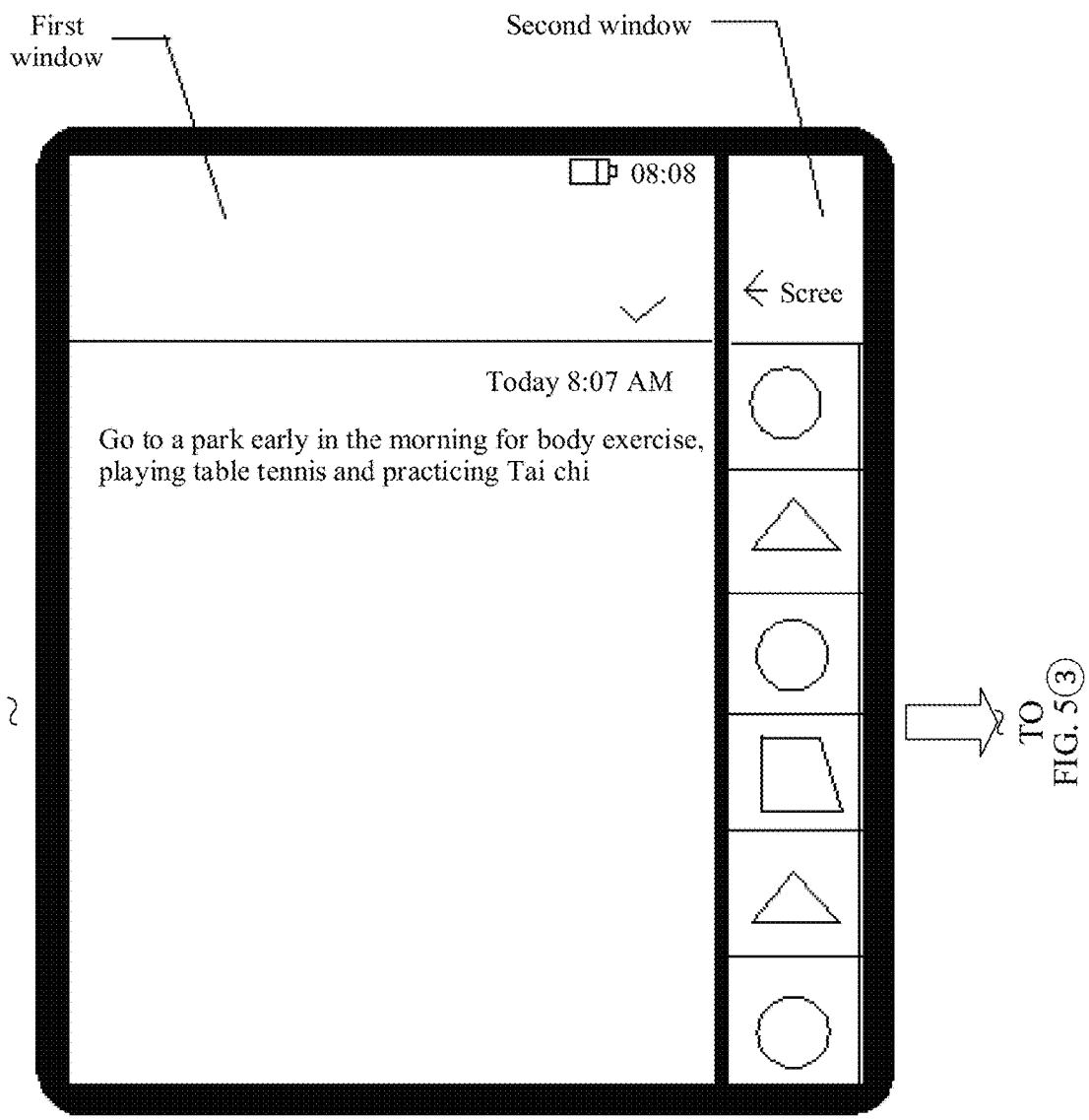
FIG. 5②

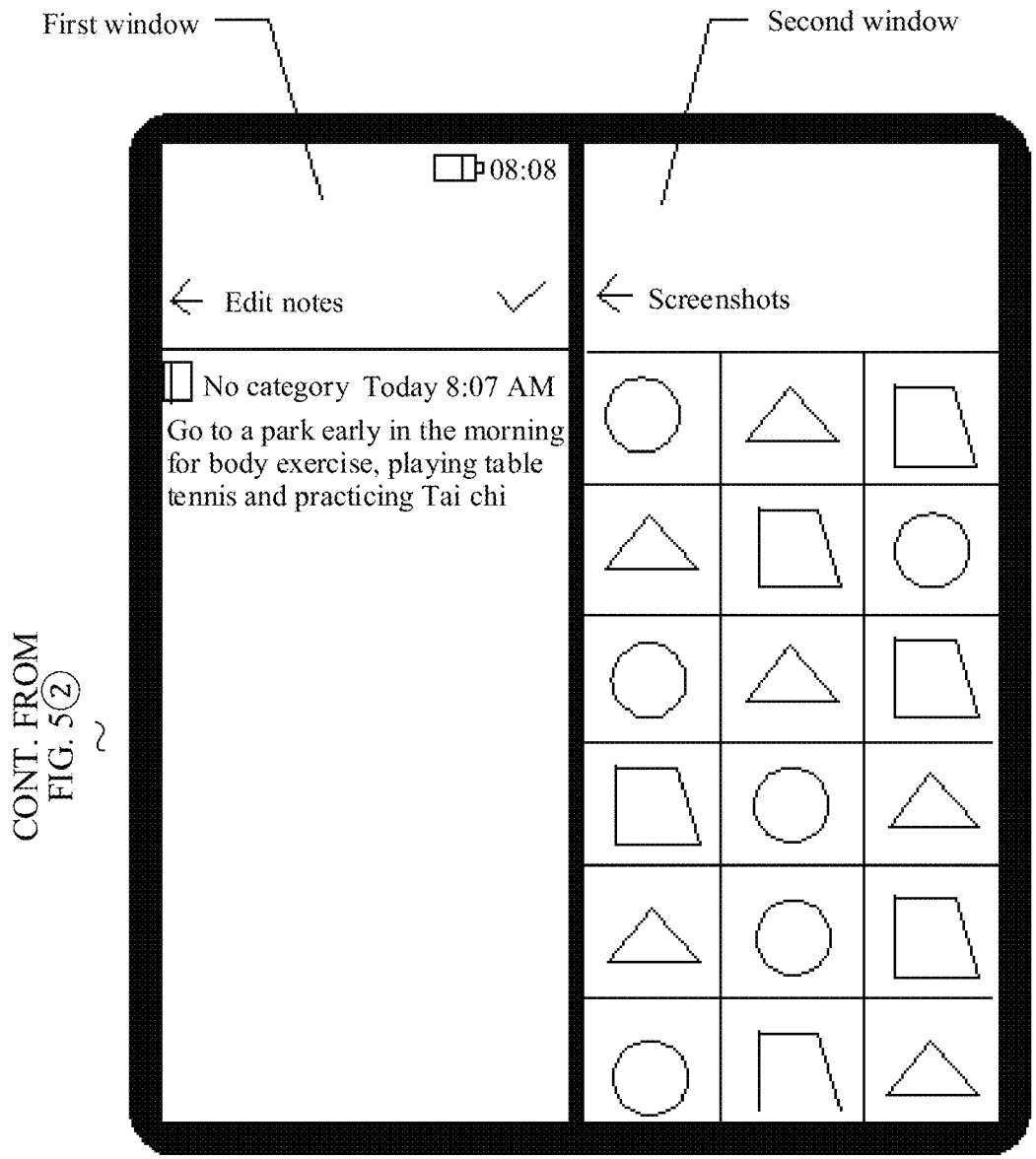
FIG. 5③

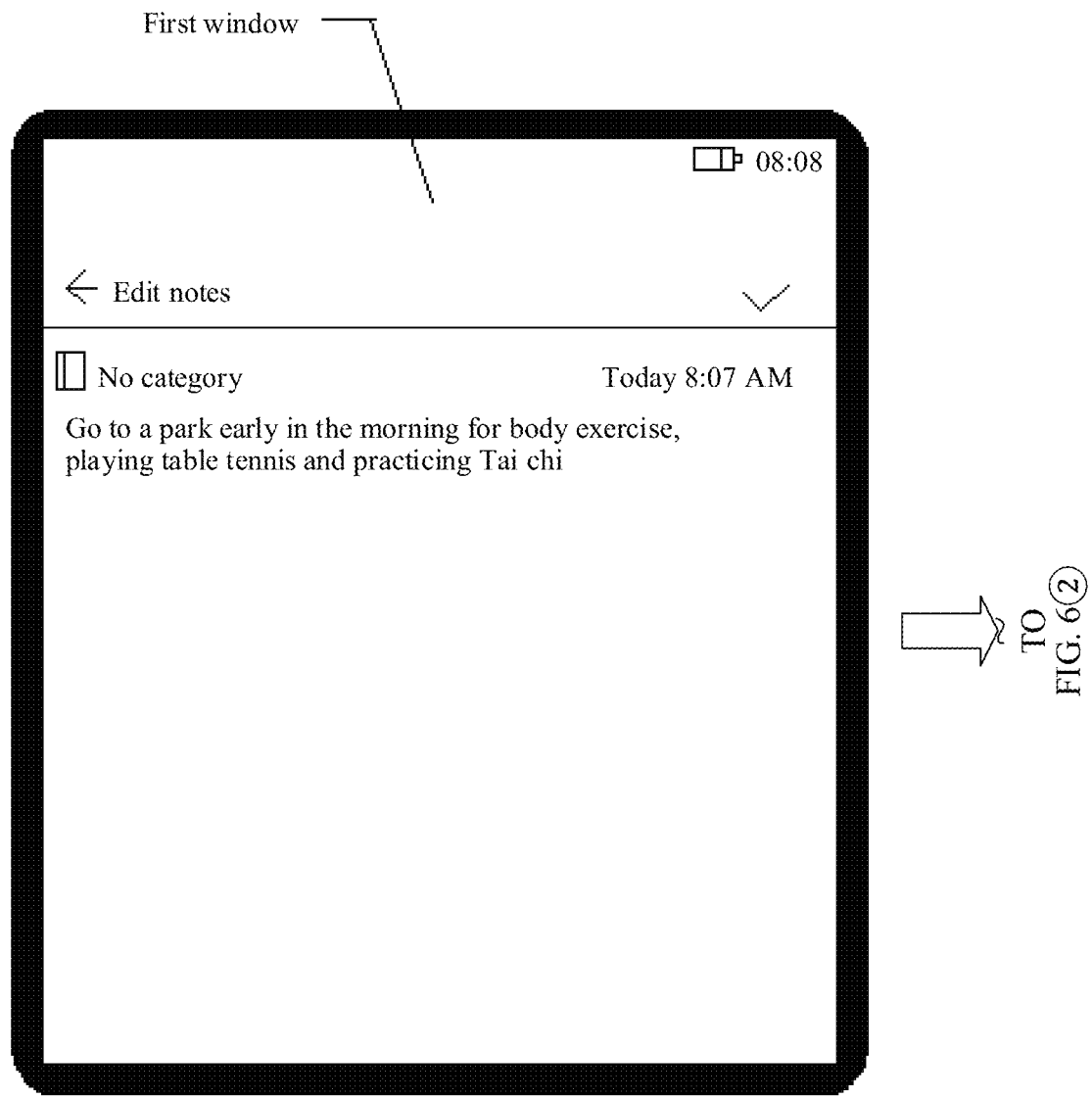
FIG. 6①

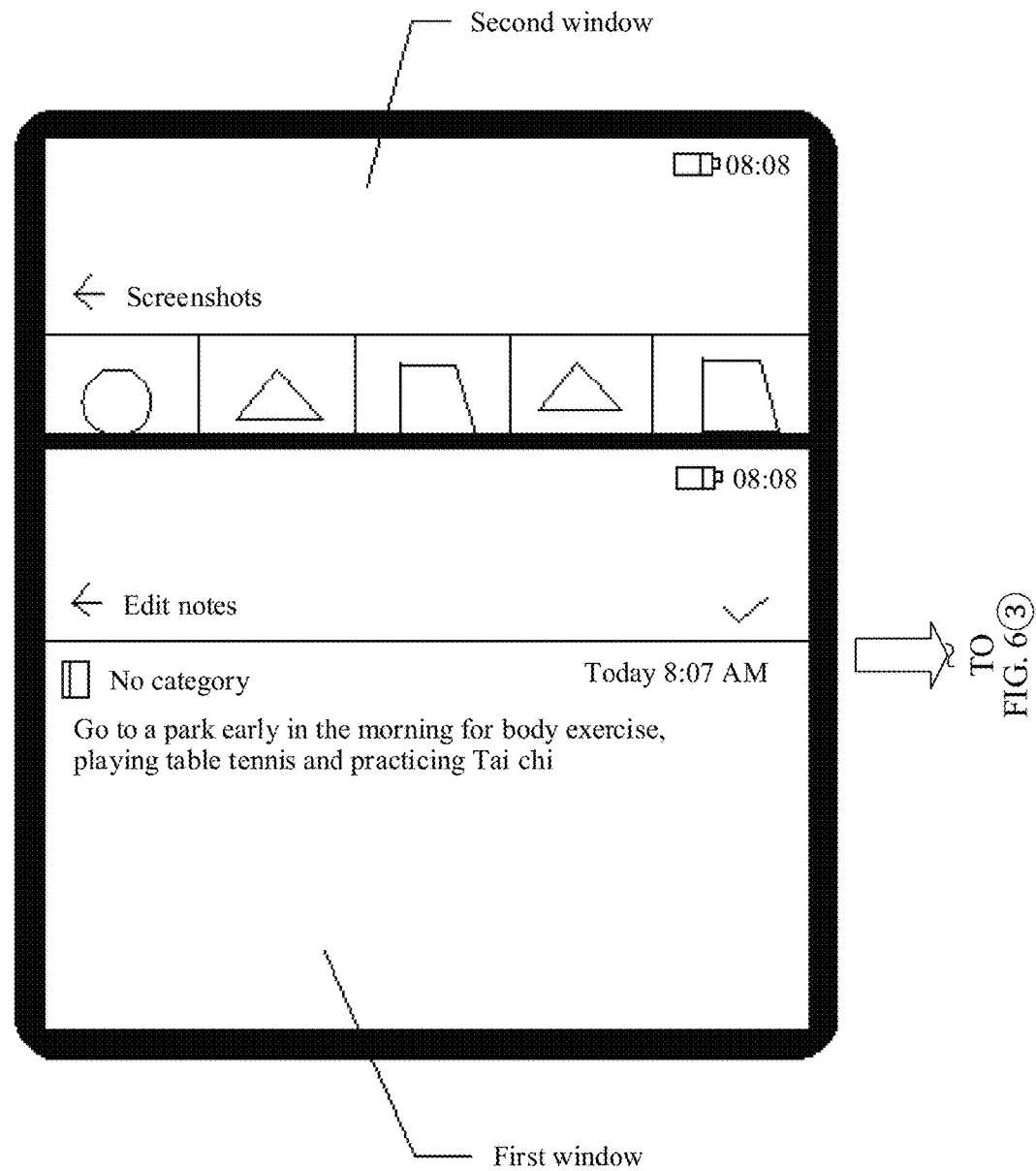
FIG. 6②

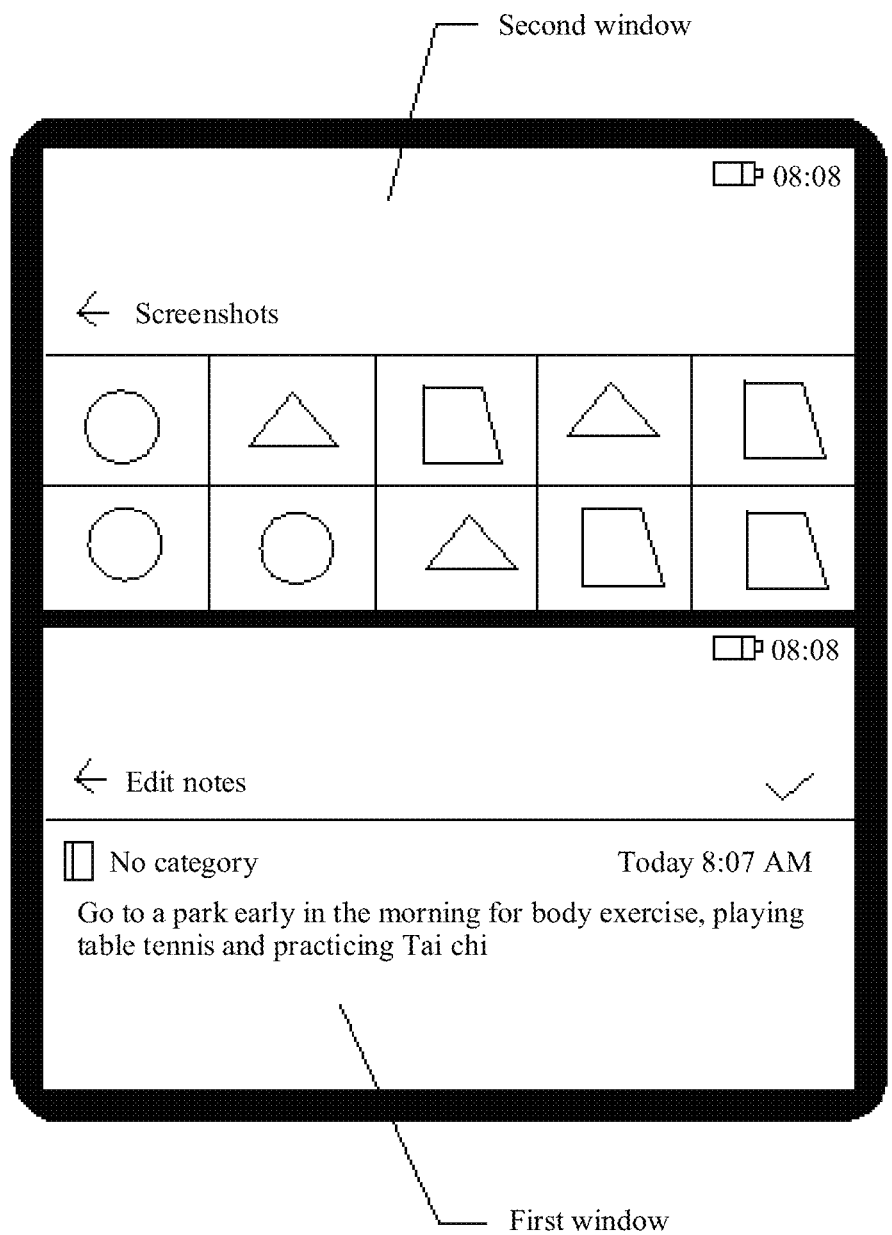
FIG. 6③

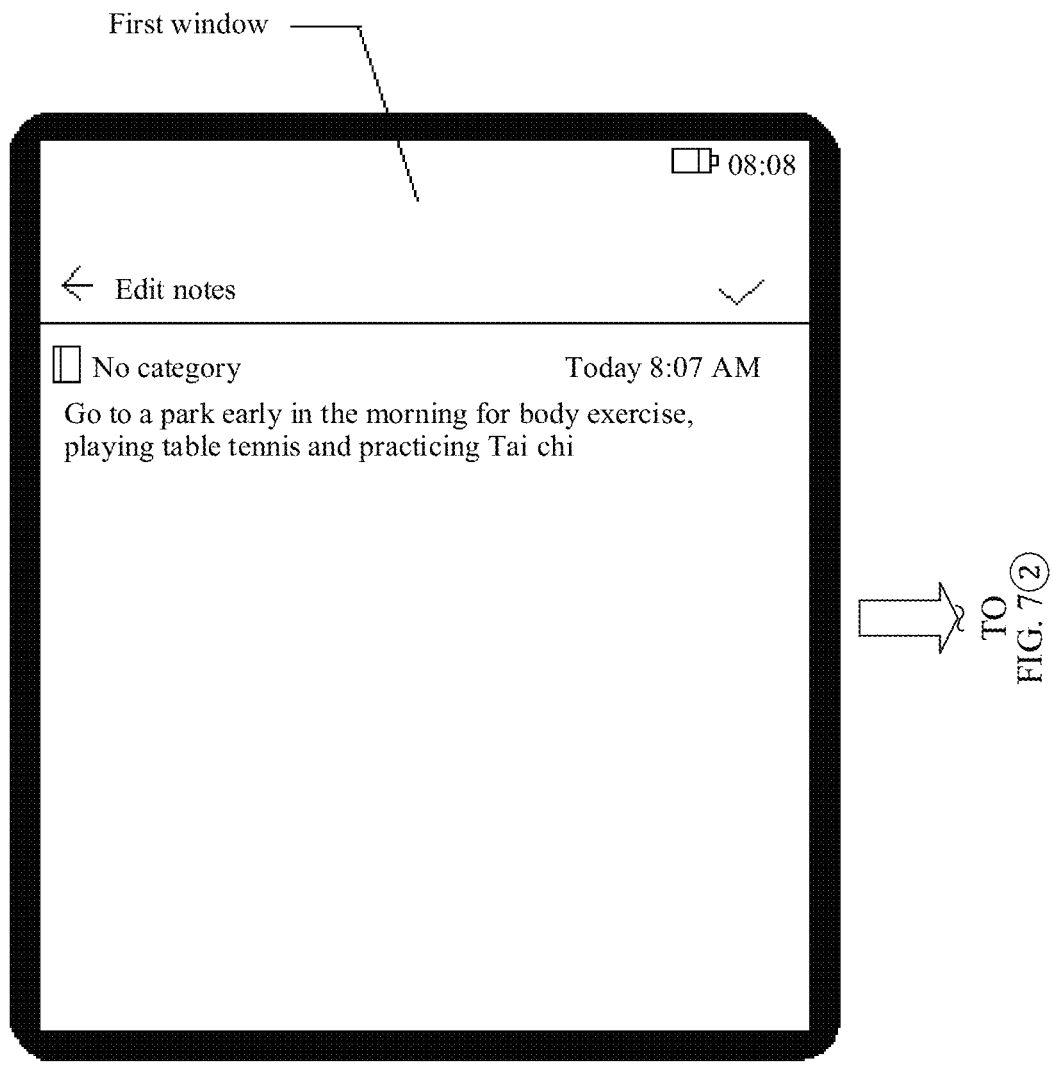
FIG. 7①

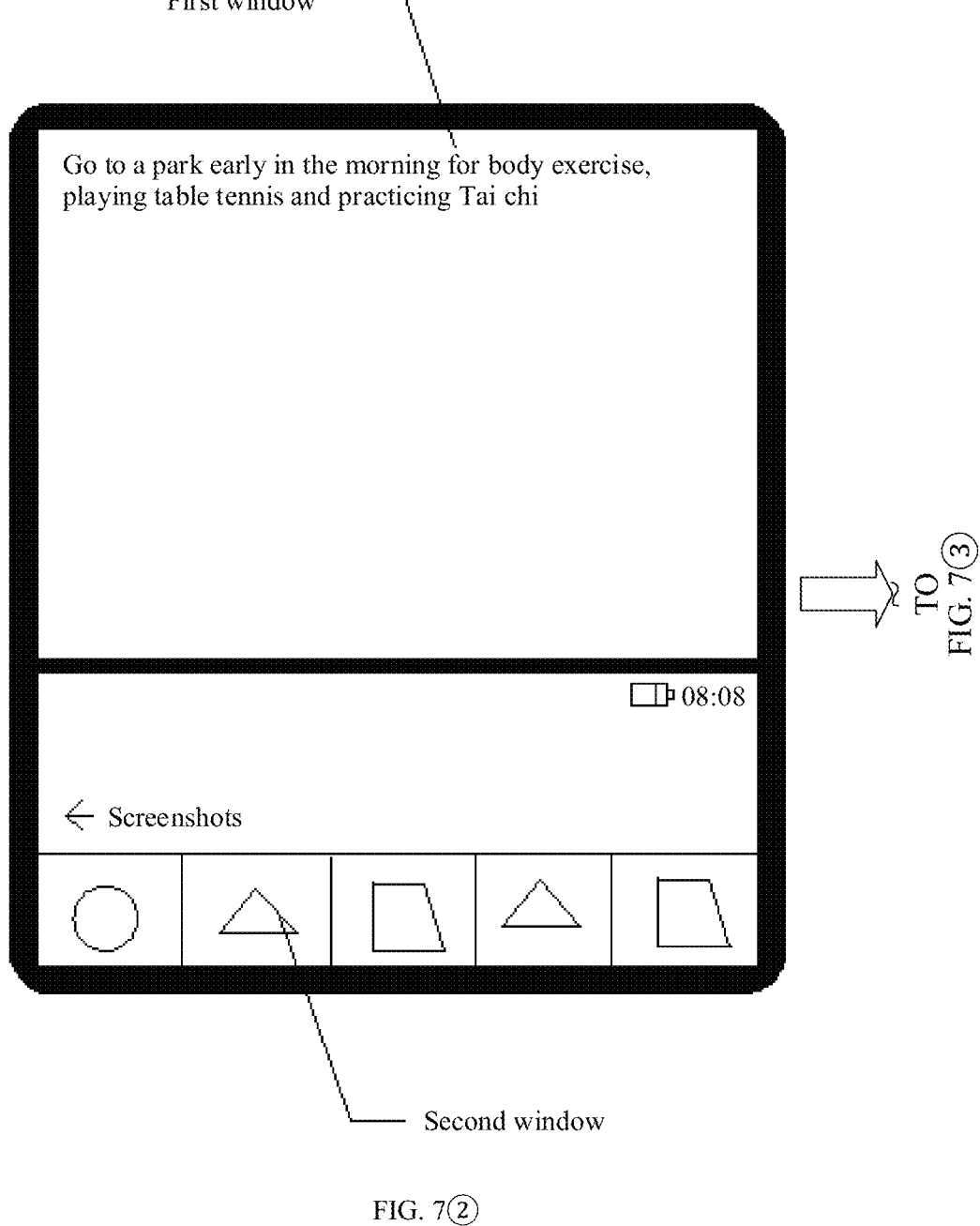
FIG. 7②

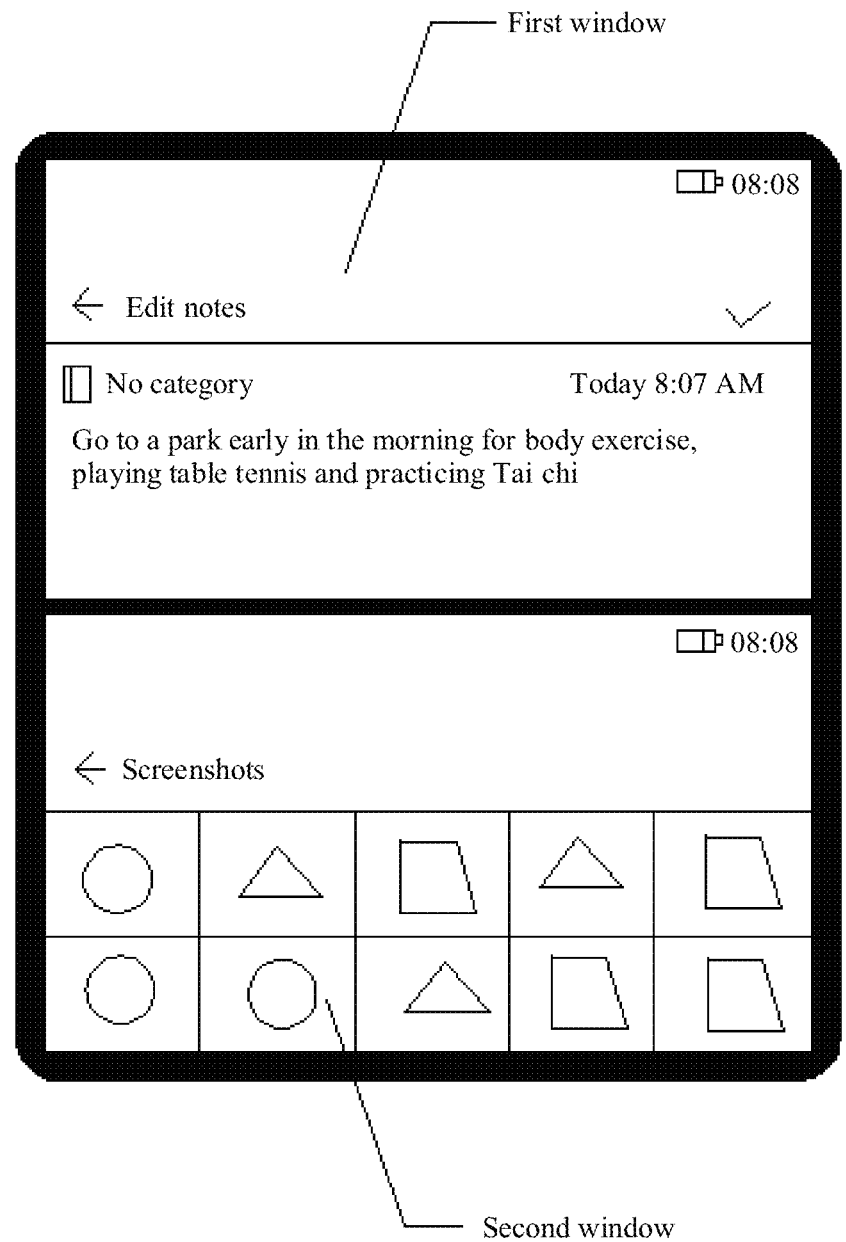
FIG. 7③

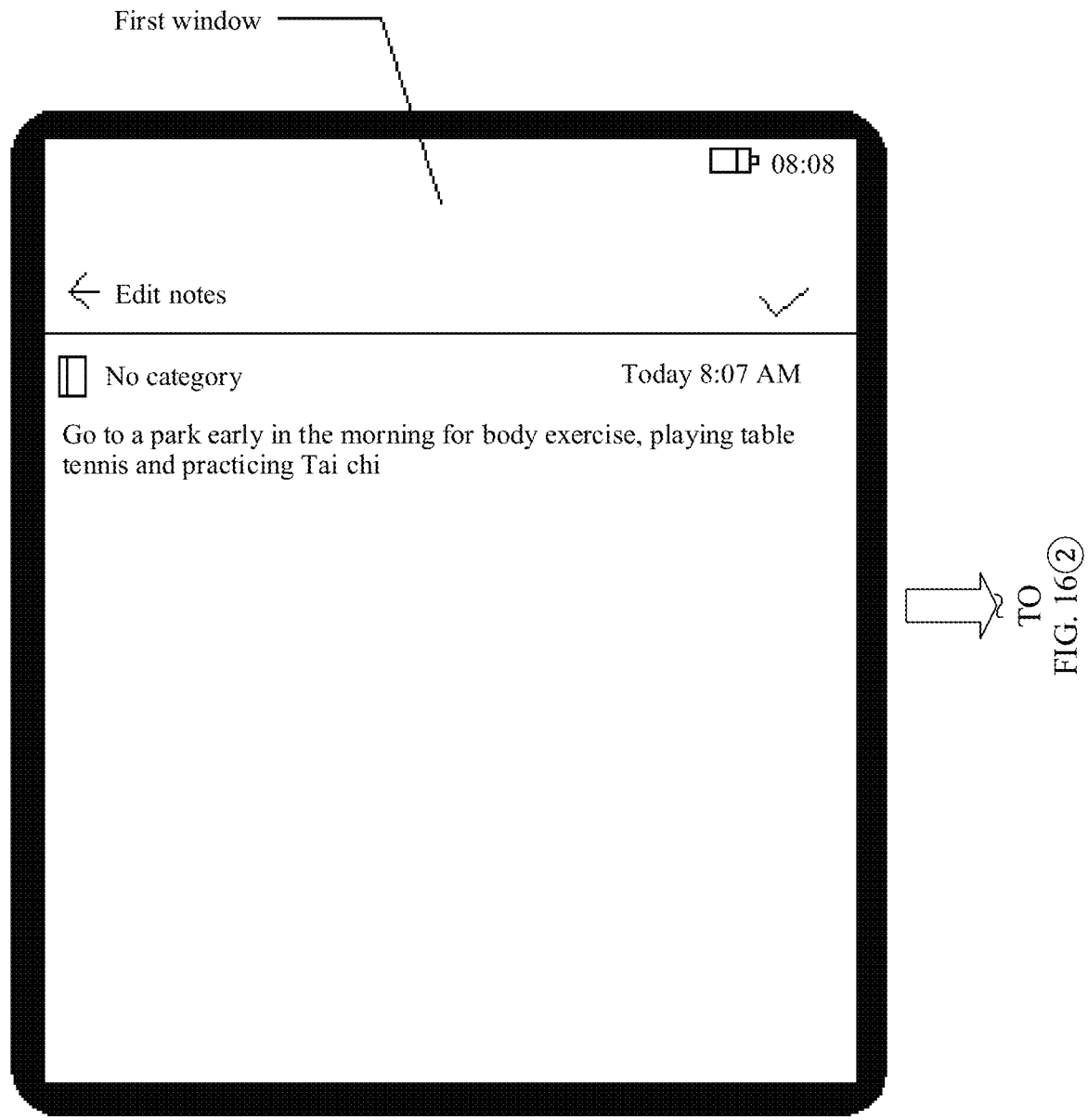
FIG. 16①

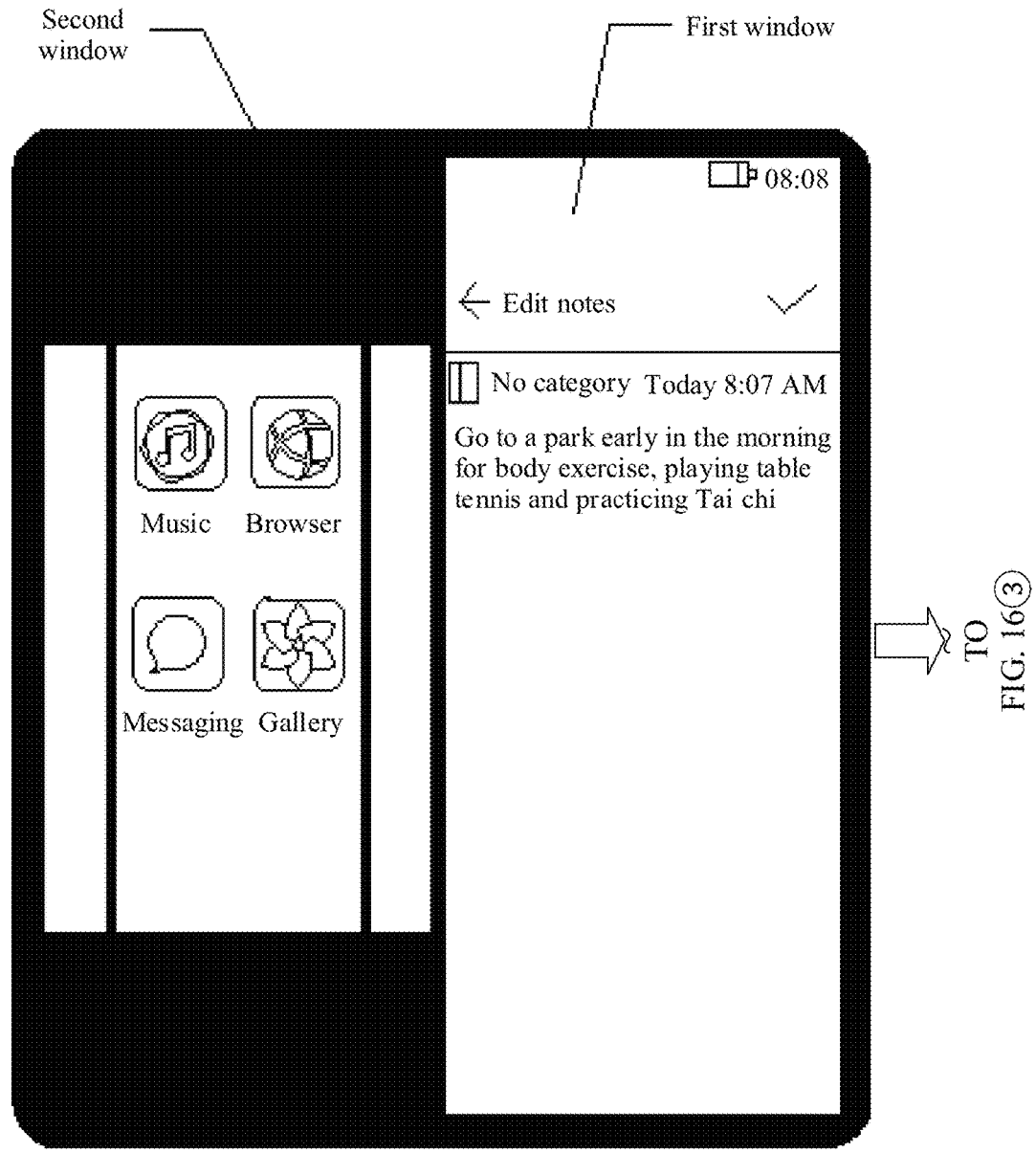
FIG. 16②

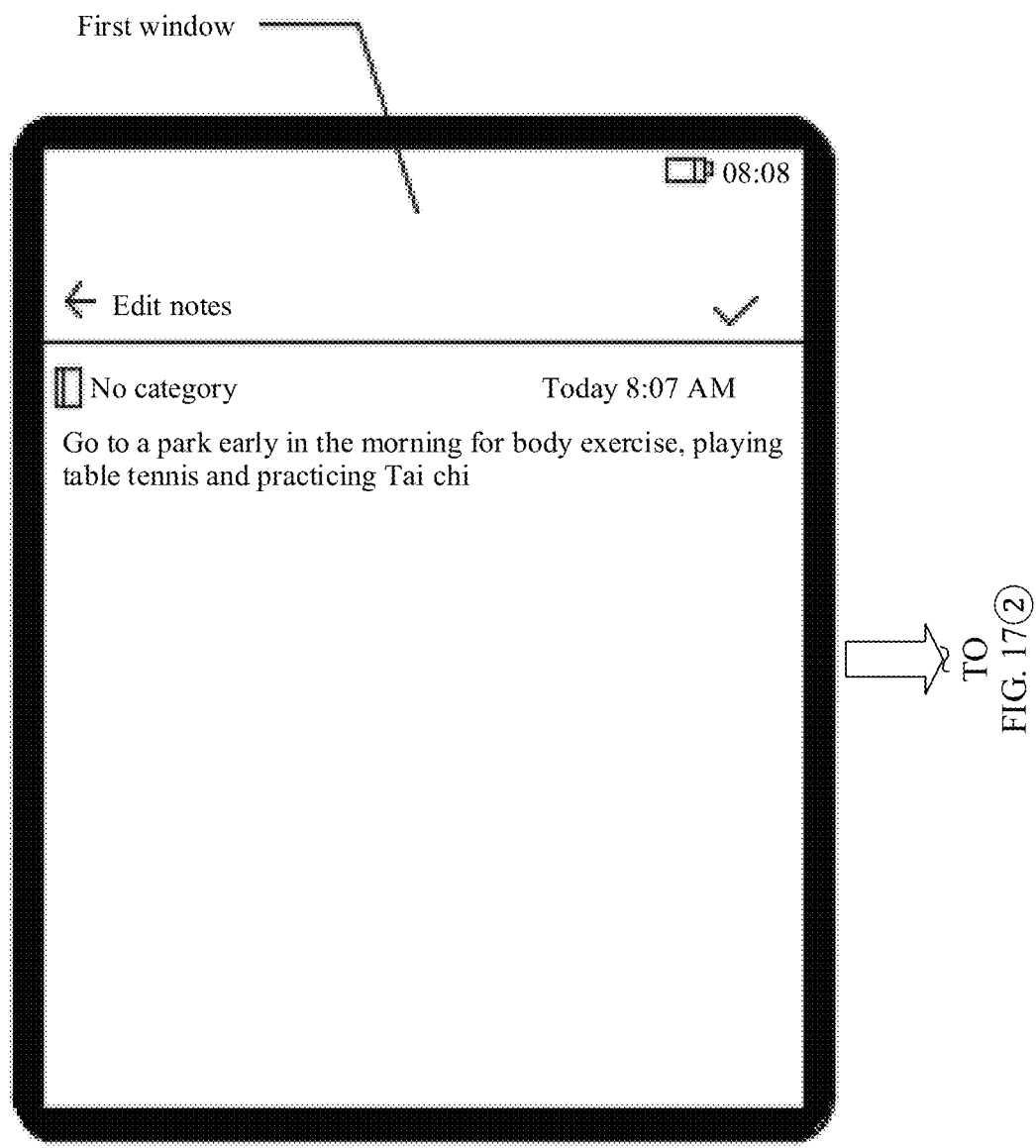
FIG. 17①

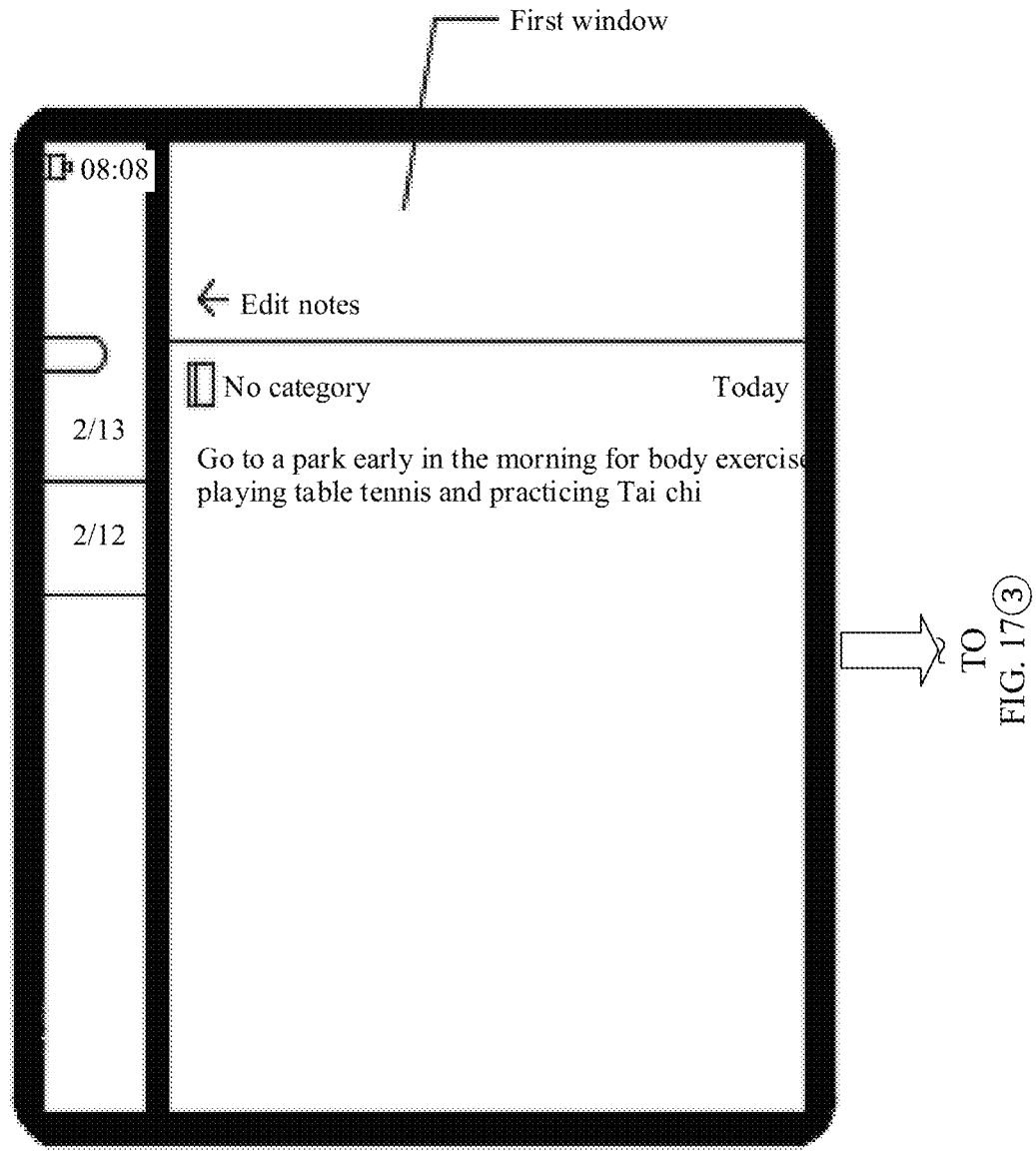
FIG. 17②

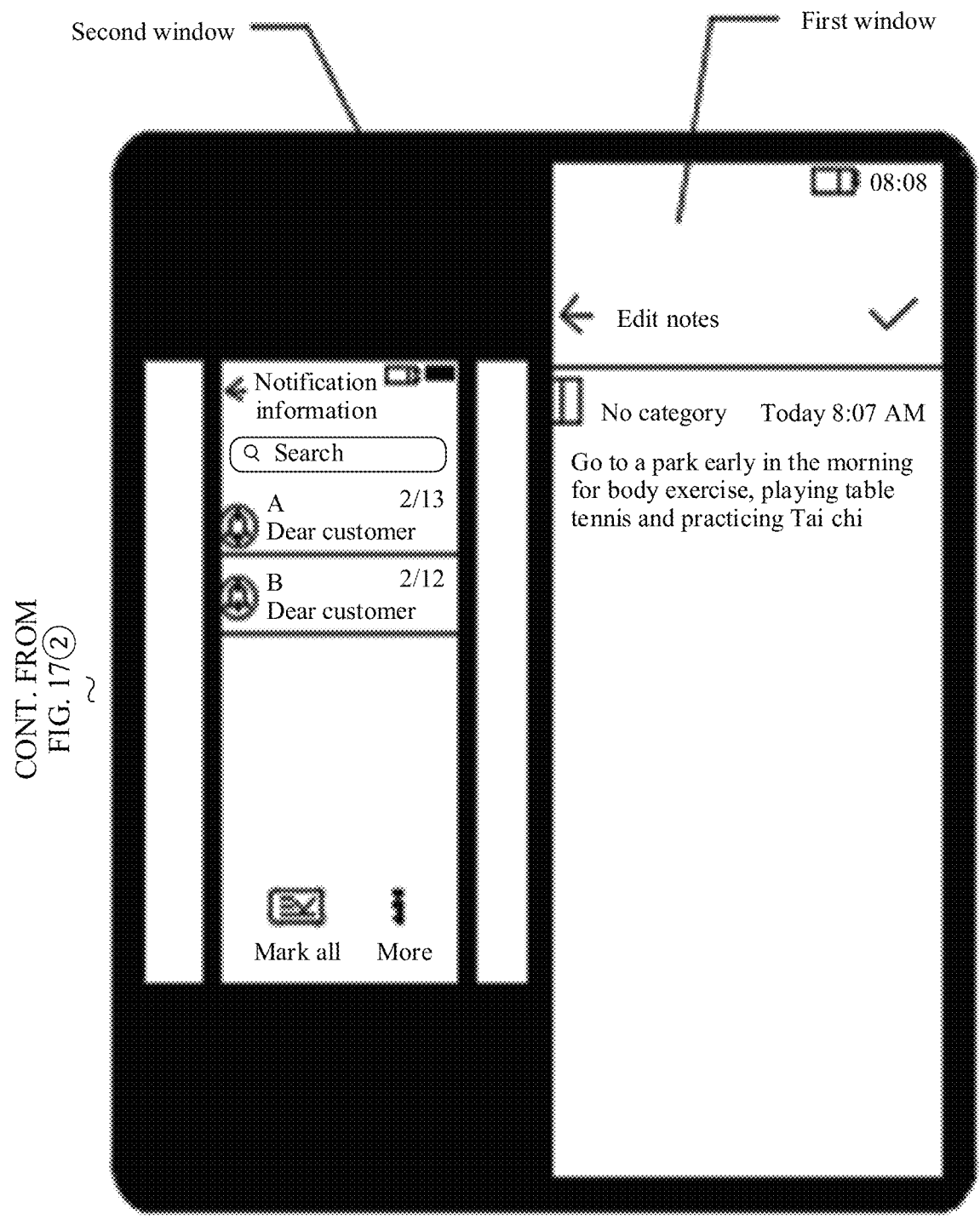
FIG. 17③

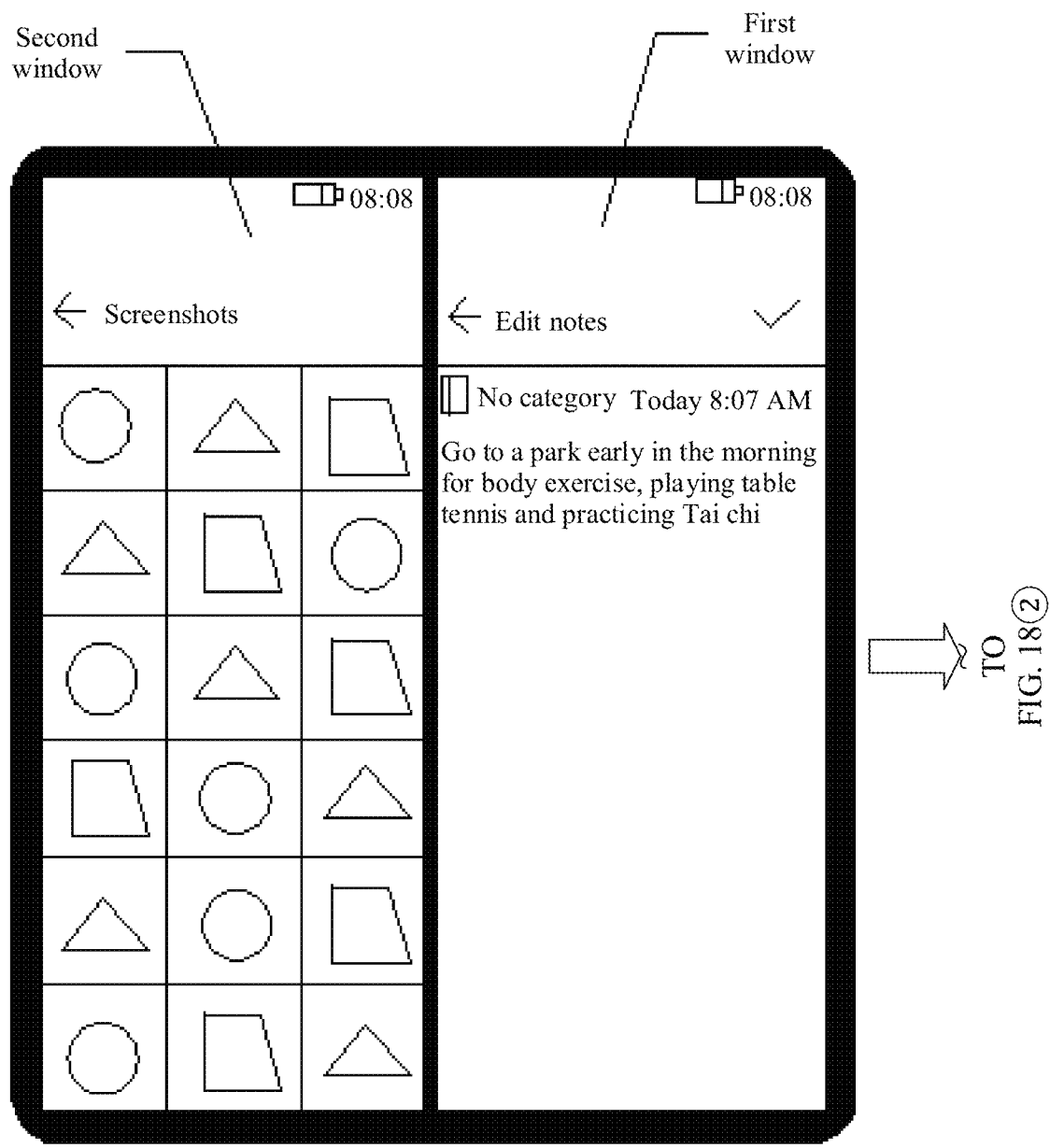
FIG. 18①

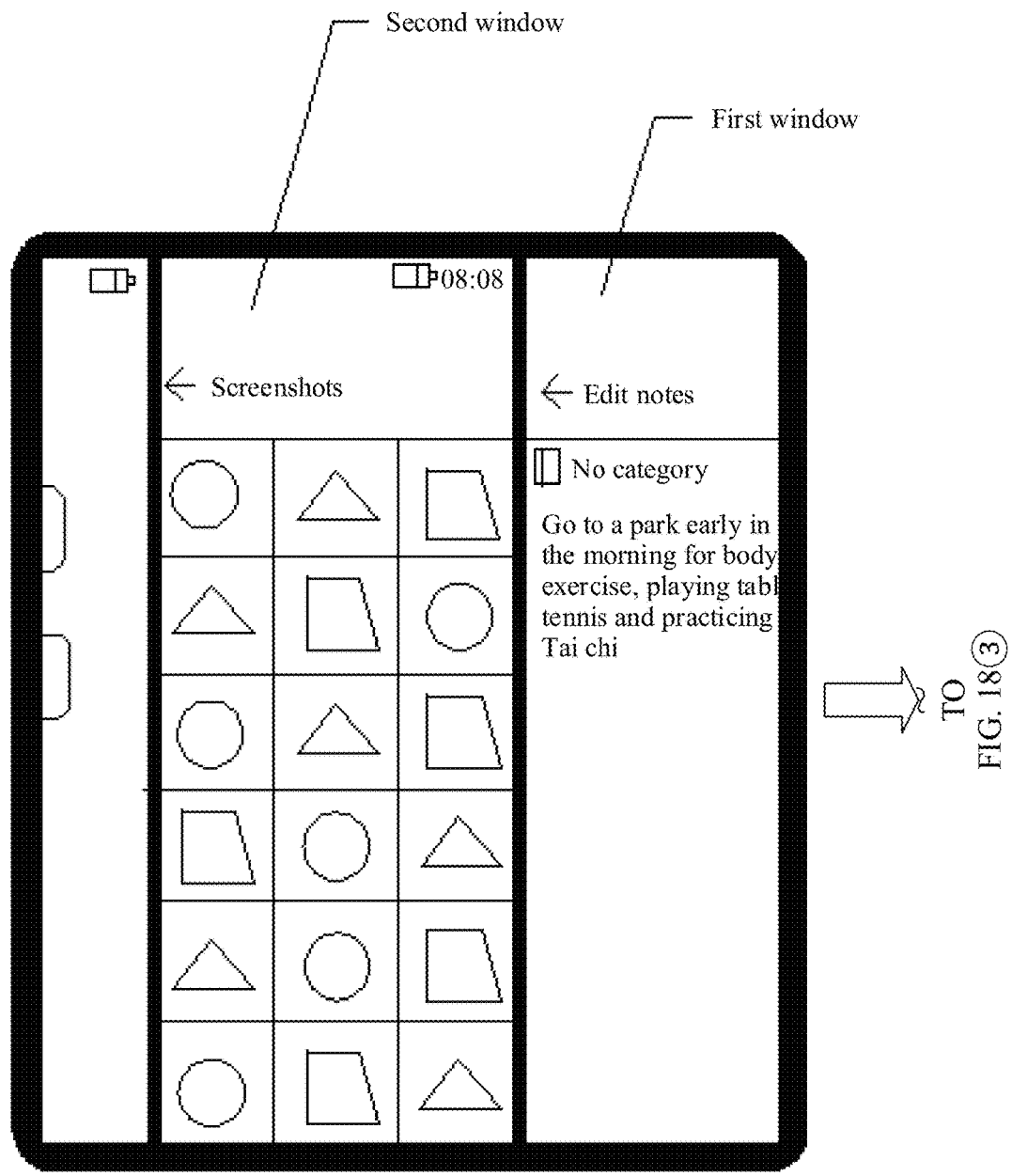
FIG. 18②

FIG. 18③

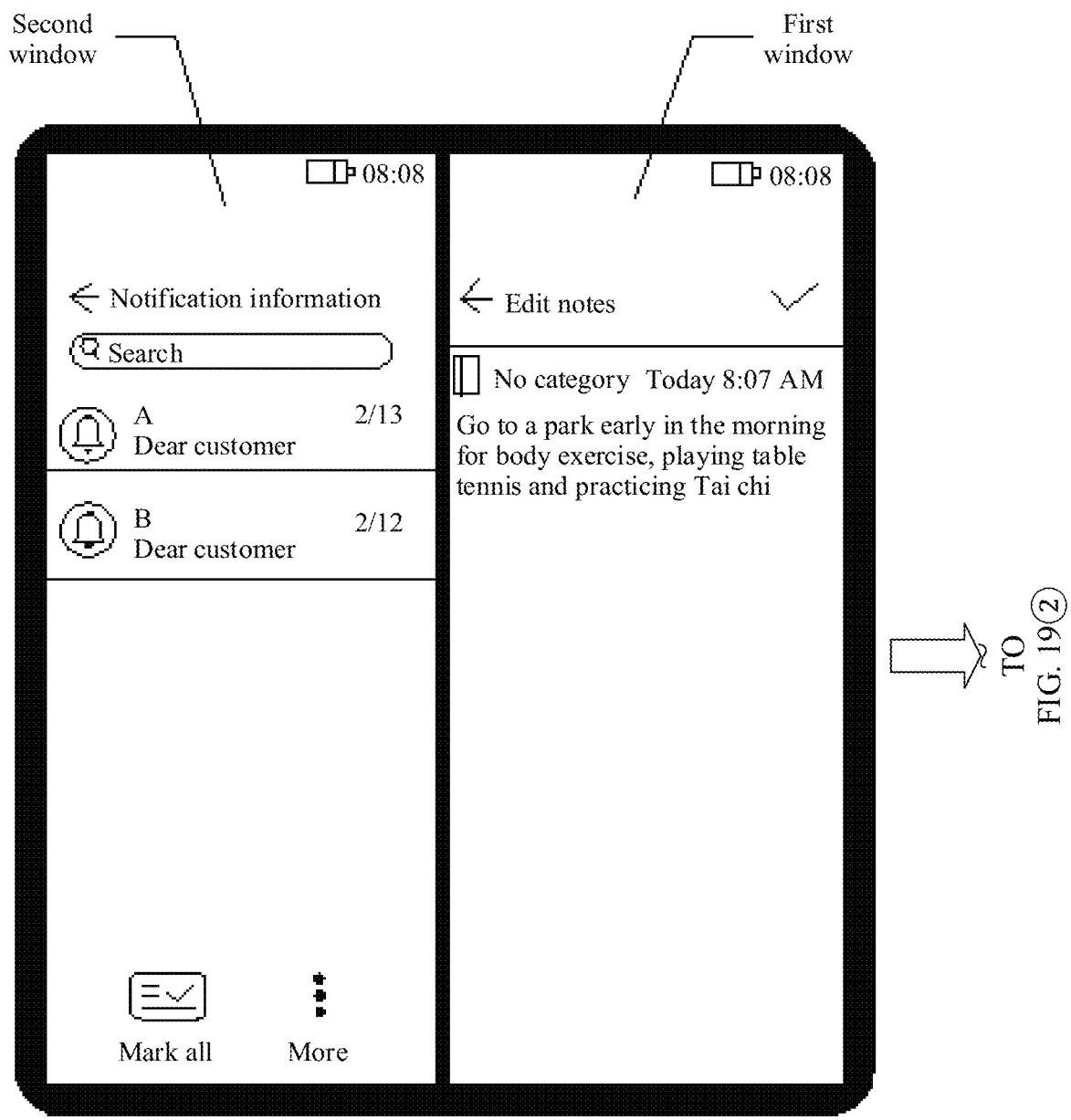
FIG. 19①

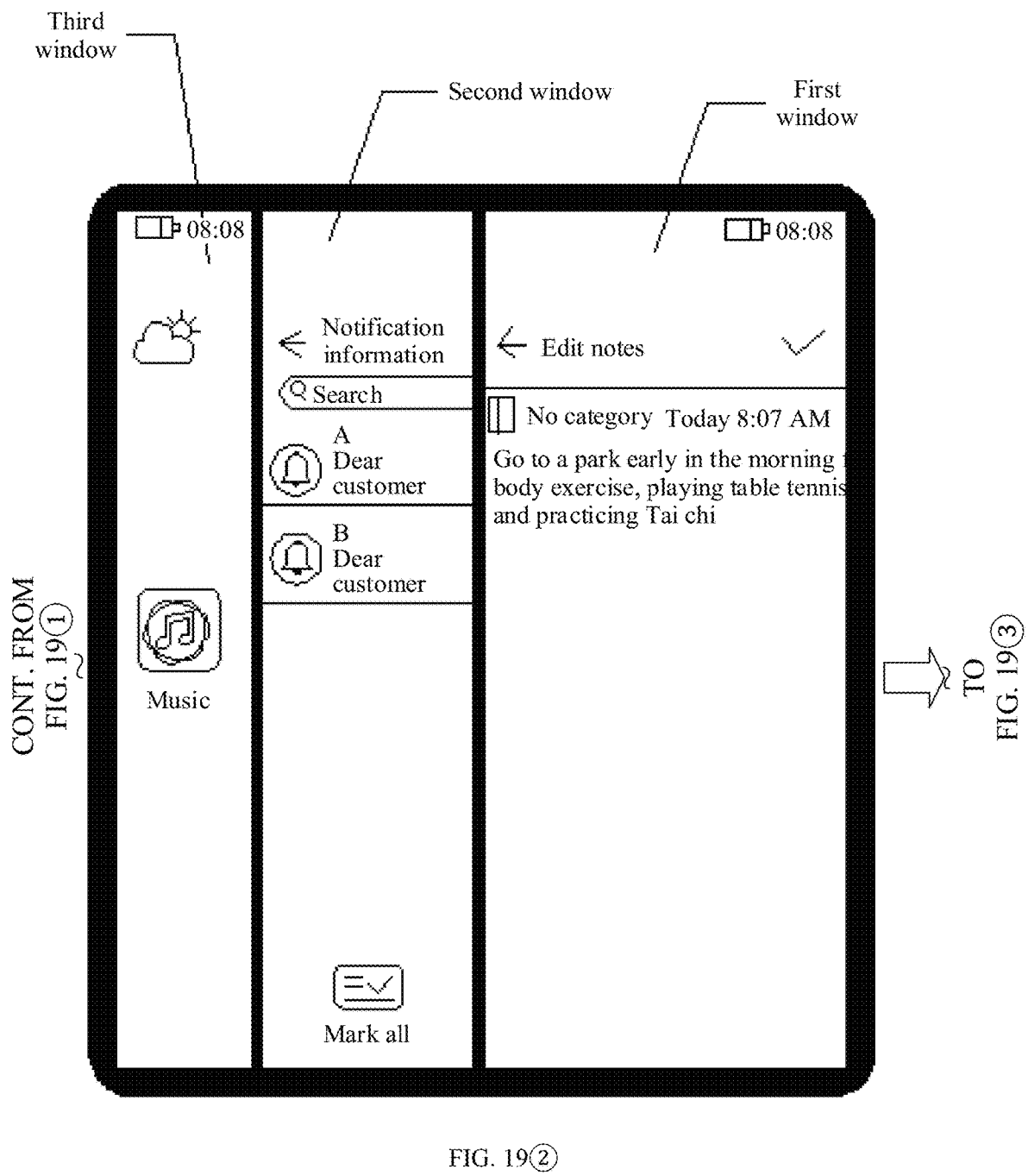
FIG. 19②

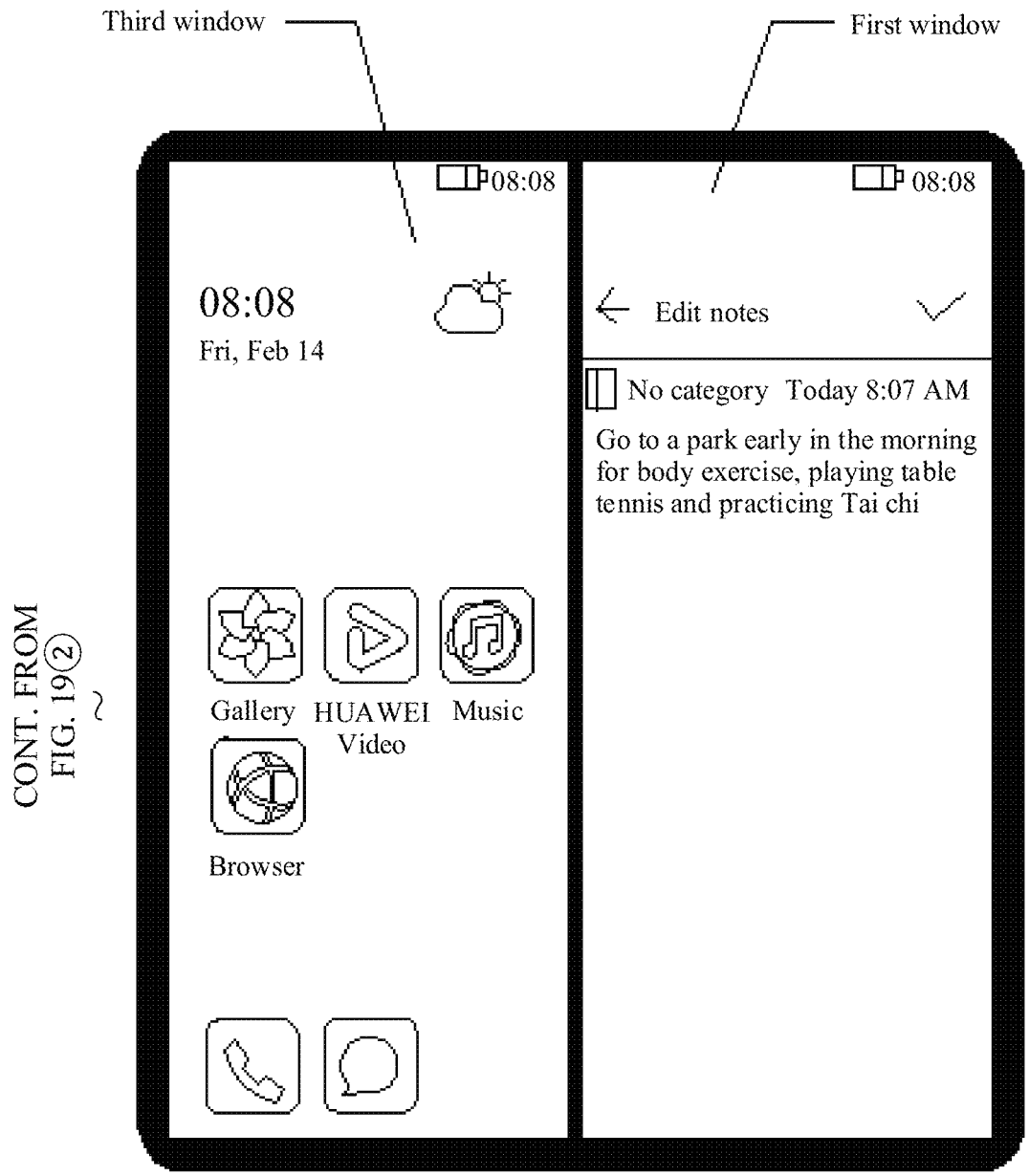
FIG. 19③

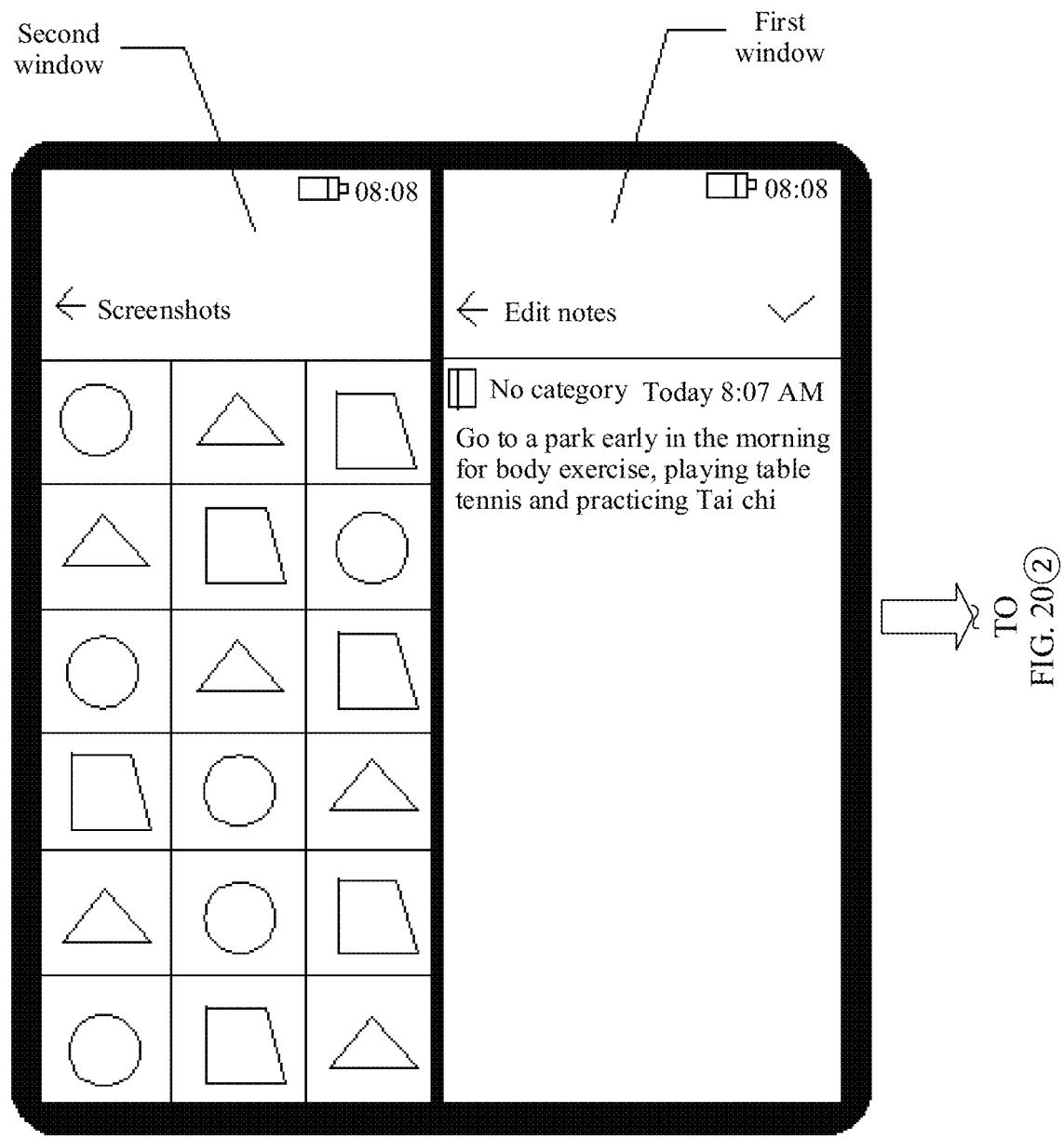
FIG. 20①

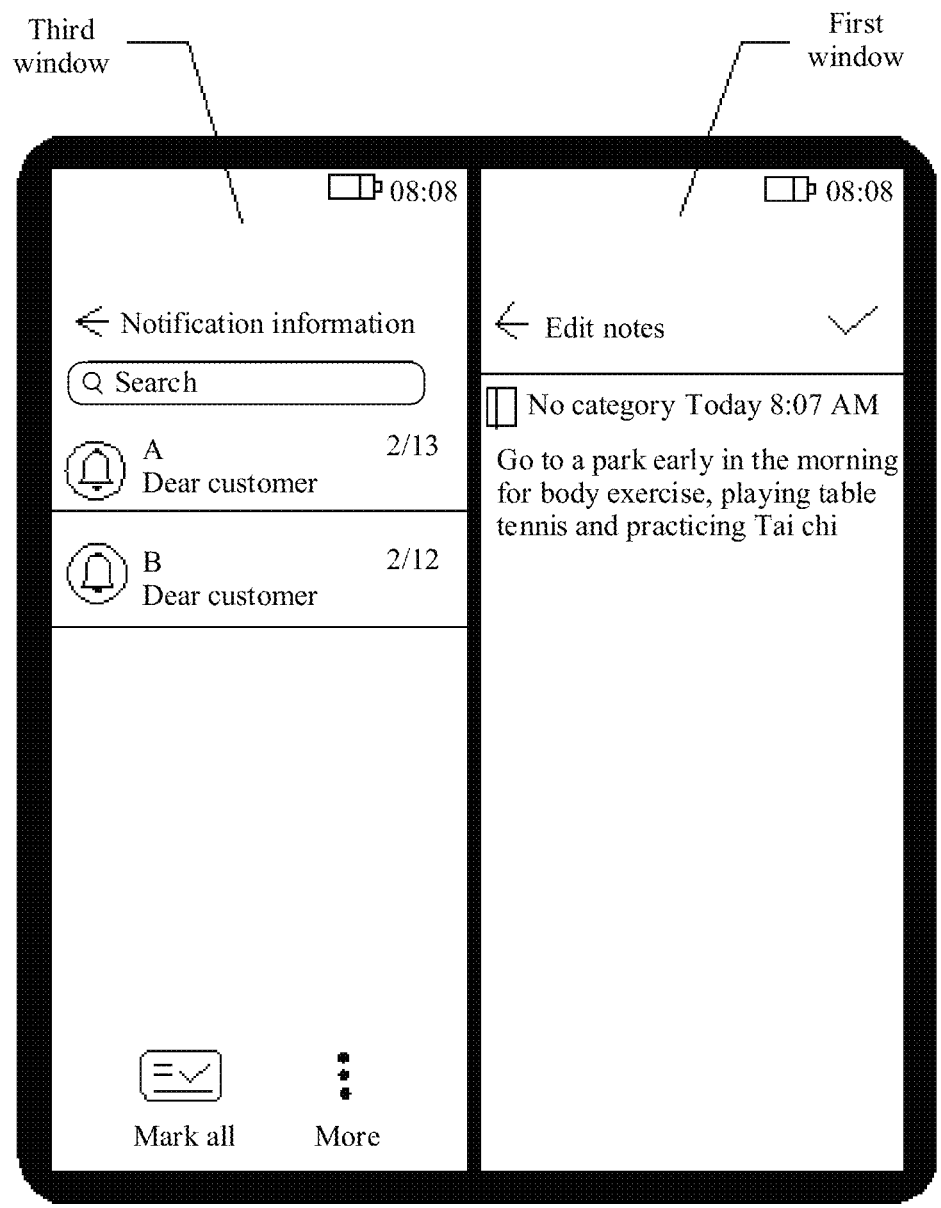
FIG. 20②

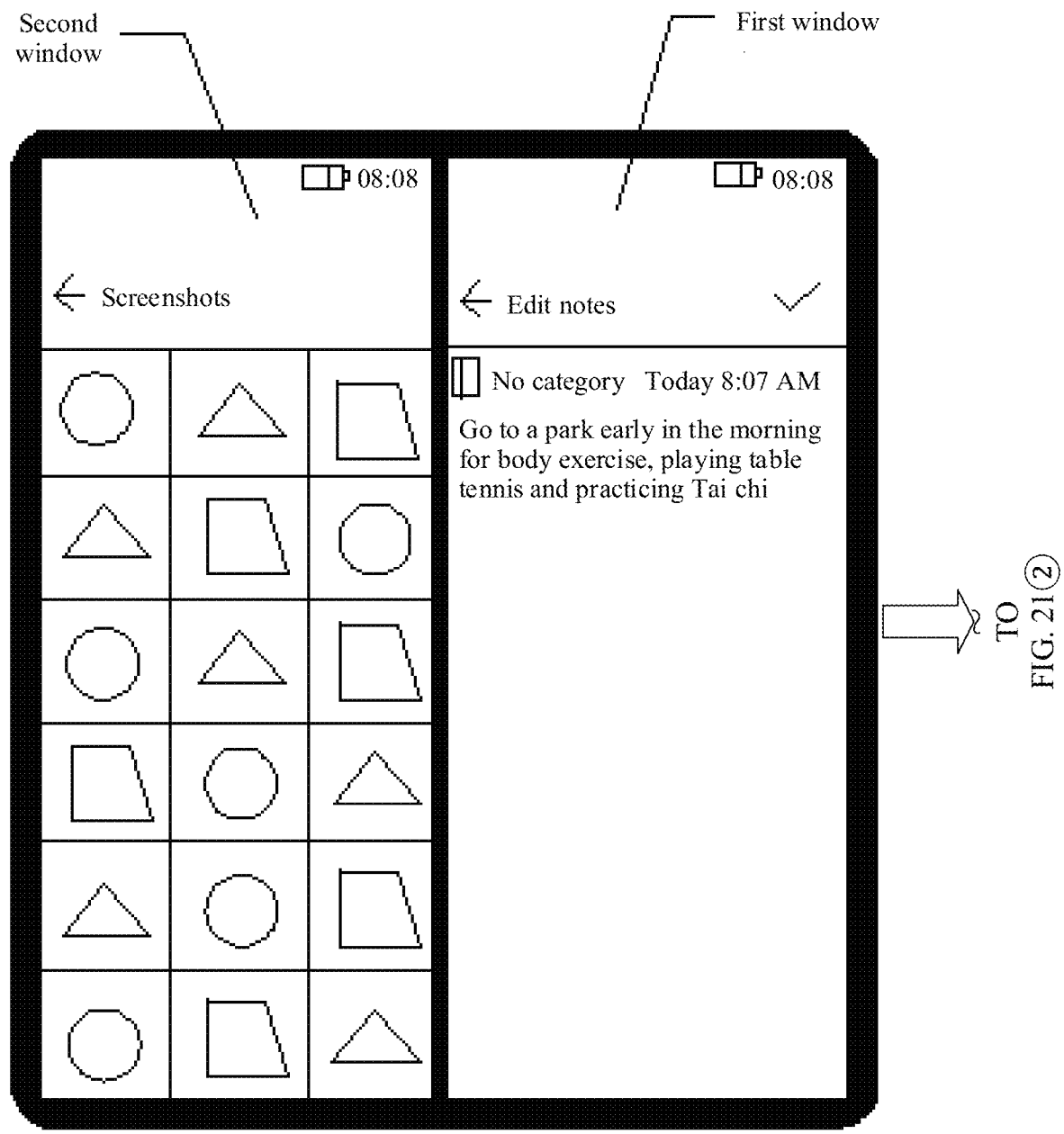
FIG. 21①

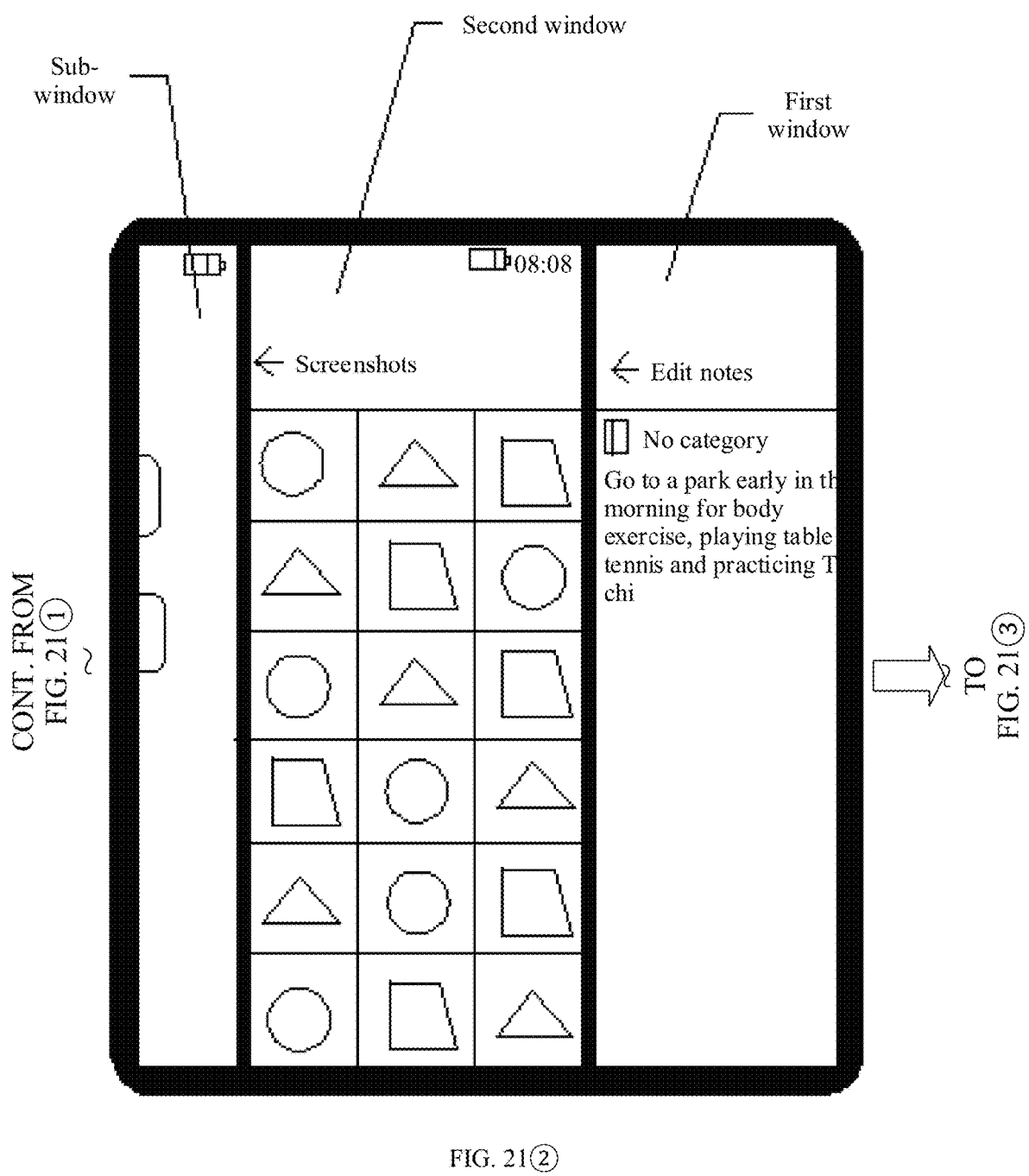
FIG. 21②

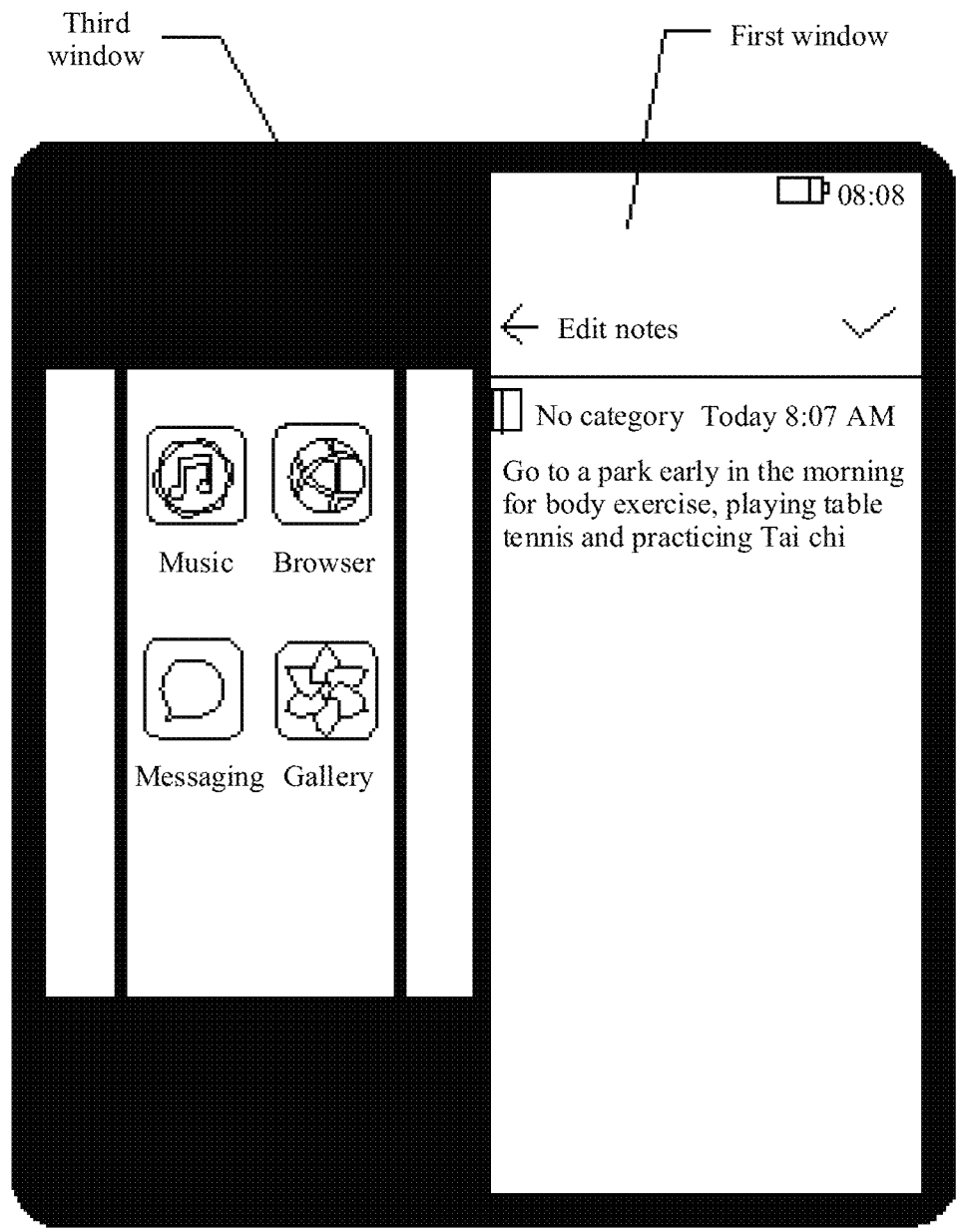
FIG. 21③

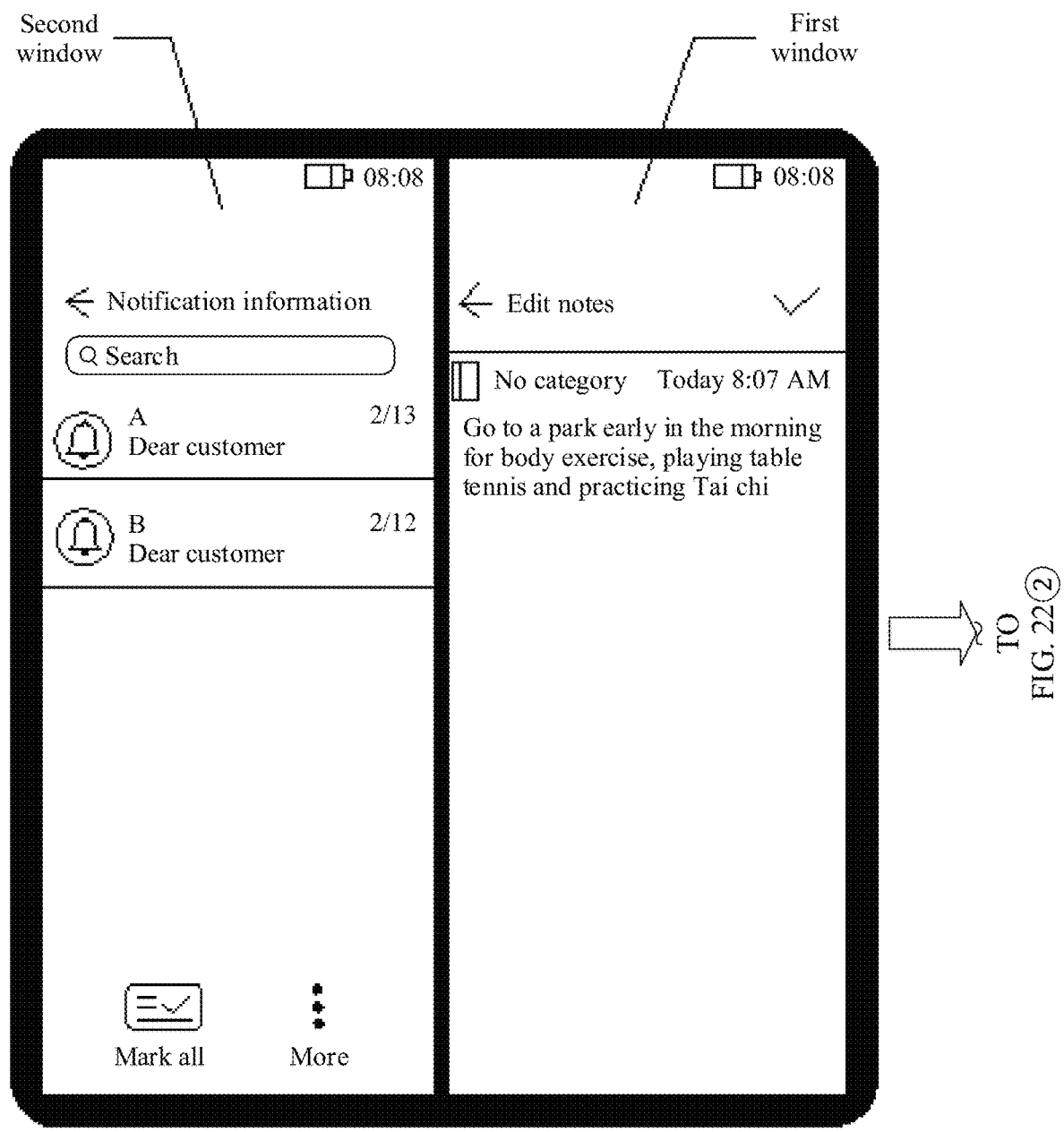
FIG. 22①

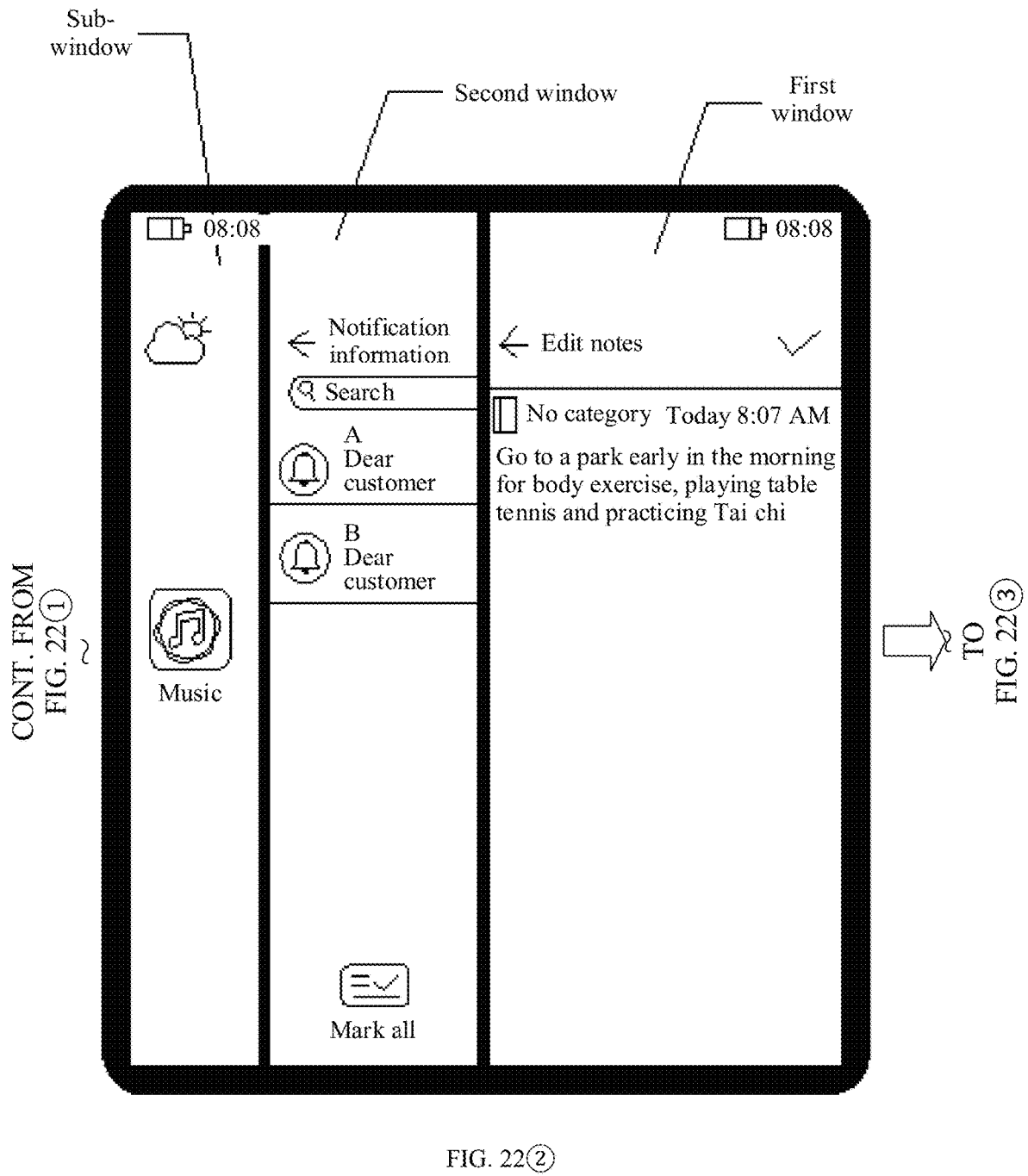
FIG. 22②

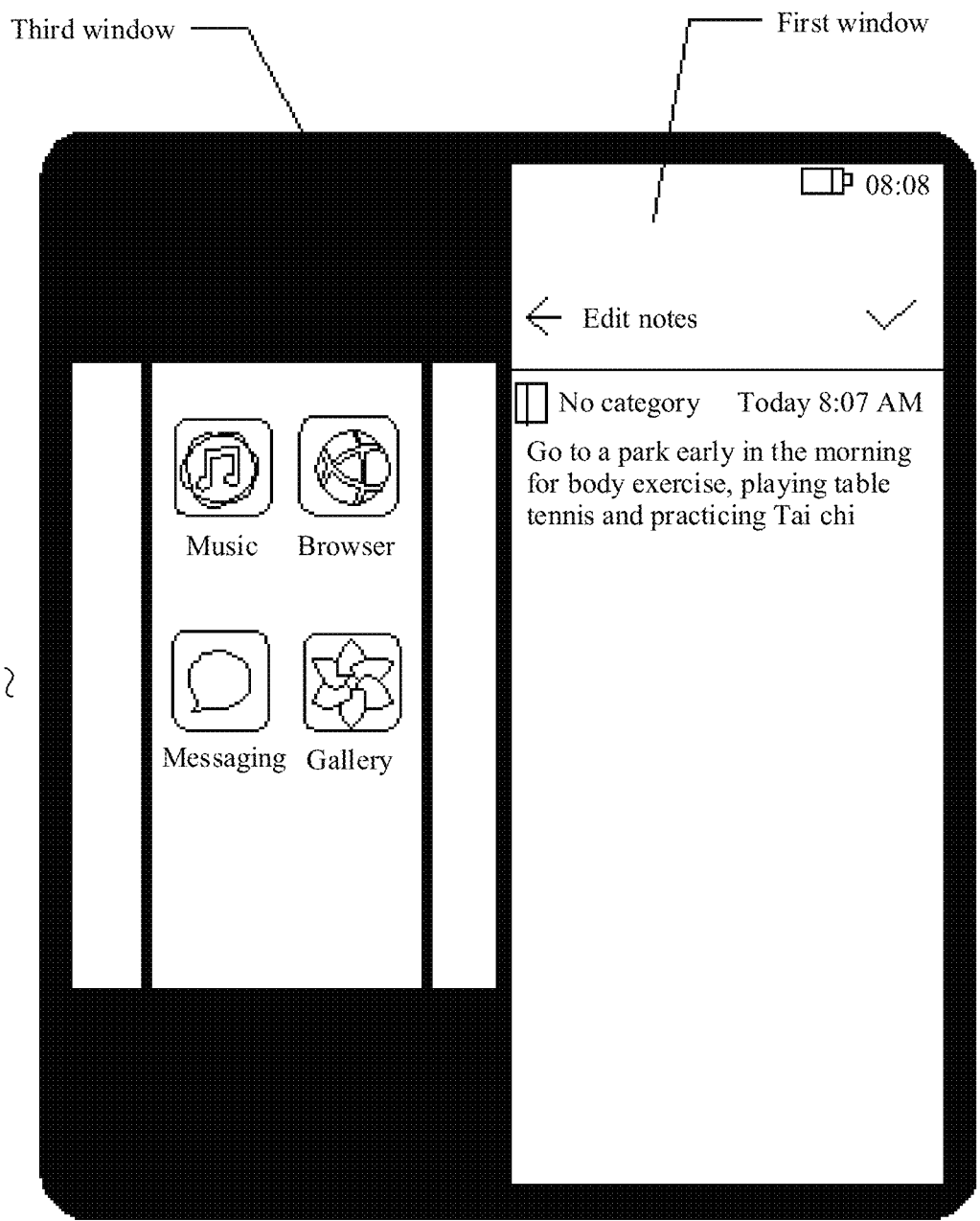
FIG. 22③

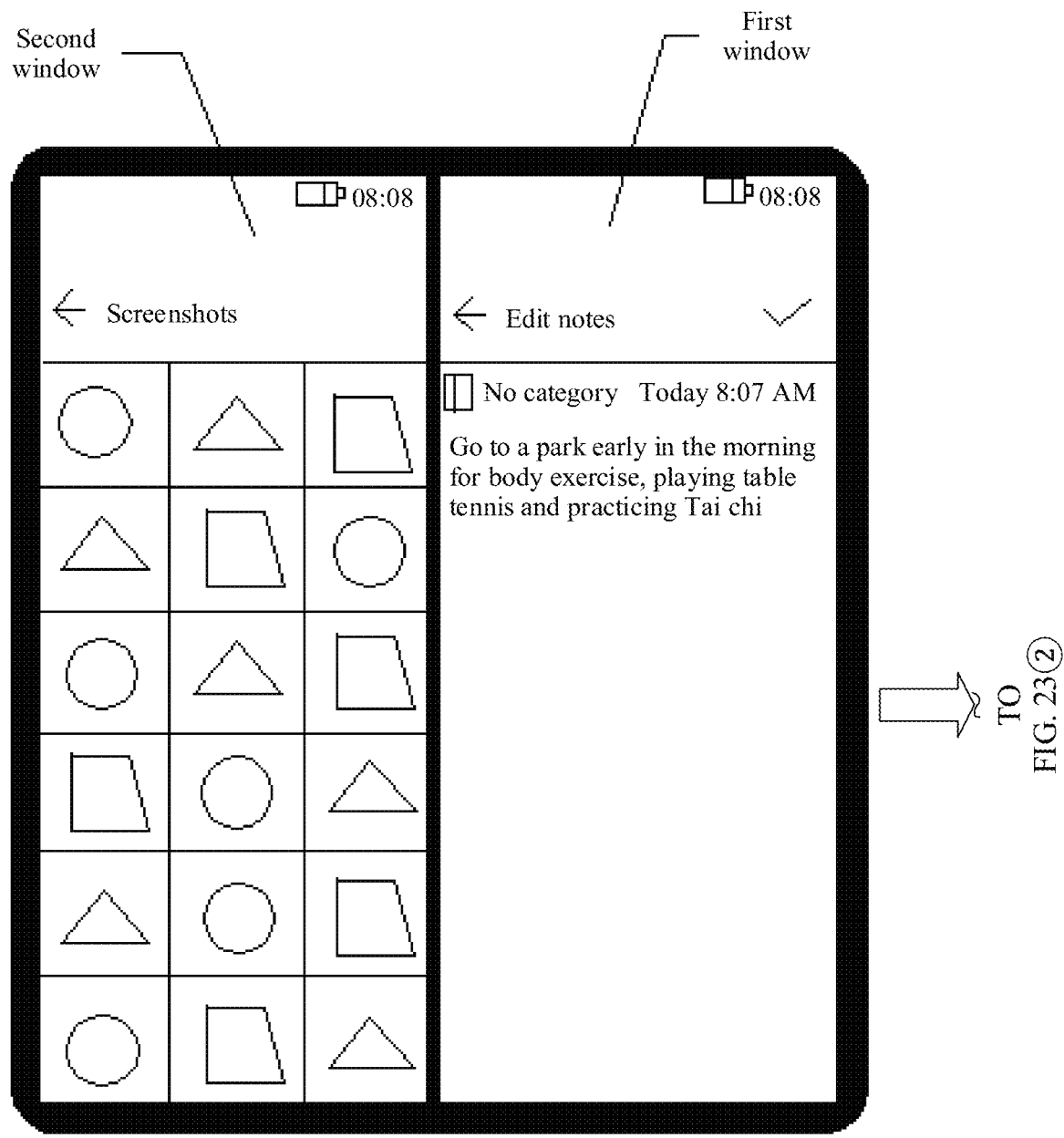
FIG. 23①

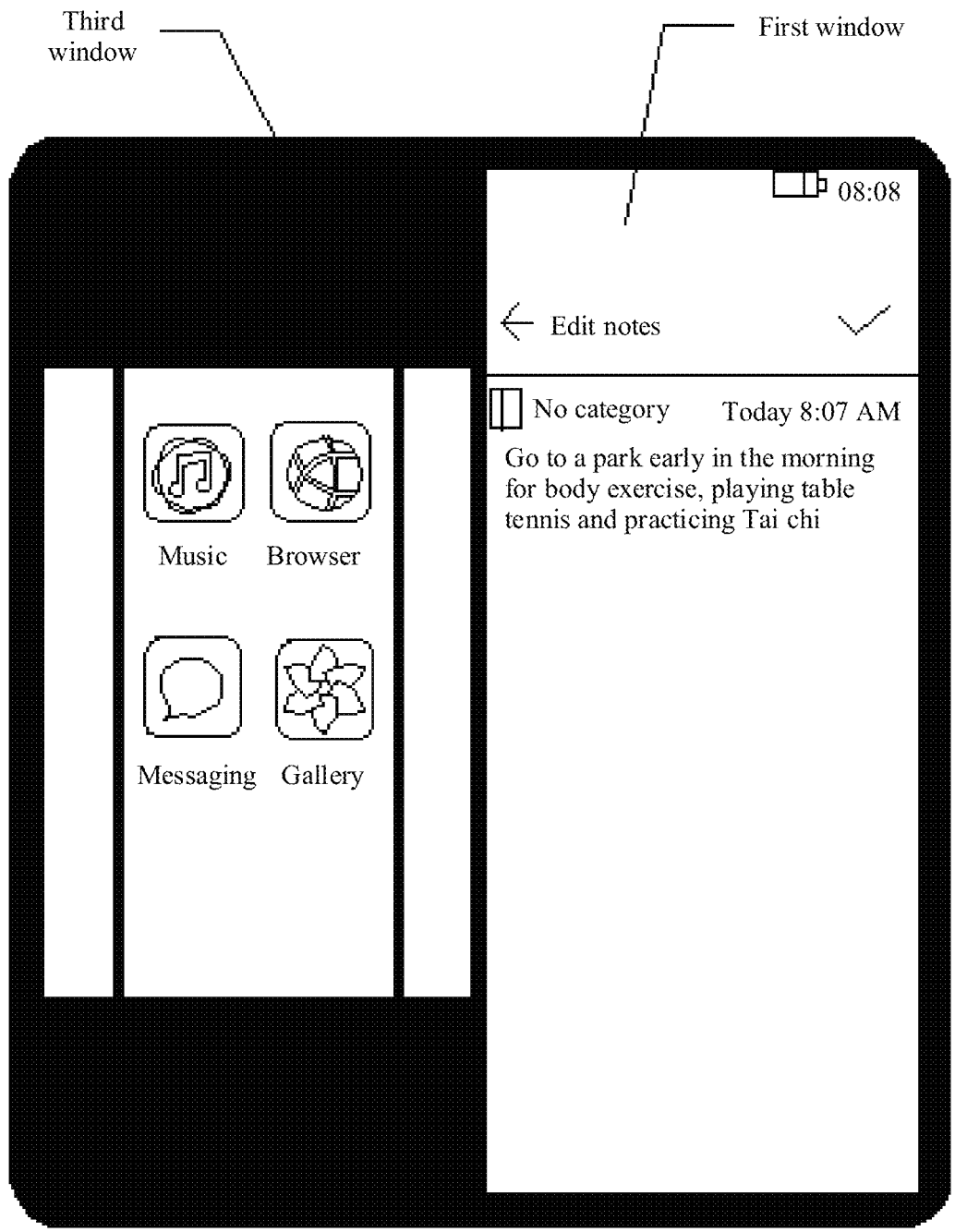
FIG. 23②

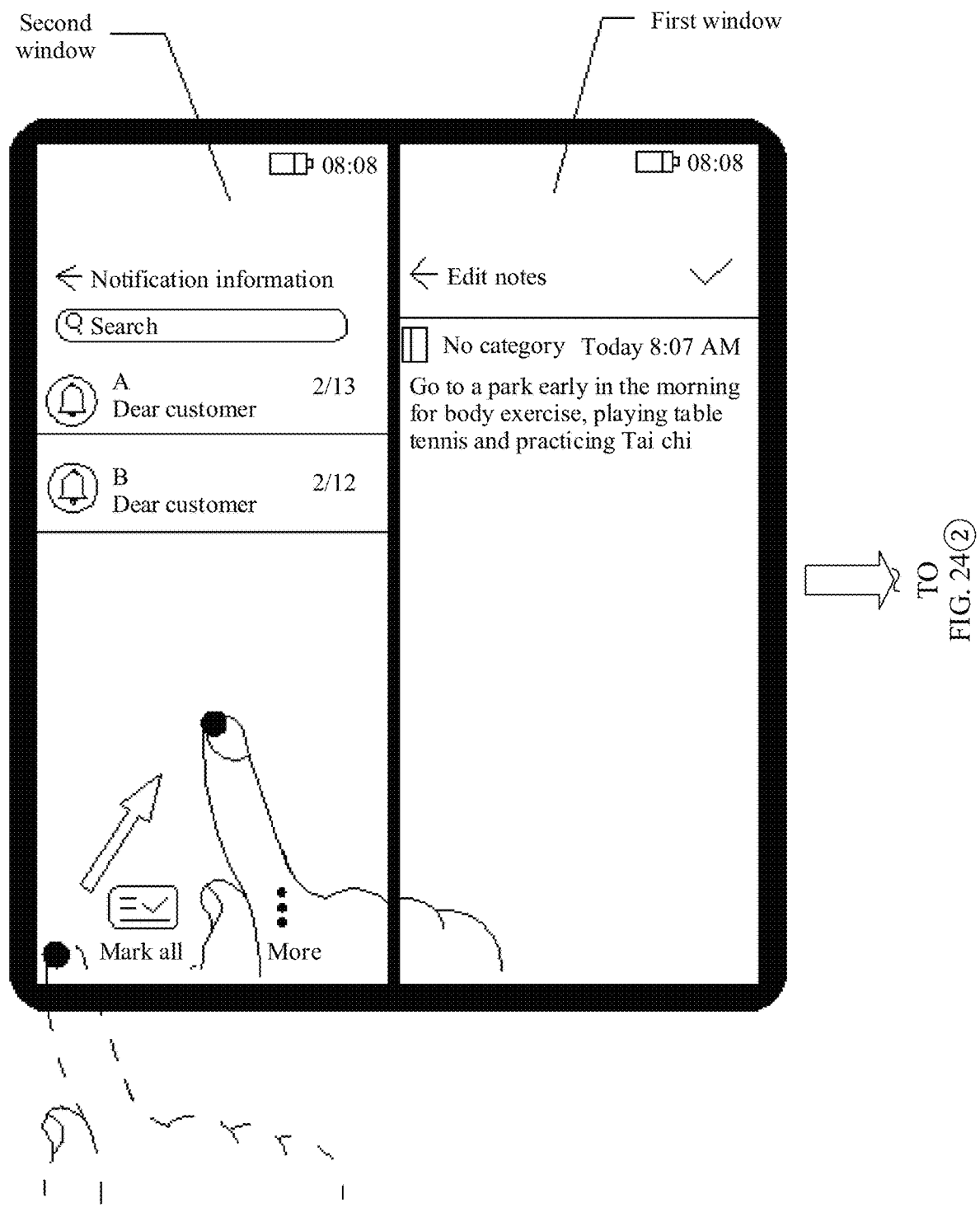
FIG. 24①

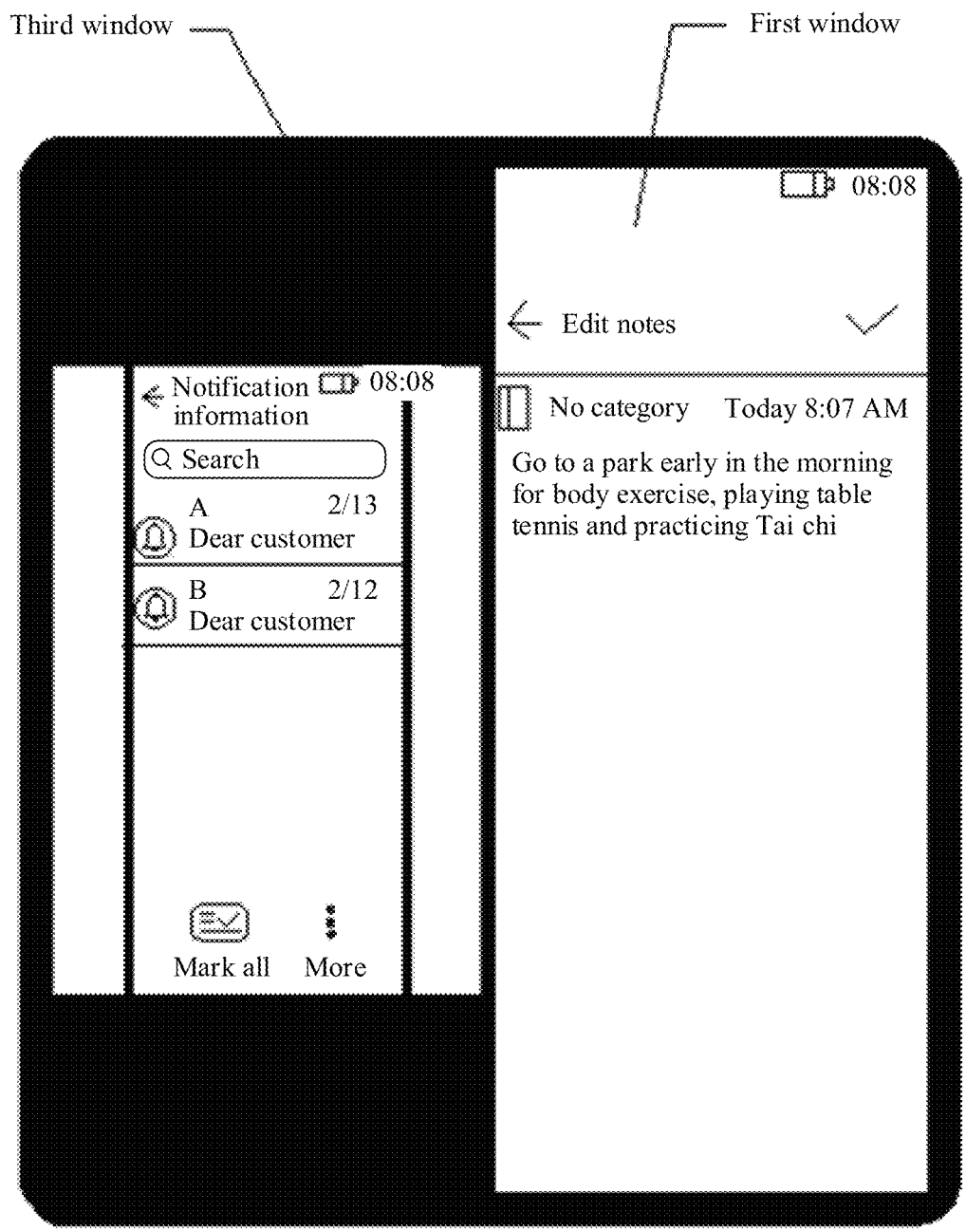
FIG. 24②

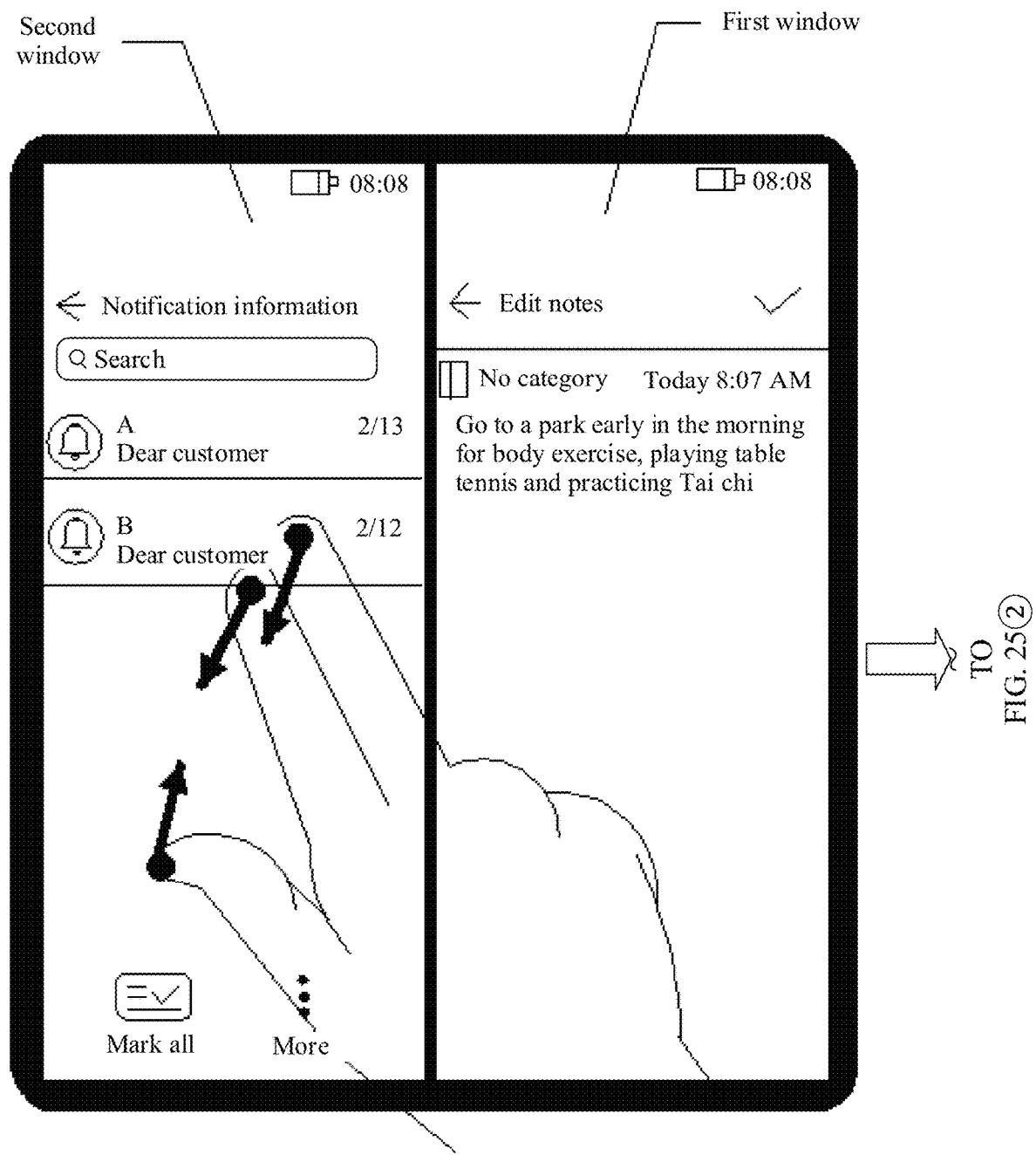
FIG. 25①

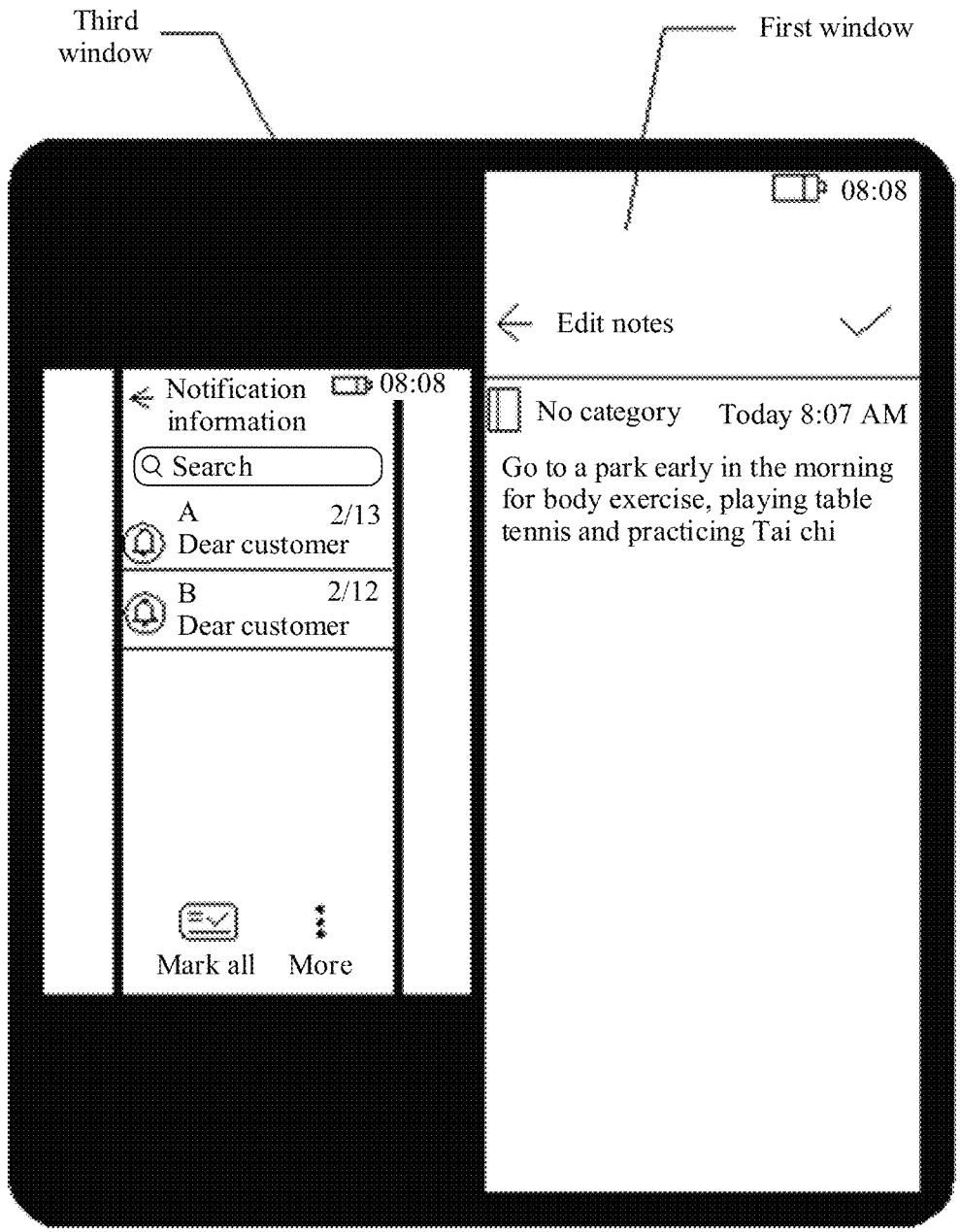
FIG. 25②

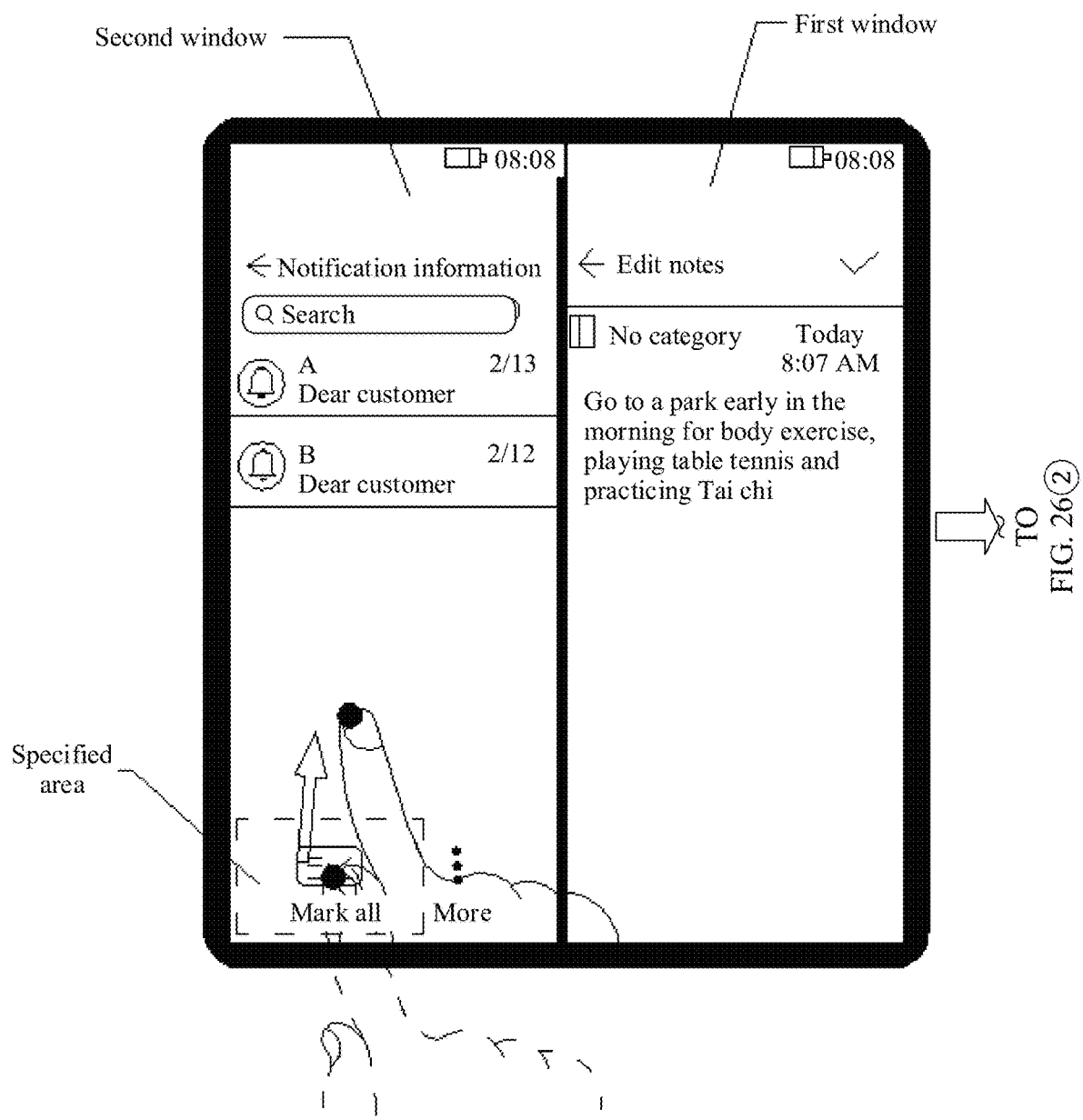
FIG. 26①

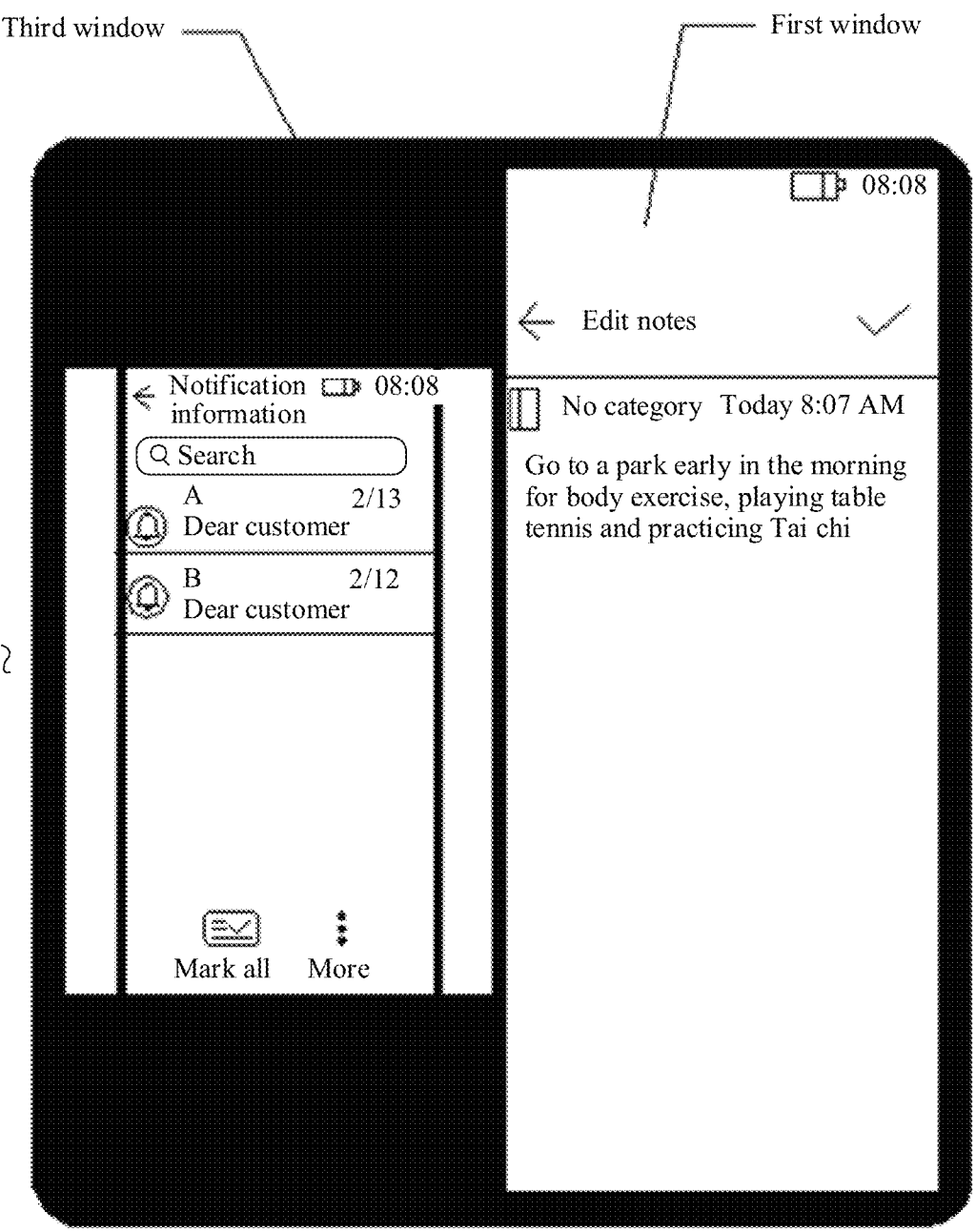
FIG. 26②

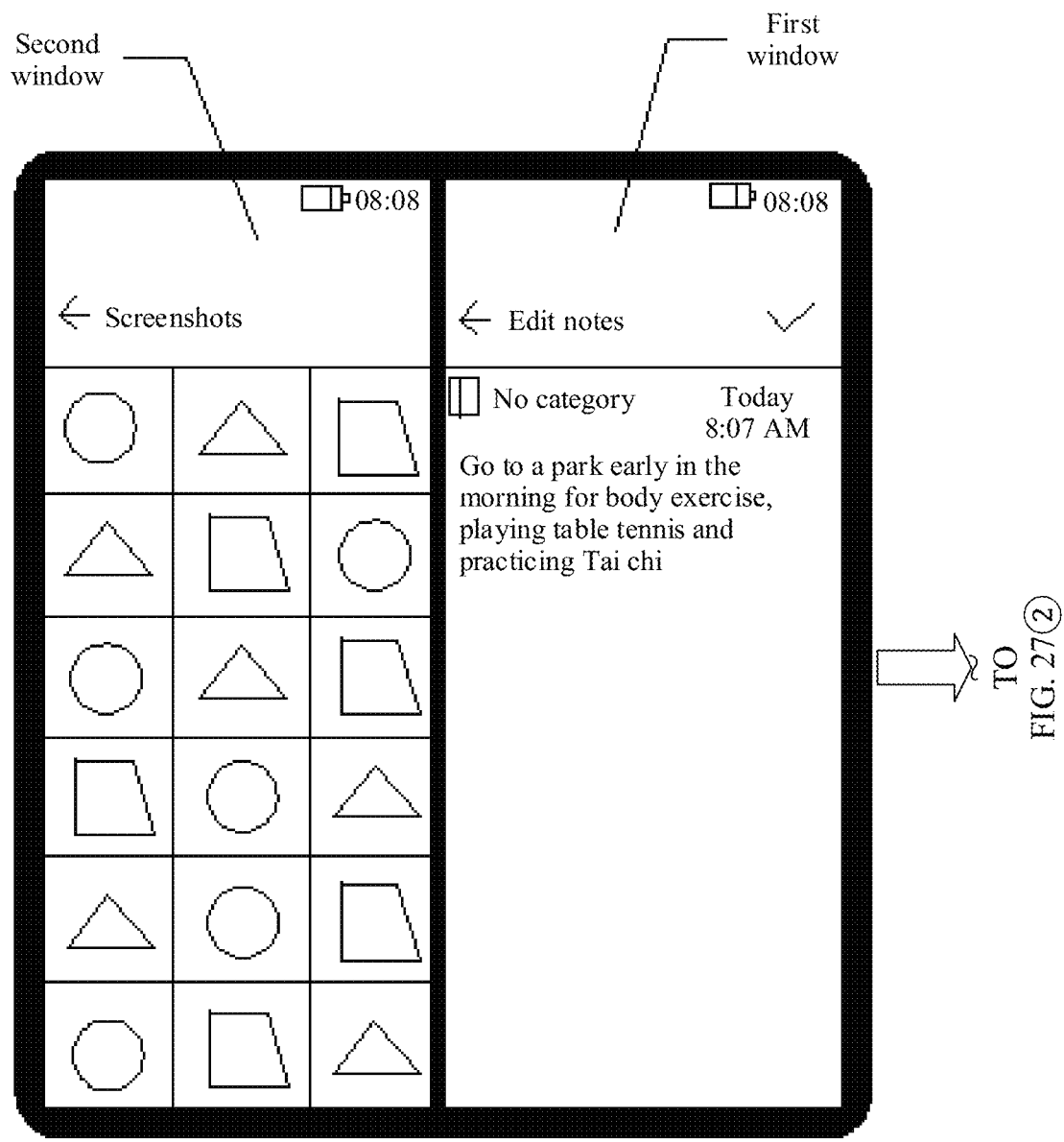
FIG. 27①

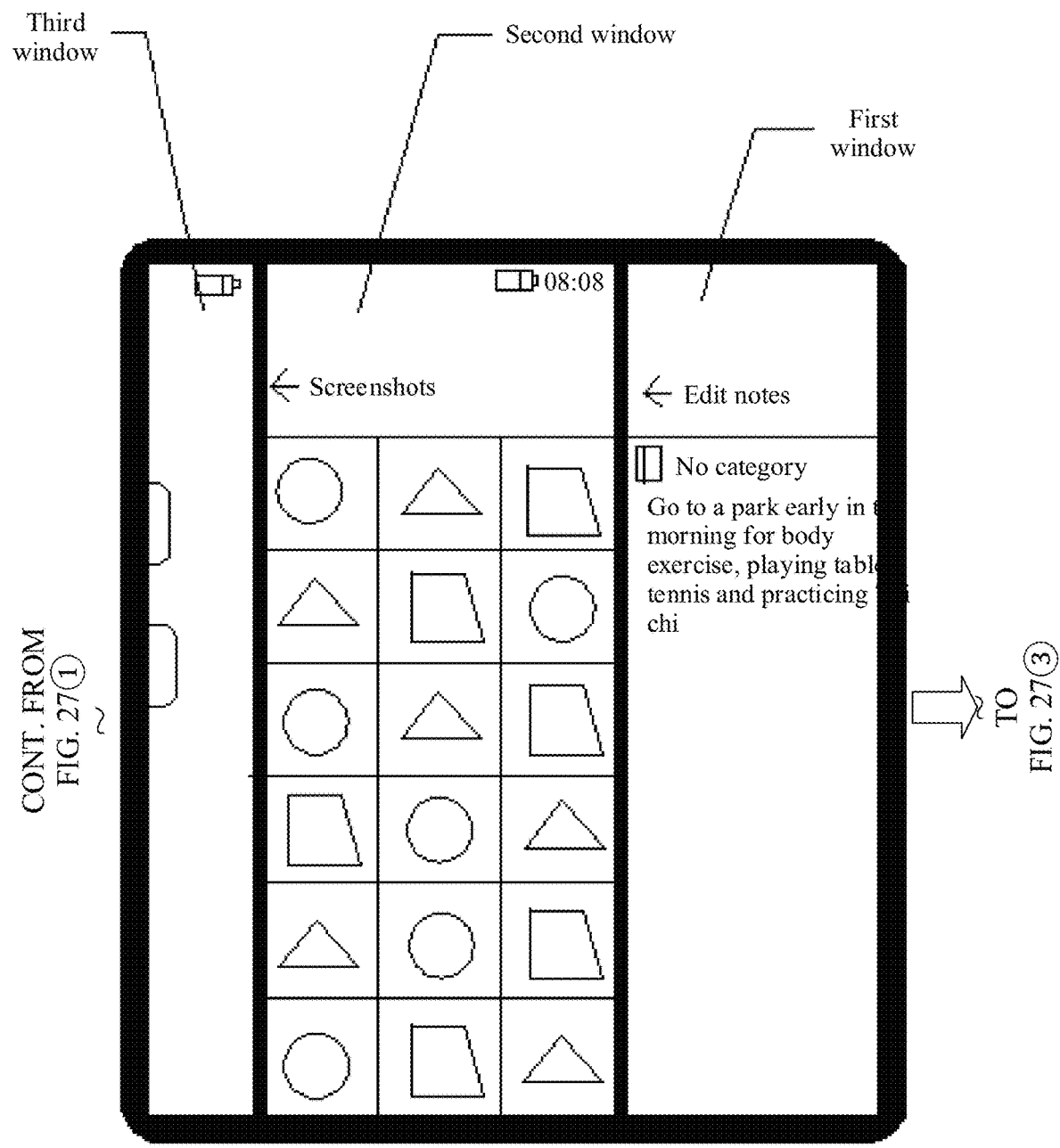
FIG. 27②

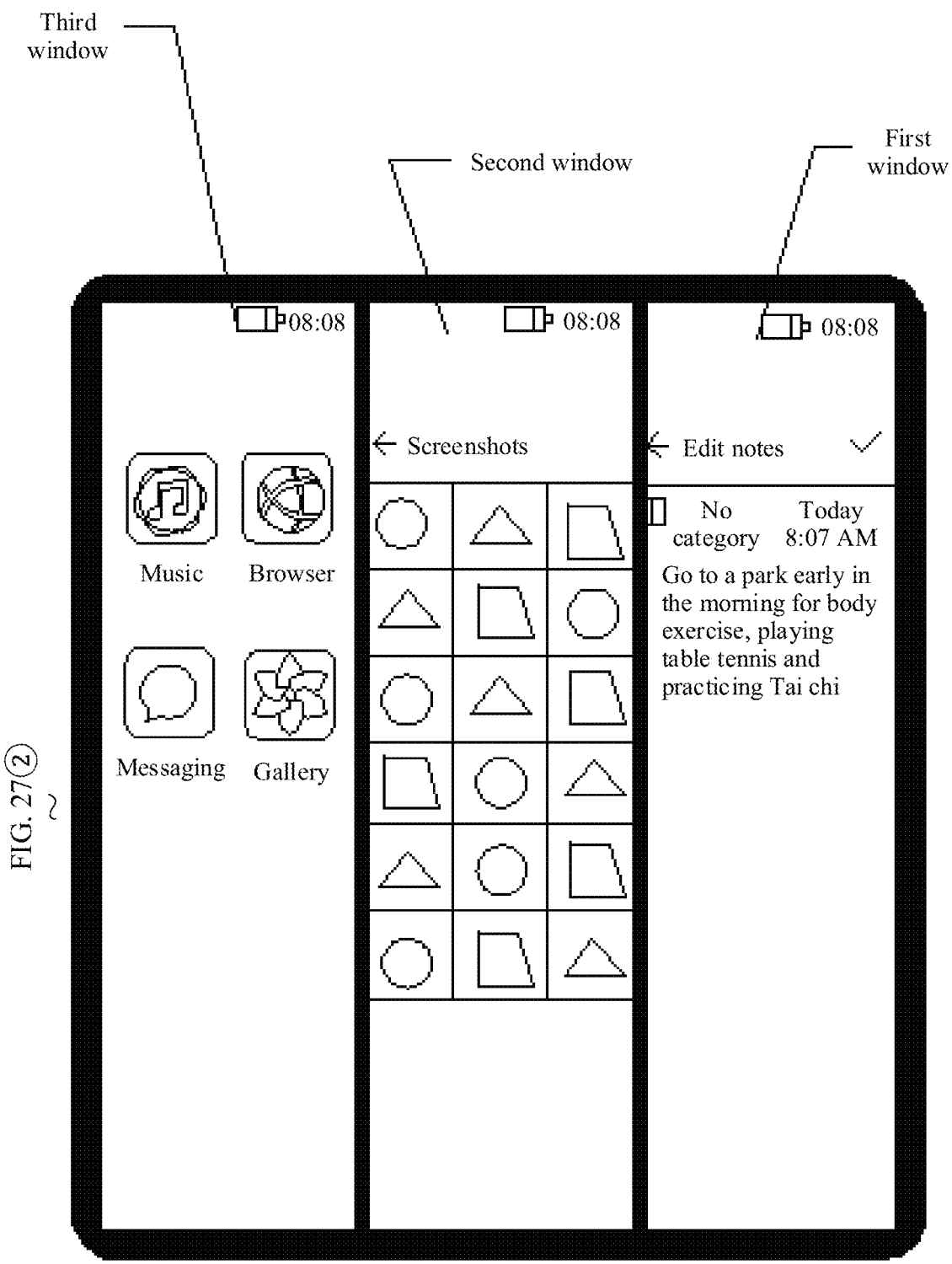
FIG. 27③

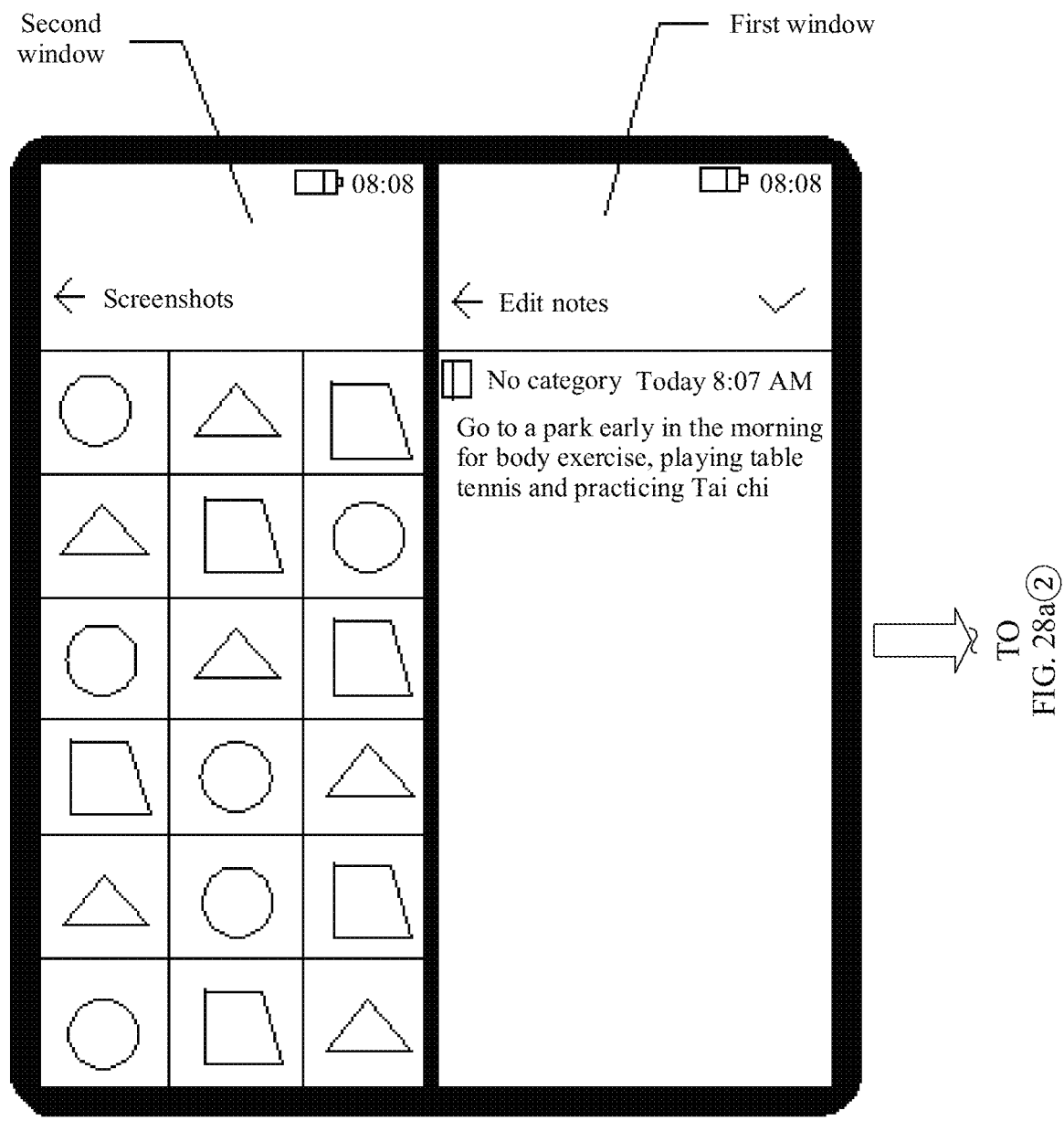
FIG. 28a(1)

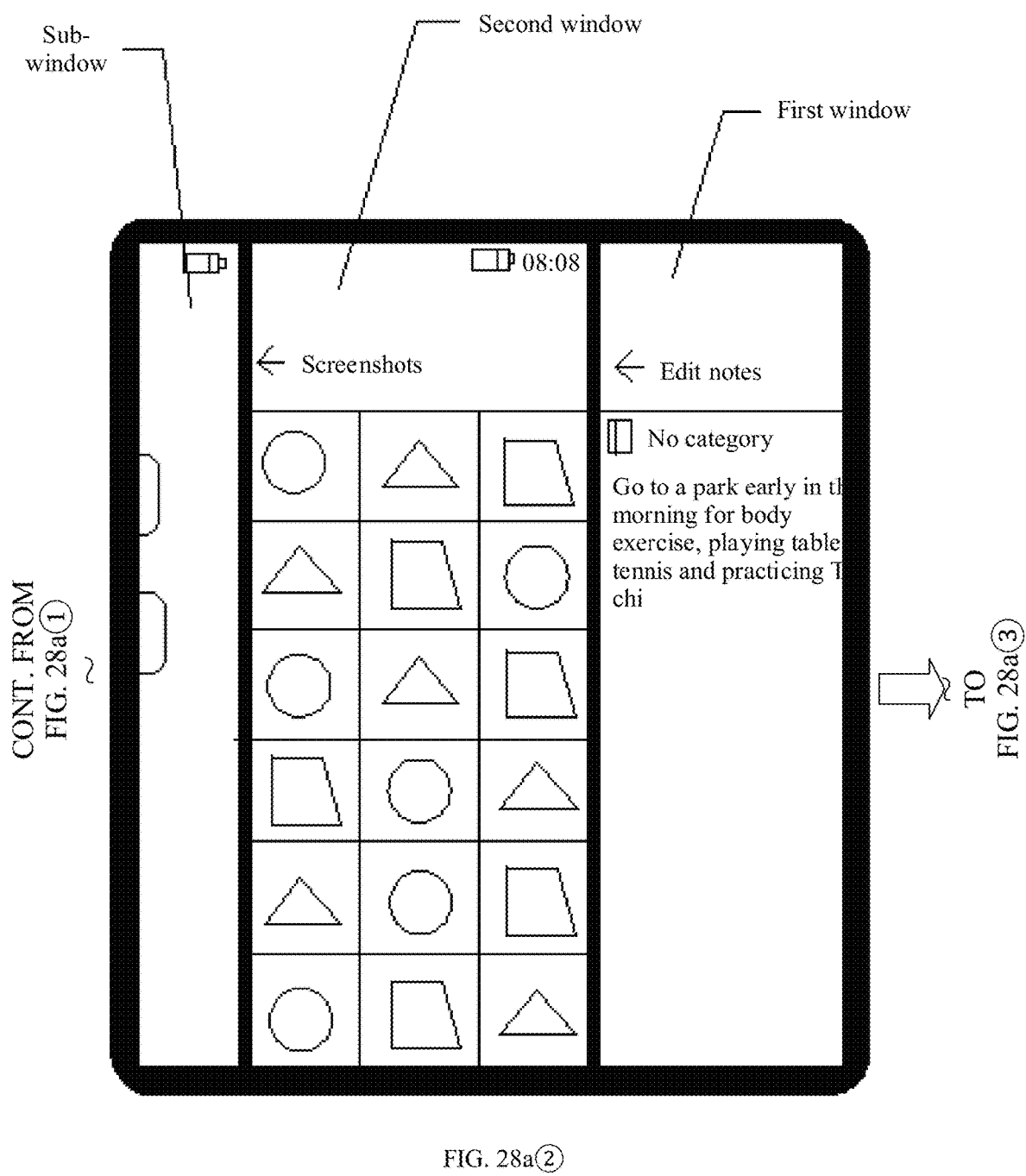
FIG. 28a(2)

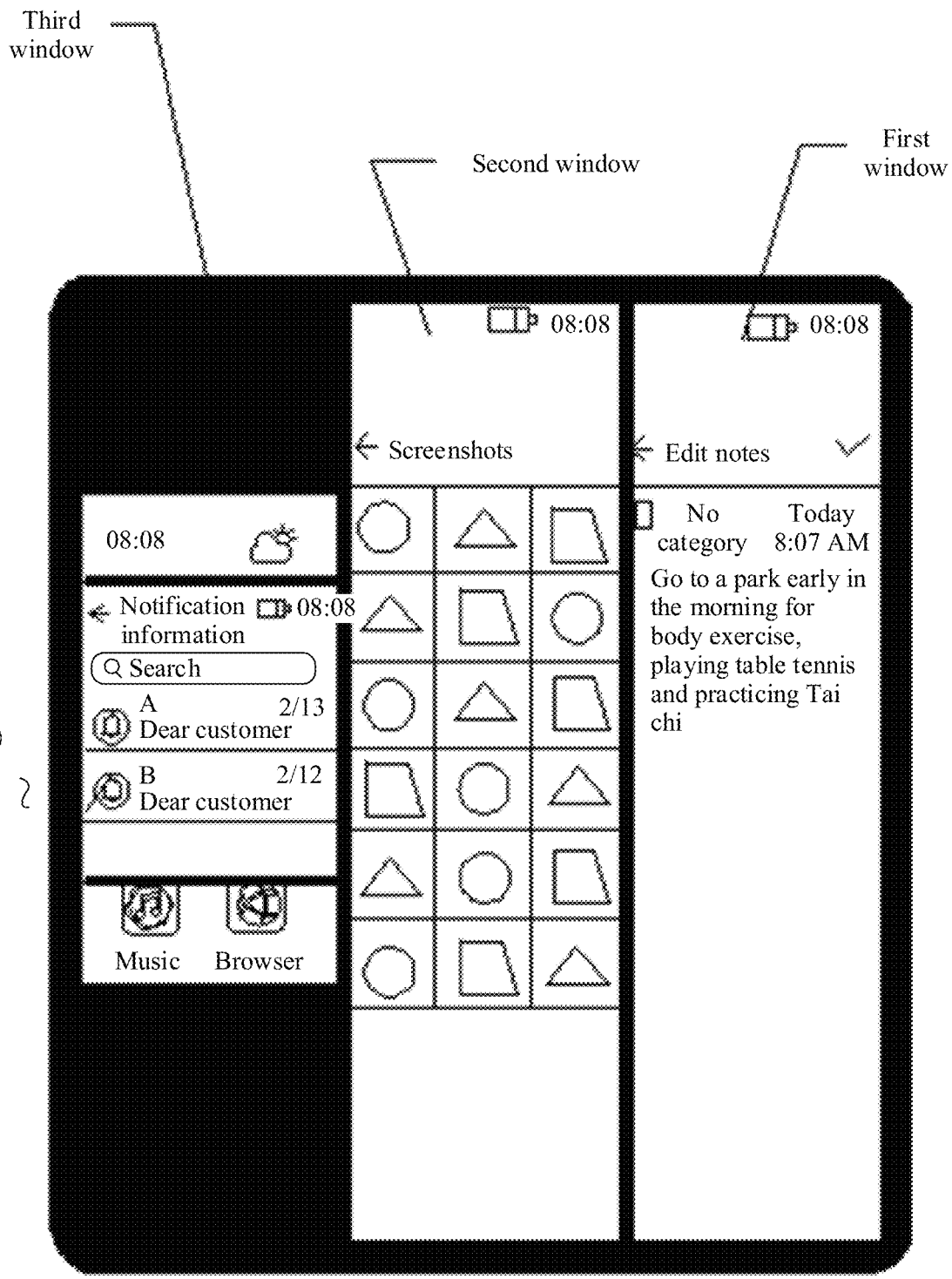
FIG. 28a(3)

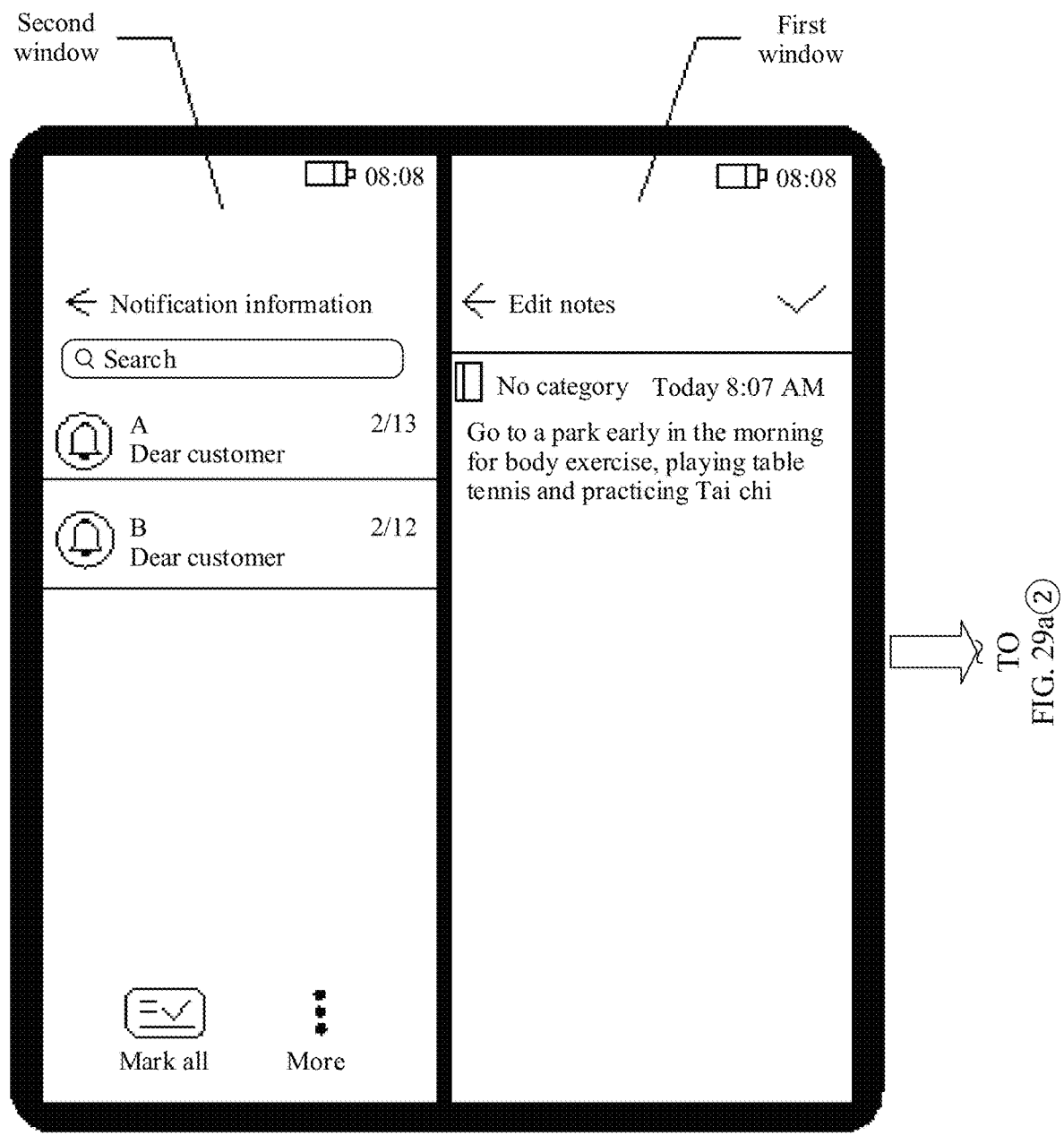
FIG. 29a①

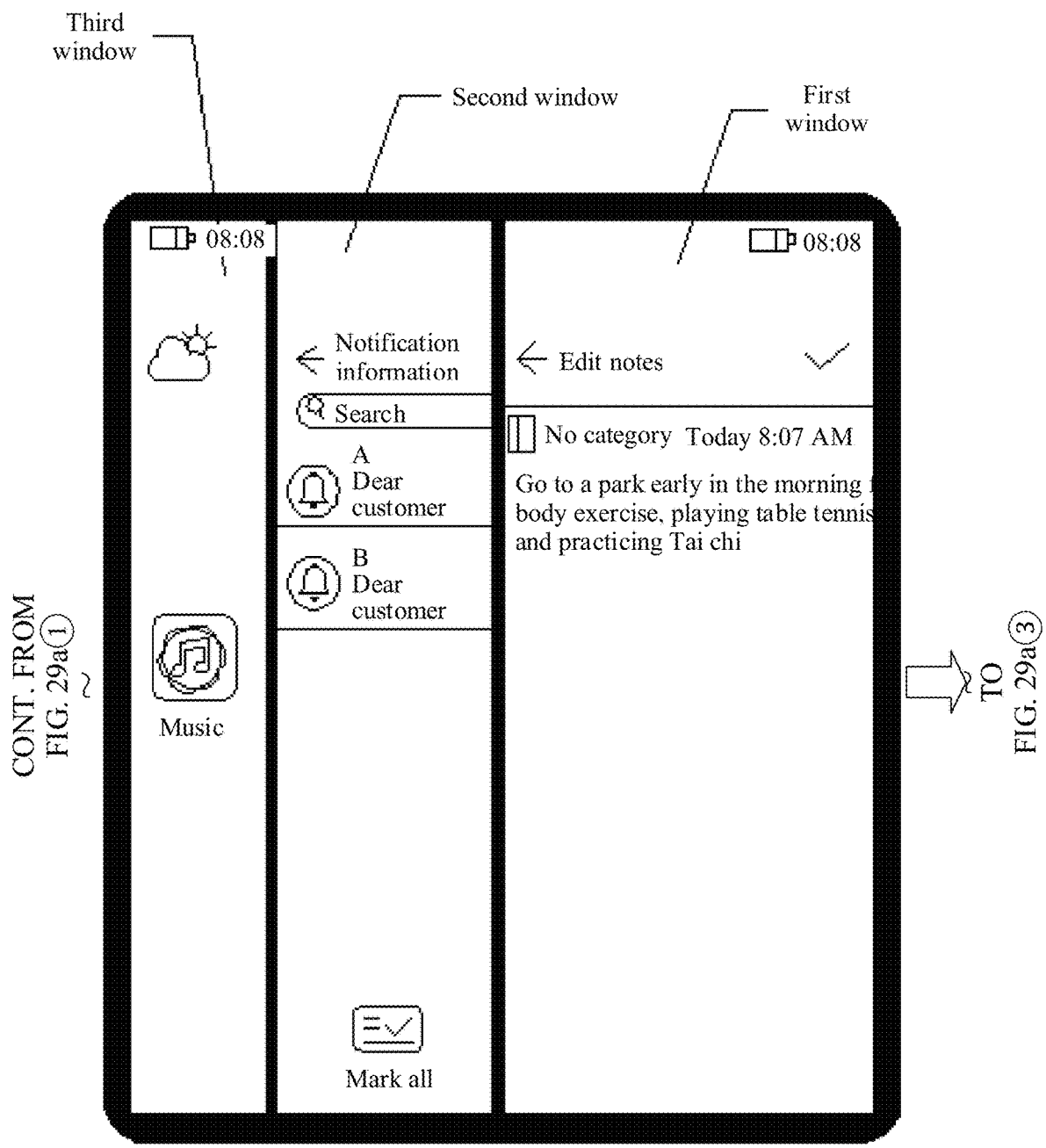
FIG. 29a(2)

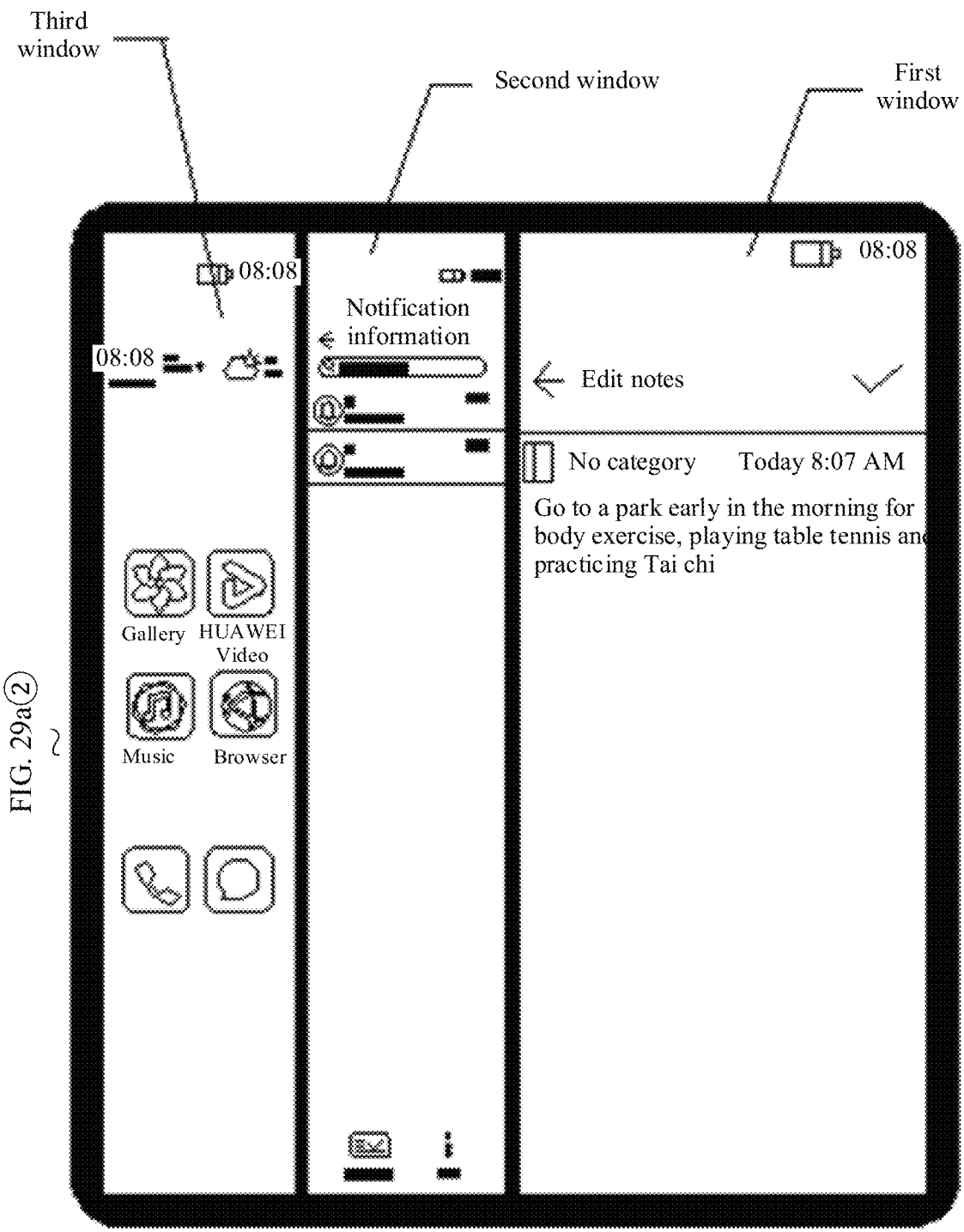
FIG. 29a(3)

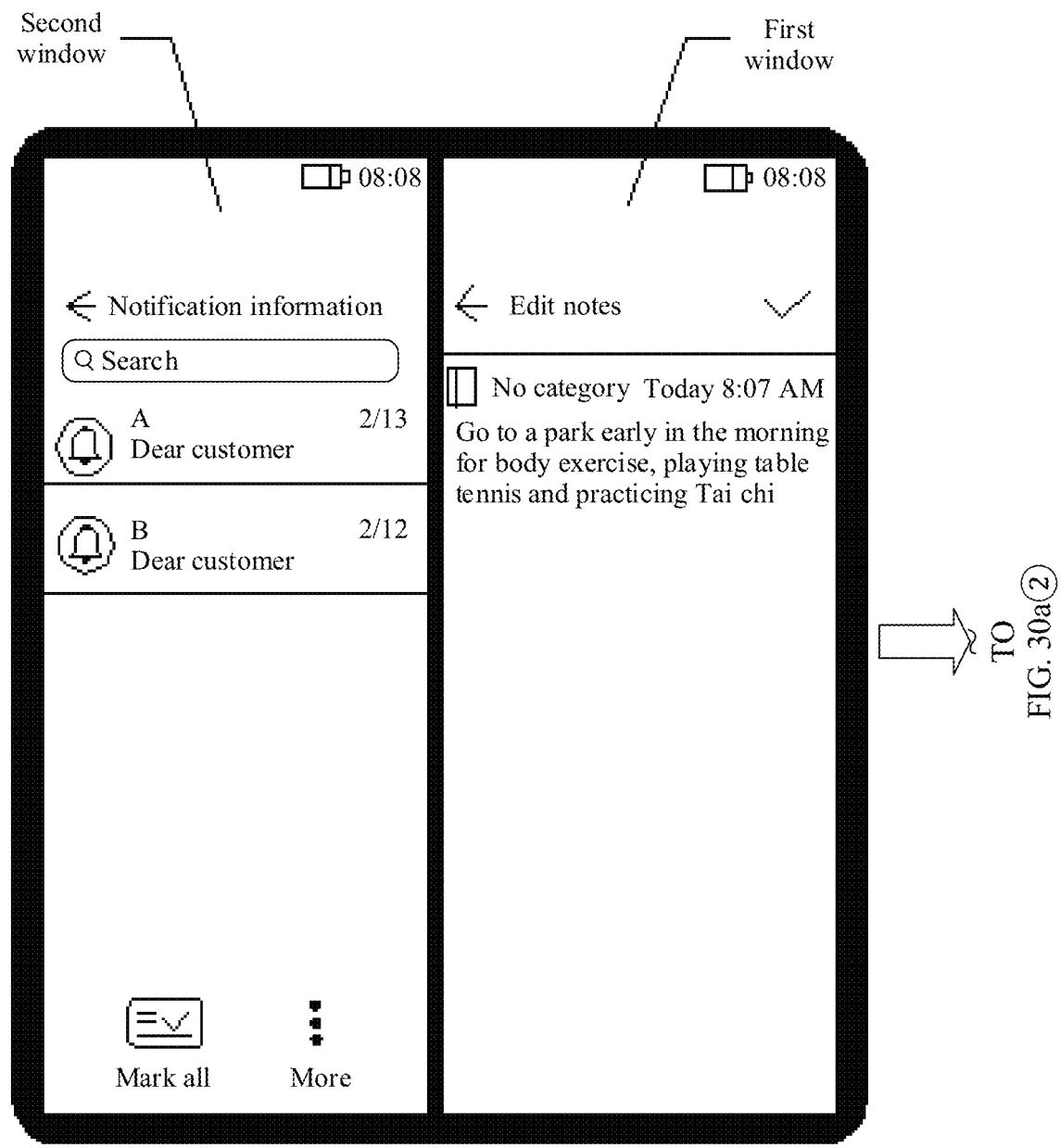
FIG. 30a(1)

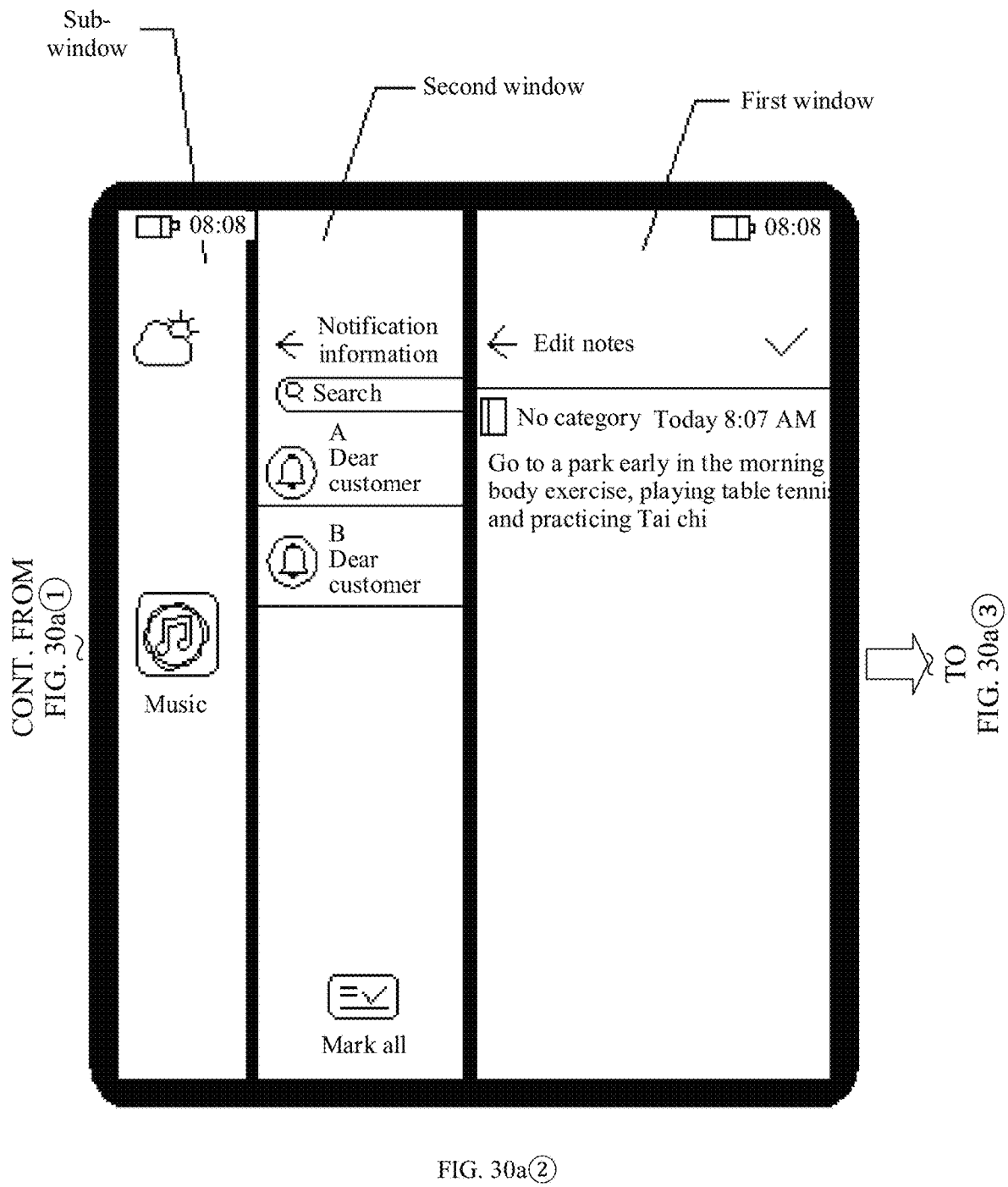
FIG. 30a②

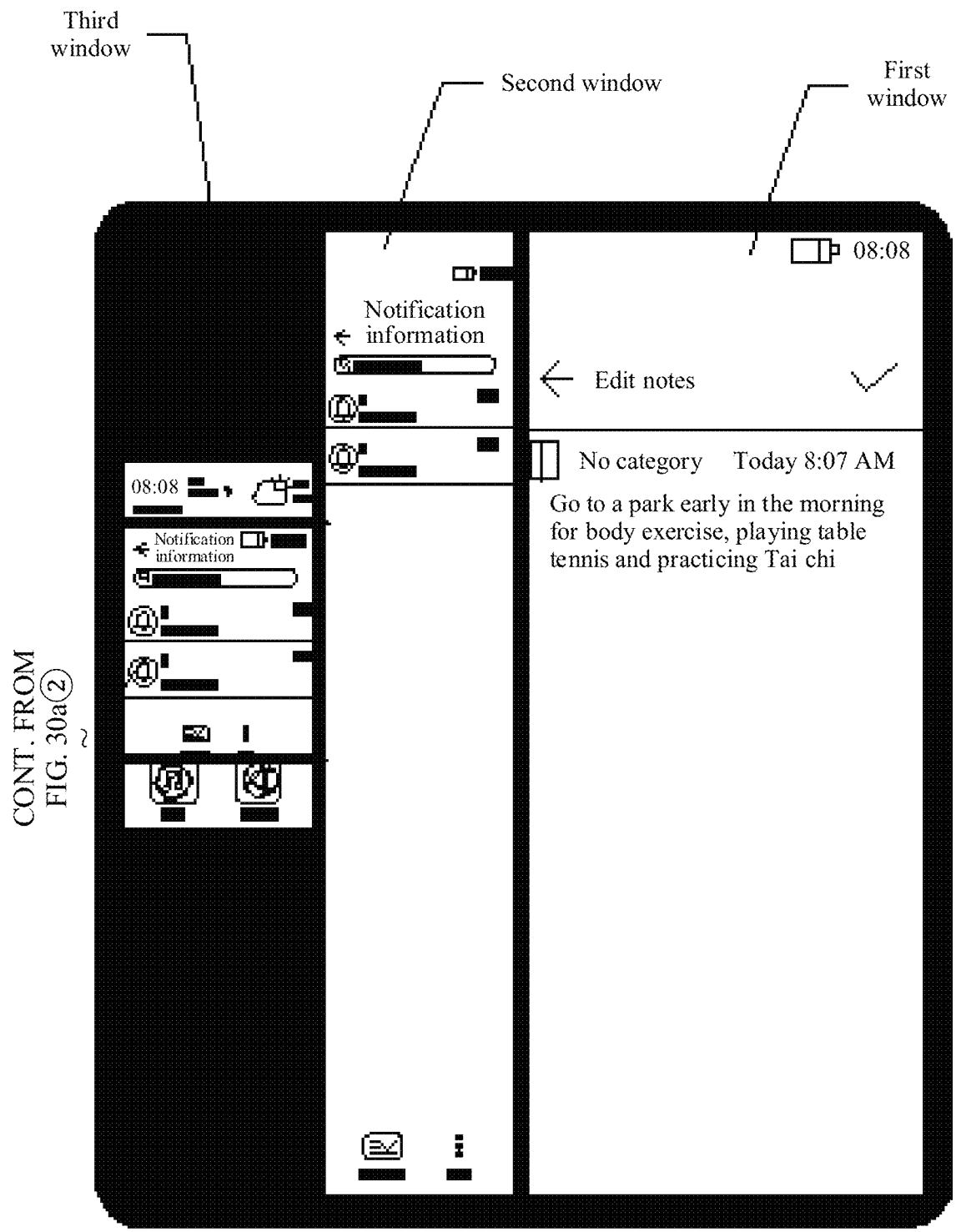
FIG. 30a(3)

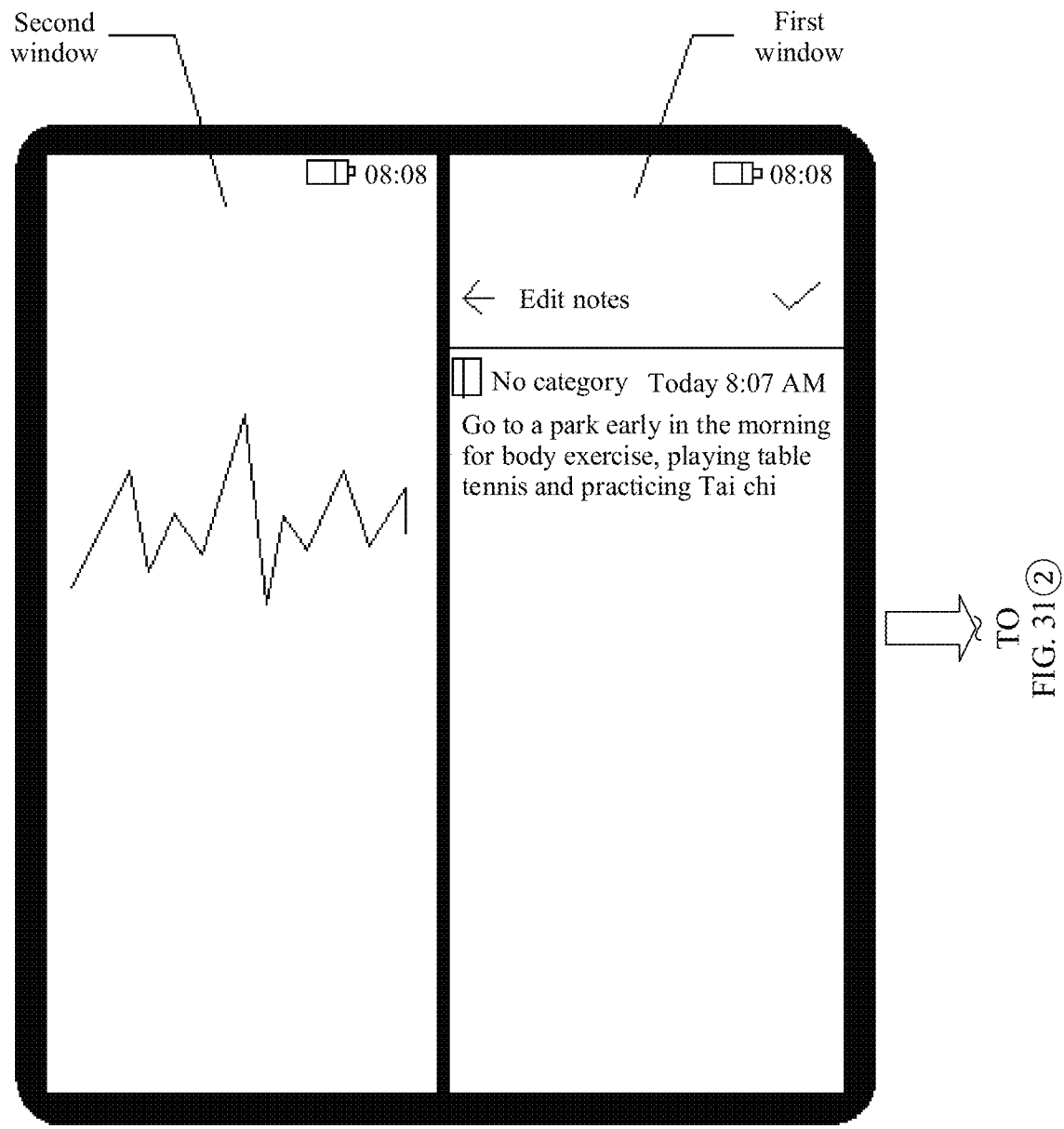
FIG. 31①

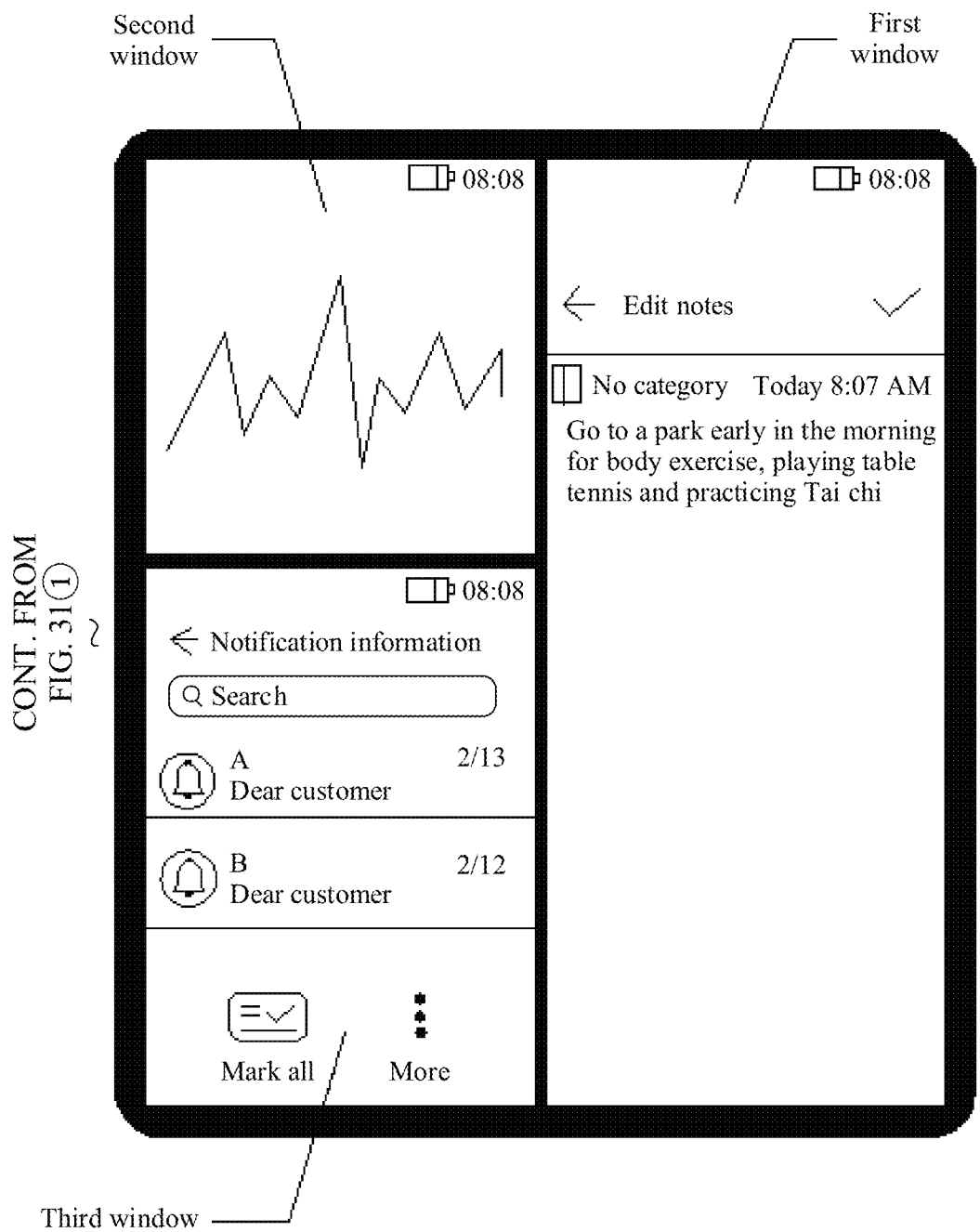
FIG. 31②

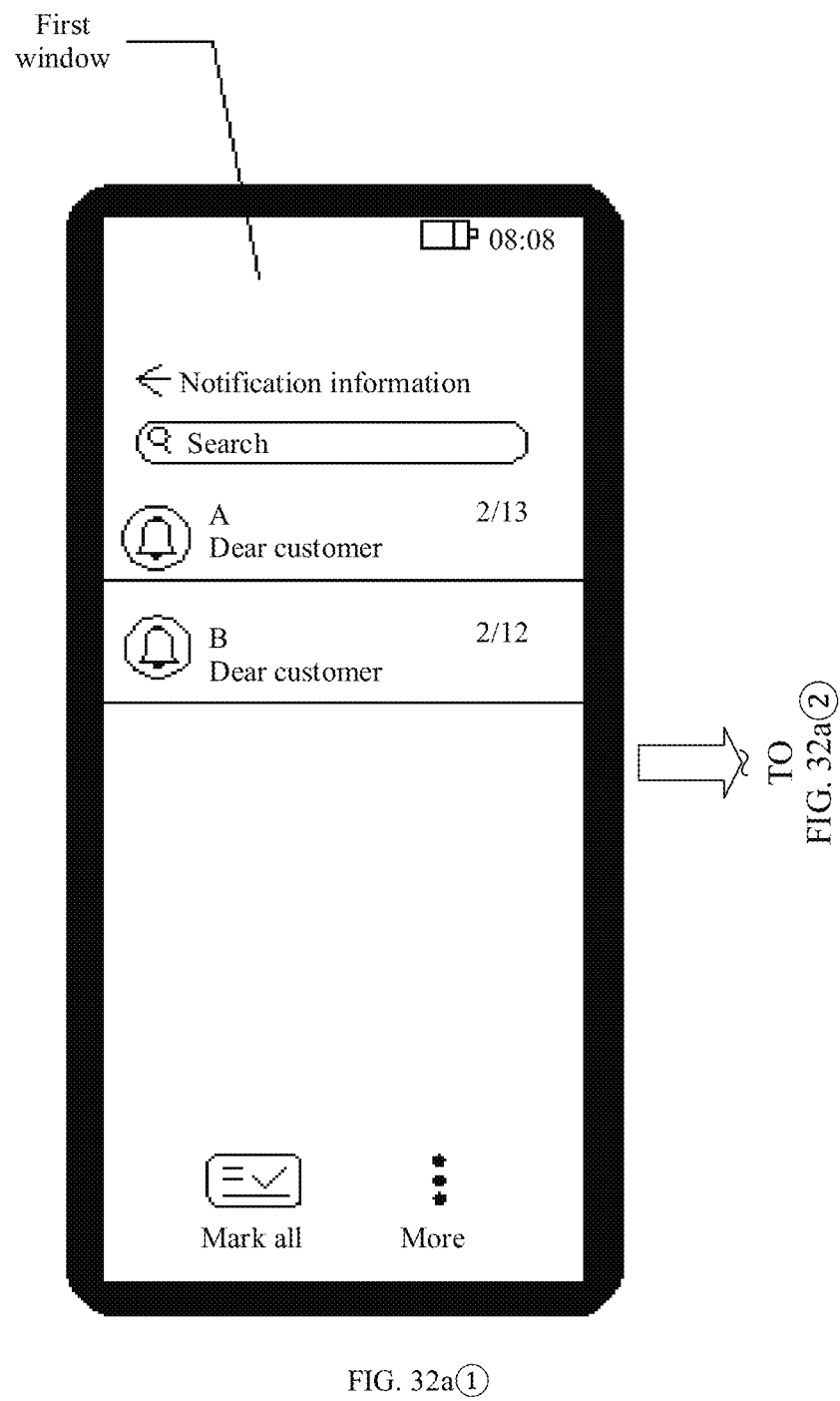
FIG. 32a①

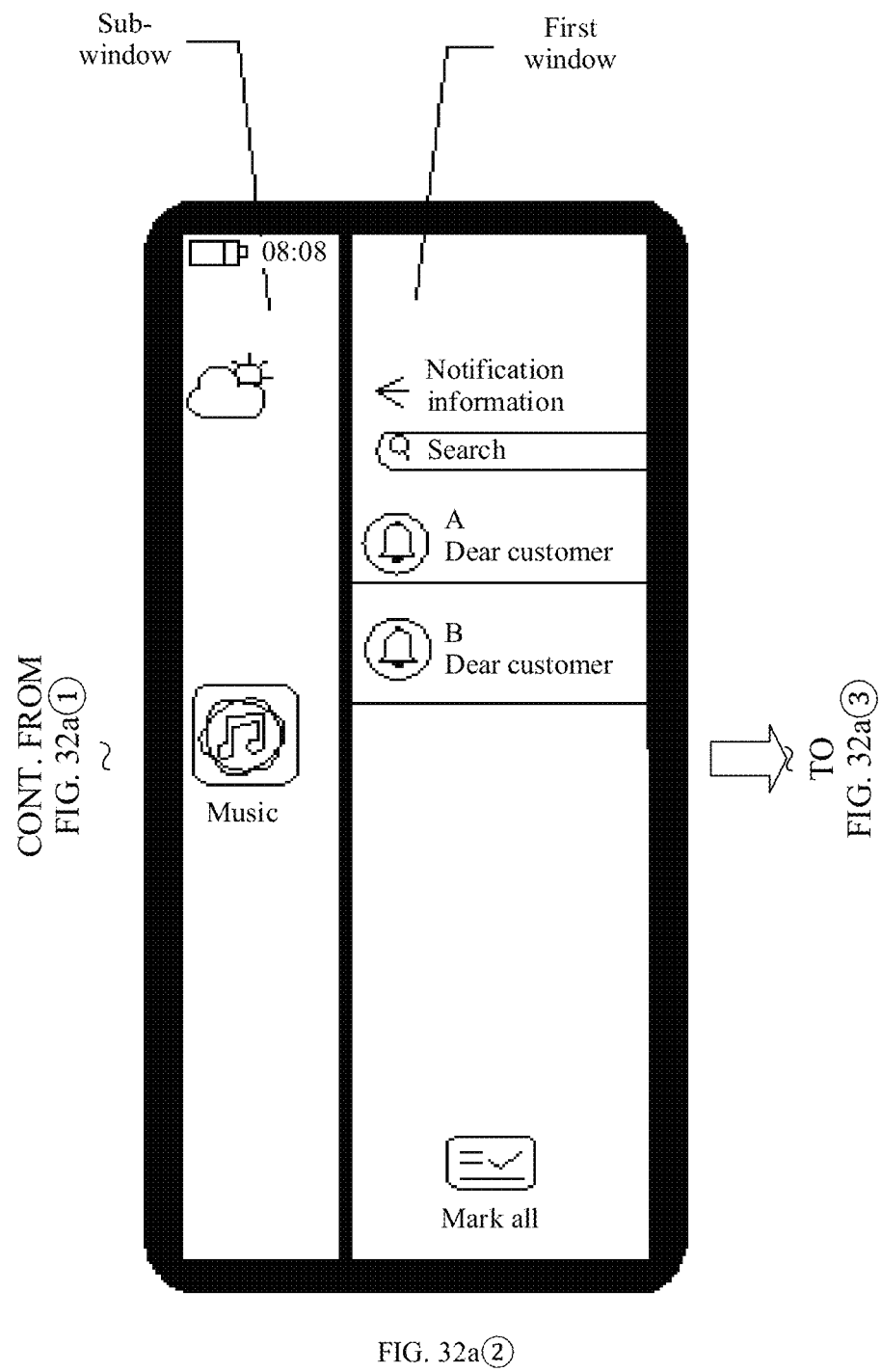
FIG. 32a(2)

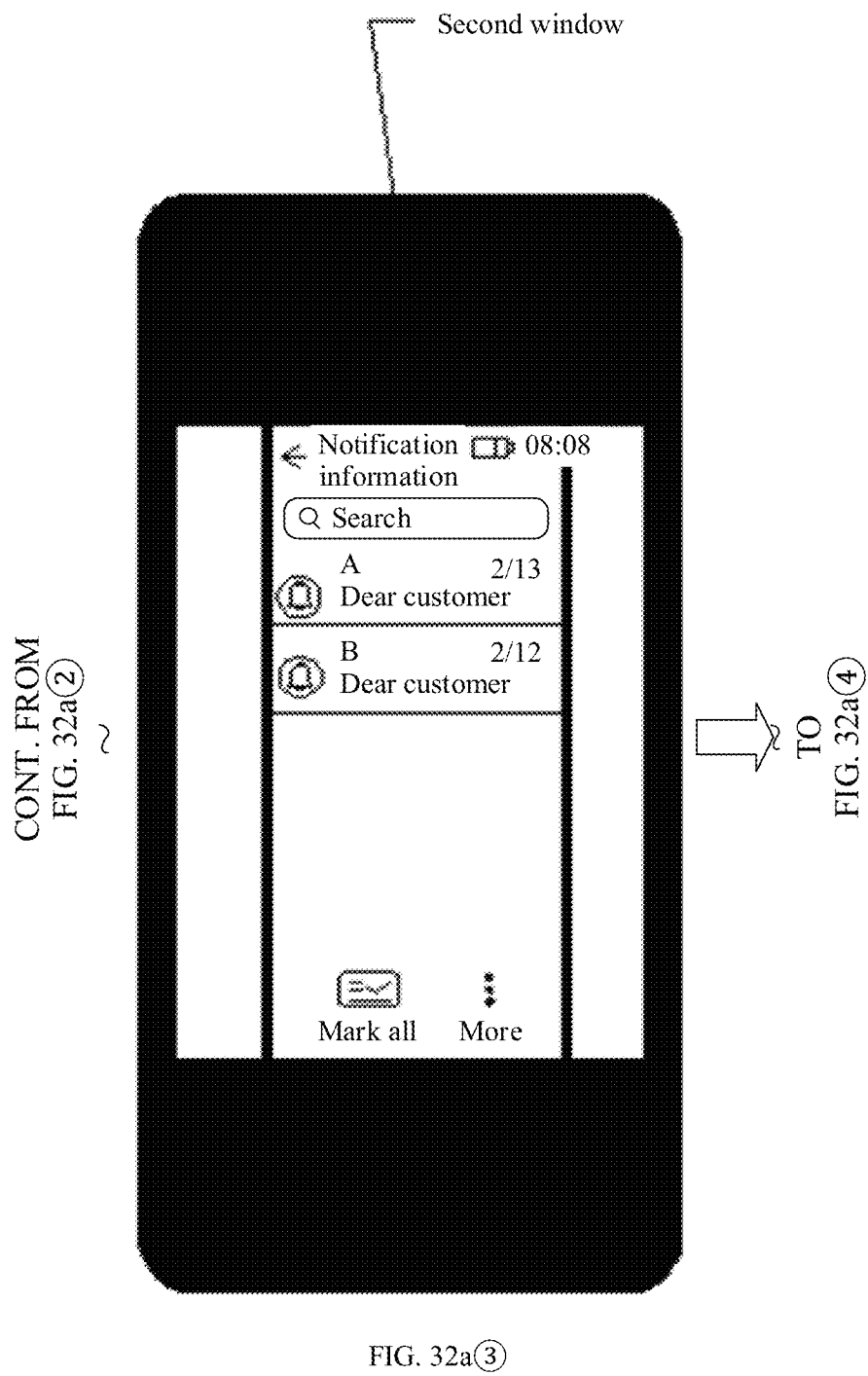
FIG. 32a(3)

FIG. 32a(4)

METHOD FOR DISPLAYING A PLURALITY OF WINDOWS IN SPLIT-SCREEN MANNER, AND ELECTRONIC DEVICE

CROSS-REFERENCE TO RELATED APPLICATIONS

This application is a continuation of U.S. patent application Ser. No. 18/004,010, filed on Dec. 30, 2022, now U.S. Pat. No. 12,039,162 B2, which is a national stage of International Application No. PCT/CN2021/103949, filed on Jul. 1, 2021, which claims priority to Chinese Patent 202010632219.9, filed on Jul. 3, 2020. All of the aforementioned patent applications are hereby incorporated by reference in their entireties.

TECHNICAL FIELD

This application relates to the field of terminal technologies, and in particular, to a method for displaying a plurality of windows in a split-screen manner and an electronic device.

BACKGROUND

When browsing various applications on an electronic device, a user often needs to compare content displayed by two or more applications. For example, the user needs to compare display information of an application a and display information of an application b for a same commodity. Therefore, the user needs to switch between the application a and the application b to compare the display information of the commodity. This manner of switching applications to browse a plurality of applications at the same time significantly increases an operation frequency of the user, wastes operation time of the user, also reduces accuracy of obtaining browsed information by the user, and reduces user experience.

SUMMARY

This application provides a method for displaying a plurality of windows in a split-screen manner and an electronic device, so that in a process of performing a screen splitting operation, browsing of a currently displayed window by a user is not affected, to improve user experience.

According to a first aspect, an embodiment of the present invention provides a method for displaying a plurality of windows in a split-screen manner. The method includes: displaying a first window in full screen; detecting a screen splitting operation of a user on the first window, where the screen splitting operation is a continuous sliding operation, and a sliding distance of the screen splitting operation is greater than or equal to a first distance threshold, or sliding duration of the screen splitting operation is greater than or equal to a first duration threshold; responding to the screen splitting operation, and displaying a second window on one side of the first window, where the second window is a full-screen window or an operable window including at least one sub-window; and displaying the first window and the second window in the split-screen manner.

In this way, a new window can be displayed by using a continuous sliding operation, without an operation of introducing another auxiliary tool, to achieve a display effect of displaying the plurality of windows in the split-screen manner. In a process of the screen splitting operation, use of the first window by the user is not affected. In addition, the continuous sliding operation can be distinguished from an existing operation, for example, a tap, to reduce an error rate of determining an operation type, and improve accuracy of responding to the screen splitting operation by an electronic device.

In an implementation, the responding to the screen splitting operation includes: In a process of the screen splitting operation, display positions and display sizes of the first window and the second window change with the screen splitting operation.

In an implementation, the responding to the screen splitting operation includes: In a process of the screen splitting operation, a display position and a display size of the first window remain unchanged, and after the screen splitting operation ends, the first window and the second window are directly displayed on a display in the split-screen manner.

In an implementation, the responding to the screen splitting operation includes: In a process of the screen splitting operation, display positions and display sizes of the first window and the second window change with the screen splitting operation, and a format of display content in the first window changes with the screen splitting operation, so that the format of the display content in the first window always adapts to the display size of the first window.

In this way, the second window can be directly displayed on the display in a plurality of manners, to achieve an effect of displaying the second window and the first window in the split-screen manner without assistance of another tool, for example, a window bar, so as to simplify an operation of displaying an application in the split-screen manner.

In an implementation, the first window and the second window are displayed on the display in the split-screen manner based on a preset screen occupation ratio.

In this way, an appropriate window size can be selected based on an actual requirement, to meet requirements such as integrity and definition of display content.

In an implementation, if the second window is a full-screen window, display content in the second window is content that is browsed by the user last time, a desktop of an operating system, an application that is most frequently browsed by the user in a recent period of time, a set of icons of applications that can be used for split-screen display, or the display content in the first window.

In an implementation, if the second window is an operable window including at least one sub-window, display content in the sub-window included in the second window is one or more of content that is browsed by the user last time, a desktop of an operating system, an application that is most frequently browsed by the user in a recent period of time, a set of icons of applications that can be used for split-screen display, and the display content in the first window.

In this way, the second window including a plurality of types of sub-windows can be provided based on a user requirement, to improve user experience.

In an implementation, if an application corresponding to an icon included on the desktop of the operating system cannot be displayed in the split-screen manner, the icon corresponding to the application that cannot be displayed in the split-screen manner is displayed in gray.

In this way, the user can be effectively prompted with the application that cannot be displayed in the split-screen manner, to avoid an accidental tap of the user.

In an implementation, an arrangement manner of the sub-windows is a single-row arrangement manner, a single-column arrangement manner, or a multi-row and multi-column arrangement manner.

In an implementation, a total display size of the sub-windows in the second window is less than the display size of the third window.

In this way, the user can be effectively reminded that the second window is the operable window and the screen splitting operation is being performed, to prevent the user from performing a misoperation.

In an implementation, the responding to the screen splitting operation includes: detecting whether a window split-screen mode corresponding to the screen splitting operation matches the format of the display content in the first window, where the window split-screen mode is an arrangement manner of windows displayed on the display in the split-screen manner; and if the window split-screen mode corresponding to the screen splitting operation does not match the format of the display content in the first window, prompting the user to change the screen splitting operation, to change the corresponding window split-screen mode.

This can ensure integrity and a proportion of display content in the window and provide a better display effect.

In an implementation, the responding to the screen splitting operation includes: if the display content in the first window cannot be displayed in the split-screen manner, skipping responding to the screen splitting operation.

In an implementation, the screen splitting operation is a single-finger continuous sliding operation or a multi-finger continuous sliding operation.

In this way, the electronic device can accurately identify a sliding operation performed by the user in a plurality of forms, to effectively avoid a problem that an operation cannot be identified.

In an implementation, if the continuous sliding operation is a multi-finger continuous sliding operation, before the detecting a screen splitting operation of a user on the first window, the method further includes: detecting the multi-finger continuous sliding operation of the user on the first window; determining a virtual contact point, where the virtual contact point is a geometric center point of contact points between a plurality of fingers and the display; and generating a multi-finger sliding track, where the multi-finger sliding track is a motion track of the virtual contact point.

This can effectively simplify a route to be detected by the electronic device, and reduce calculation burden of the electronic device.

In an implementation, if the second window is a full-screen window, after the responding to the screen splitting operation, the method further includes: detecting a secondary screen splitting operation of the user on the second window; and replacing the second window with a third window in response to the secondary screen splitting operation, where the third window is a full-screen window or an operable window including at least one sub-window.

This can further replace a window obtained after screen splitting with an operable window, and provide, for the user, more selectable windows that are displayed in the split-screen manner.

In an implementation, display content in the sub-window included in the third window is one or more of the content that is browsed by the user last time, the desktop of the operating system, the application that is most frequently browsed by the user in the recent period of time, the set of the icons of the applications that can be used for split-screen display, and the display content in the first window.

In this way, the third window including a plurality of types of sub-windows can be provided based on a user requirement, to improve user experience.

In an implementation, the display content in the sub-window included in the third window further includes the display content in the second window.

In this way, the user can still select the display content in the second window again.

In an implementation, the secondary screen splitting operation is a continuous sliding operation, and a sum of sliding distances of the secondary screen splitting operation is greater than or equal to a second distance threshold, or a sum of sliding duration of the secondary screen splitting operation is greater than or equal to a second duration threshold.

In this way, the second window can be replaced with an operable window by using the continuous sliding operation, and the continuous sliding operation can be distinguished from the existing operation, for example, the tap, to reduce the error rate of determining the operation type, and improve accuracy of responding to the screen splitting operation by the electronic device.

In an implementation, the secondary screen splitting operation is a continuous sliding operation, and the secondary screen splitting operation and the screen splitting operation are a continuous operation. A sum of sliding distances of the screen splitting operation and the secondary screen splitting operation is greater than or equal to a third distance threshold, or a sum of sliding duration of the screen splitting operation and the secondary screen splitting operation is greater than or equal to a third duration threshold.

In this way, the screen splitting operation and the secondary screen splitting operation can be implemented by using one sliding operation, to simplify an operation step of the user.

In an implementation, the secondary screen splitting operation is sliding from any corner of the second window to the inside of the second window.

In an implementation, the secondary screen splitting operation is that at least two fingers slide to the inside of the second window at the same time.

In an implementation, the secondary screen splitting operation is sliding upward from a specified area at the bottom of the second window or sliding downward from a specified area at the top of the third window.

This can provide the more convenient secondary screen splitting operation for the user, and improve effectiveness of the secondary screen splitting operation.

In an implementation, if the second window is an operable window including at least one sub-window, after the displaying the first window and the second window in the split-screen manner, the method further includes: detecting a first selection operation of the user on the second window; responding to the first selection operation, and selecting a fourth window from the sub-windows in the second window; and displaying the first window and the fourth window in the split-screen manner.

In this way, the user can select, from the second window, the fourth window that is to be finally displayed in the split-screen manner.

In an implementation, the first selection operation includes a first sub-operation and a second sub-operation. The first sub-operation is used to enable the sub-windows in the second window to be displayed in a main display area of the second window one by one. The second sub-operation is used to select the fourth window from the sub-windows. The responding to the first selection operation includes: in response to the first sub-operation, enabling the sub-windows in the second window to be displayed in the main display area of the second window one by one; and in response to the second sub-operation, displaying the fourth window and the first window on the display in the split-screen manner.

In an implementation, the first selection operation is a continuous sliding operation. The responding to the selection operation includes: when the selection operation is terminated, detecting a sub-window displayed in a main display area of the second window, to obtain the fourth window; and displaying the fourth window and the first window on the display in the split-screen manner.

In this way, the user can select, in a plurality of manners, a window that is to be finally displayed in the split-screen manner.

In an implementation, if the third window is an operable window including at least one sub-window, after the replacing the second window with a third window in response to the secondary screen splitting operation, the method further includes: detecting a second selection operation of the user on the third window; responding to the second selection operation, and selecting a fifth window from the sub-windows in the third window; and displaying the first window and the fifth window in the split-screen manner.

In this way, the user can select, from the third window, the fifth window that is to be displayed in the split-screen manner.

In an implementation, the second selection operation includes a third sub-operation and a fourth sub-operation. The third sub-operation is used to enable the sub-windows in the third window to be displayed in a main display area of the third window one by one. The fourth sub-operation is used to select the fifth window from the sub-windows. The responding to the second selection operation includes: in response to the third sub-operation, enabling the sub-windows in the third window to be displayed in the main display area of the third window one by one; and in response to the fourth sub-operation, displaying the fifth window and the first window on the display in the split-screen manner.

In an implementation, the second selection operation is a continuous sliding operation. The responding to the second selection operation includes: when the second selection operation is terminated, detecting a sub-window displayed in a main display area of the third window, to obtain the fifth window; and displaying the fifth window and the first window on the display in the split-screen manner.

In this way, the user can select, in the plurality of manners, the window that is to be finally displayed in the split-screen manner.

In an implementation, before the detecting a screen splitting operation of a user on the first window, the method further includes: detecting a trigger operation of the user on the first window, where the trigger operation is a continuous sliding operation, a sliding distance of the trigger operation is greater than or equal to a fourth distance threshold, or sliding duration of the trigger operation is greater than or equal to a fourth duration threshold, the fourth distance threshold is less than the first distance threshold, and the fourth duration threshold is less than the first duration threshold; and in response to the trigger operation, enabling a split-screen display function of the electronic device. In this way, the trigger operation can be distinguished from the existing operation, for example, the tap, to reduce the error rate of determining the operation type, and improve accuracy of responding to the trigger operation by the electronic device.

In an implementation, the method further includes: detecting whether there is an invalidation operation between the trigger operation and the screen splitting operation, where the invalidation operation is used to disable the split-screen display function of the electronic device; and responding to the invalidation operation to disable the split-screen display function of the electronic device.

In this way, the user can flexibly disable the split-screen display function of the electronic device.

According to a second aspect, the present invention provides a method for displaying a plurality of windows in a split-screen manner. The method includes: displaying a first window in full screen; detecting a screen splitting operation of a user on the first window; in response to the screen splitting operation, displaying a second window on one side of the first window, where second windows displayed on different sides of the first window correspond to different display content; and displaying the first window and the second window in the split-screen manner.

In this way, the user can obtain different second windows by using different screen splitting operations, to meet different display requirements.

In an implementation, the second window is a full-screen window or an operable window including at least one sub-window.

In an implementation, the screen splitting operation is a continuous sliding operation, and a sliding distance of the screen splitting operation is greater than or equal to a first distance threshold, or sliding duration of the screen splitting operation is greater than or equal to a first duration threshold.

According to a third aspect, an embodiment of the present invention further provides a method for displaying a plurality of windows in a split-screen manner, applied to a foldable-display electronic device in a folded state. The method includes: displaying a first window in full screen on a displayable side of the foldable-display electronic device in the folded state, detecting a screen splitting operation of a user on the first window, responding to the screen splitting operation, replacing the first window with a second window, where the second window is an operable window including at least one sub-window, and displaying the second window.

In this way, when using the foldable-display electronic device in the folded state, the user can perform a screen splitting operation on a window, to obtain an operable window in which the user can freely select a window that is to be finally displayed.

In an implementation, after the responding to the screen splitting operation, the method further includes: detecting a selection operation of the user, where the selection operation is used to select a third window from the sub-windows in the second window; and in response to the selection operation, replacing the second window with the third window, and displaying the third window.

In this way, the user can select, from a plurality of sub-windows, a window that is finally used for split-screen display.

According to a fourth aspect, the present invention provides an electronic device, including a display, a processor, and a memory. The display, the processor, and the memory are coupled. The processor invokes program instructions in the memory based on an operation signal, to enable the electronic device to perform the following method, including: displaying a first window in full screen; detecting a screen splitting operation of a user on the first window, where the screen splitting operation is a continuous sliding operation, and a sliding distance of the screen splitting operation is greater than or equal to a first distance threshold, or sliding duration of the screen splitting operation is greater than or equal to a first duration threshold; in response to the screen splitting operation, displaying a second window on one side of the first window, where the second window is a full-screen window or an operable window including at least one sub-window; and displaying the first window and the second window in a split-screen manner.

In an implementation, in a process of the screen splitting operation, display positions of the first window and the second window are moved in a sliding direction of the screen splitting operation, a display size of the first window decreases, and a display size of the second window increases. Alternatively, in a process of the screen splitting operation, a format of display content in the first window changes with the screen splitting operation, so that the format of the display content in the first window adapts to a display size of the first window. Alternatively, in a process of the screen splitting operation, a display position and a display size of the first window remain unchanged, and after the screen splitting operation ends, the second window is directly displayed on the side of the first window.

In an implementation, if the second window is a full-screen window, display content in the second window is one of the following: content that is browsed by the user last time, a desktop of an operating system, an application that is most frequently browsed by the user in a recent period of time, a set of icons of applications that can be used for split-screen display, and the display content in the first window. Alternatively, if the second window is an operable window including at least one sub-window, display content in the sub-window included in the second window is at least one of the following: content that is browsed by the user last time, a desktop of an operating system, an application that is most frequently browsed by the user in a recent period of time, a set of icons of applications that can be used for split-screen display, and the display content in the first window.

In an implementation, if an application corresponding to an icon included on the desktop of the operating system cannot be displayed in the split-screen manner, the icon corresponding to the application that cannot be displayed in the split-screen manner is displayed in gray.

In an implementation, an arrangement manner of the sub-windows is a single-row arrangement manner, a single-column arrangement manner, or a multi-row and multi-column arrangement manner.

In an implementation, the method performed by the electronic device further includes: detecting whether a window split-screen mode corresponding to the screen splitting operation matches the format of the display content in the first window, where the window split-screen mode is an arrangement manner in which the first window and the second window are displayed in the split-screen manner; and if the window split-screen mode corresponding to the screen splitting operation does not match the format of the display content in the first window, prompting the user to change the screen splitting operation, to change the corresponding window split-screen mode.

In an implementation, the method performed by the electronic device further includes: if the second window is a full-screen window, detecting a secondary screen splitting operation of the user on the second window; and replacing the second window with a third window in response to the secondary screen splitting operation, where the third window is a full-screen window or an operable window including at least one sub-window.

In an implementation, the secondary screen splitting operation is a continuous sliding operation. A sum of sliding distances of the secondary screen splitting operation is greater than or equal to a second distance threshold, or a sum of sliding duration of the secondary screen splitting operation is greater than or equal to a second duration threshold. Alternatively, the secondary screen splitting operation is a continuous sliding operation, and the secondary screen splitting operation and the screen splitting operation are a continuous operation. A sum of sliding distances of the screen splitting operation and the secondary screen splitting operation is greater than or equal to a third distance threshold, or a sum of sliding duration of the screen splitting operation and the secondary screen splitting operation is greater than or equal to a third duration threshold. Alternatively, the secondary screen splitting operation is sliding from any corner of the second window to the inside of the second window. Alternatively, the secondary screen splitting operation is that at least two fingers slide to the inside of the second window at the same time. Alternatively, the secondary screen splitting operation is sliding upward from a specified area at the bottom of the second window or sliding downward from a specified area at the top of the third window.

In an implementation, the method performed by the electronic device further includes: detecting a trigger operation of the user on the first window, where the trigger operation is a continuous sliding operation, a sliding distance of the trigger operation is greater than or equal to a fourth distance threshold, or sliding duration of the trigger operation is greater than or equal to a fourth duration threshold, the fourth distance threshold is less than the first distance threshold, and the fourth duration threshold is less than the first duration threshold; and in response to the trigger operation, enabling a split-screen display function of the electronic device.

According to a fifth aspect, the present invention provides an electronic device, including a display, a processor, and a memory. The display, the processor, and the memory are coupled. The processor invokes program instructions in the memory based on an operation signal, to enable the electronic device to perform the following method, including: displaying a first window in full screen; detecting a screen splitting operation of a user on the first window; in response to the screen splitting operation, displaying a second window on one side of the first window, where second windows displayed on different sides of the first window correspond to different display content; and displaying the first window and the second window in a split-screen manner.

According to a sixth aspect, the present invention further provides a foldable-display electronic device, including a display, a processor, and a memory. The display, the processor, and the memory are coupled. The processor invokes program instructions in the memory based on an operation signal, to enable the foldable-display electronic device to perform the following method, including: when the foldable-display electronic device is in a folded state, displaying a first window in full screen on a displayable side of the foldable-display electronic device; detecting a screen splitting operation of a user on the first window; in response to the screen splitting operation, replacing the first window with a second window, where the second window is an operable window including at least one sub-window; and displaying the second window.

According to a seventh aspect, the present invention further provides a computer storage medium, including computer instructions. When the computer instructions are run on an electronic device, the electronic device is enabled to perform a corresponding method for displaying a plurality of windows in a split-screen manner.

According to an eighth aspect, the present invention further provides a chip system. The chip system includes a processor, configured to support the foregoing apparatus or device in implementing a function in the foregoing aspects and the implementations of the foregoing aspects, for example, detecting an operation of a user or responding to an operation of a user.

BRIEF DESCRIPTION OF THE DRAWINGS

To describe the technical solutions in this application more clearly, the following briefly describes the accompanying drawings for describing embodiments. It is clear that a person of ordinary skill in the art may derive other drawings from these accompanying drawings without creative efforts.

FIG. 2①  and FIG. 2② are a schematic flowchart of displaying a plurality of windows in a split-screen manner by using a window bar according to the present invention;

FIG. 4① to FIG. 4③ are a schematic flowchart of a first type of displaying a plurality of windows in a split-screen manner according to an embodiment of the present invention;

FIG. 5① to FIG. 5③ are a schematic flowchart of a second type of displaying a plurality of windows in a split-screen manner according to an embodiment of the present invention;

FIG. 6① to FIG. 6③ are a schematic flowchart of a third type of displaying a plurality of windows in a split-screen manner according to an embodiment of the present invention;

FIG. 7① to FIG. 7③ are a schematic flowchart of a fourth type of displaying a plurality of windows in a split-screen manner according to an embodiment of the present invention;

FIG. 17① to FIG. 17③ are a schematic flowchart of a seventh type of displaying a plurality of windows in a split-screen manner according to an embodiment of the present invention;

FIG. 18① to FIG. 18③ are a schematic flowchart of an eighth type of displaying a plurality of windows in a split-screen manner according to an embodiment of the present invention;

FIG. 19① to FIG. 19③ are a schematic flowchart of a ninth type of displaying a plurality of windows in a split-screen manner according to an embodiment of the present invention;

FIG. 20① and FIG. 20② are a schematic flowchart of a tenth type of displaying a plurality of windows in a split-screen manner according to an embodiment of the present invention;

FIG. 21① to FIG. 21③ are a schematic flowchart of an eleventh type of displaying a plurality of windows in a split-screen manner according to an embodiment of the present invention;

FIG. 22① to FIG. 22③ are a schematic flowchart of a twelfth type of displaying a plurality of windows in a split-screen manner according to an embodiment of the present invention;

FIG. 23① and FIG. 23② are a schematic flowchart of a thirteenth type of displaying a plurality of windows in a split-screen manner according to an embodiment of the present invention;

FIG. 24① and FIG. 24② are a schematic flowchart of a fourteen type of displaying a plurality of windows in a split-screen manner according to an embodiment of the present invention;

FIG. 25① and FIG. 25② are a schematic flowchart of a fifteenth type of displaying a plurality of windows in a split-screen manner according to an embodiment of the present invention;

FIG. 26① and FIG. 26② are a schematic flowchart of a sixteenth type of displaying a plurality of windows in a split-screen manner according to an embodiment of the present invention;

FIG. 27① to FIG. 27③ are a schematic flowchart of a seventeenth type of displaying a plurality of windows in a split-screen manner according to an embodiment of the present invention;

FIG. 28a① to FIG. 28a③ are a schematic flowchart of an eighteenth type of displaying a plurality of windows in a split-screen manner according to an embodiment of the present invention;

FIG. 29a① to FIG. 29a③ are a schematic flowchart of a nineteenth type of displaying a plurality of windows in a split-screen manner according to an embodiment of the present invention;

FIG. 30a① to FIG. 30a③ are a schematic flowchart of a twentieth type of displaying a plurality of windows in a split-screen manner according to an embodiment of the present invention;

FIG. 31① and FIG. 31② are a schematic flowchart of a twenty-first type of displaying a plurality of windows in a split-screen manner according to an embodiment of the present invention;

FIG. 32a① to FIG. 32a④ are a schematic flowchart of an application switching method for a foldable-display electronic device in a folded state according to an embodiment of the present invention.

DETAILED DESCRIPTION OF ILLUSTRATIVE EMBODIMENTS

The following clearly and completely describes the technical solutions in embodiments of the present invention with reference to the accompanying drawings in embodiments of the present invention. It is clear that the described embodiments are merely some rather than all of embodiments of the present invention. All other embodiments obtained by a person of ordinary skill in the art based on embodiments of the present invention without creative efforts shall fall within the protection scope of the present invention.

Figure 1:
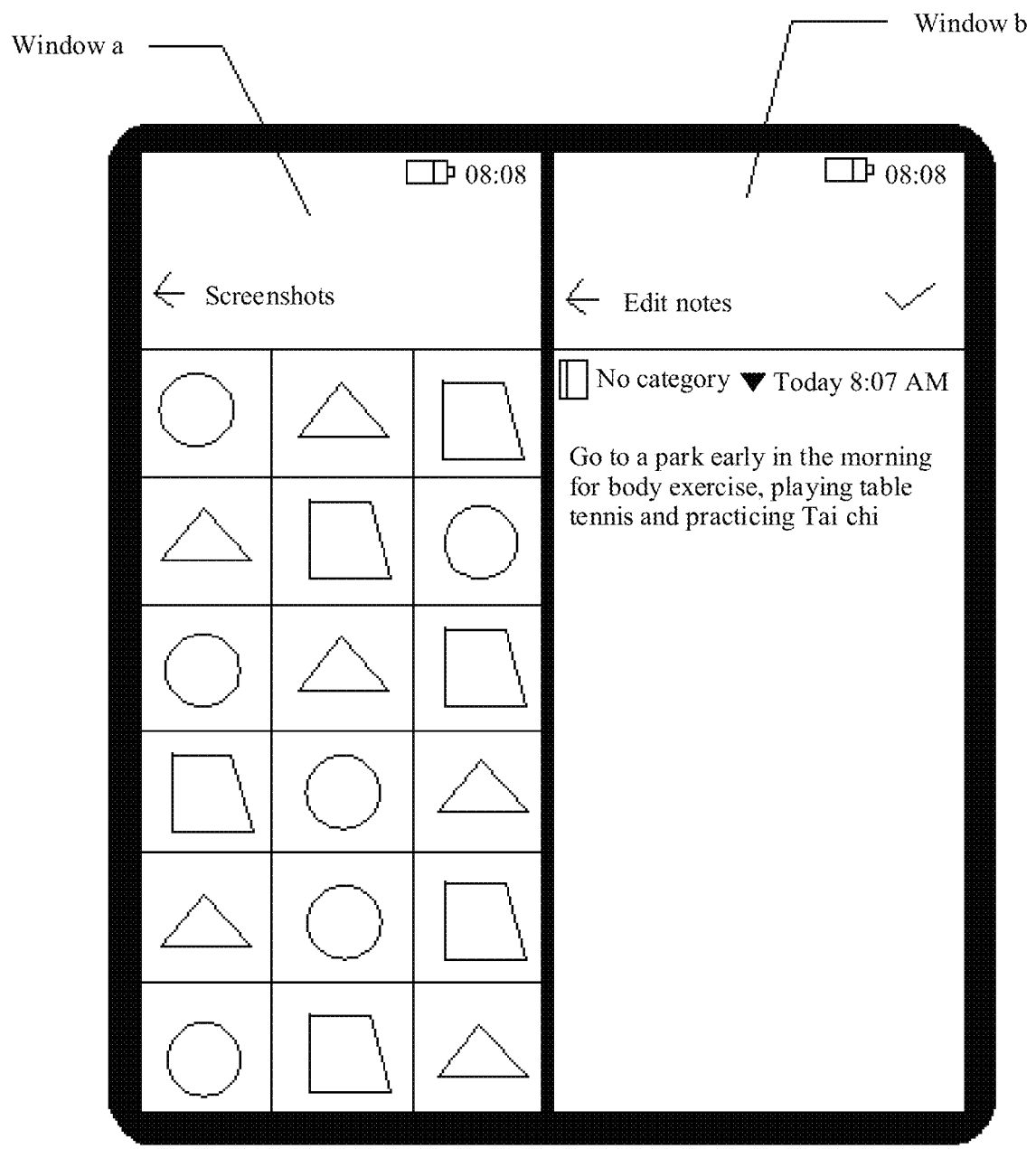
FIG. 1 is a schematic diagram of displaying a plurality of windows on an electronic device in a split-screen manner.

To improve user experience of browsing and operating a plurality of windows at the same time, display sizes of electronic devices gradually increase, for example, a mobile phone and a tablet computer with large-sized displays. In addition, as flexible display technologies gradually mature, foldable-display electronic devices also gradually appear on the market for use. These electronic devices with large display sizes all provide a basis for a user to display the plurality of windows in a split-screen manner. For example, FIG. 1 is a schematic diagram of displaying the plurality of windows on an electronic device in the split-screen manner. A window a and a window b are displayed on a display of the electronic device at the same time, and are in a split-screen display status. Display content in the window a is a gallery, and display content in the window b is a note. In this way, if the user needs to browse the gallery and the note at the same time, the user does not need to switch between the window a and the window b, but can display the window a and the window b on the display at the same time, to browse the gallery and the note at the same time.

FIG. 2① and FIG. 2② are a schematic flowchart of displaying the plurality of windows in the split-screen manner by using a window bar according to the present invention. A process in which the electronic device displays the plurality of windows in the split-screen manner may be obtained in cooperation with the window bar by using a user gesture. As shown in FIG. 2①, the display displays display content in a current window of the user, for example, a note. If the user needs to browse another application, for example, the gallery, at the same time, the user needs to display the another application by using another window. In this case, the user quickly slides from an edge of the display to an inner side of the display at a short distance to pull out the window bar. FIG. 2① provides an example. The user quickly slides from the right edge of the display to the inner side of the display at the short distance to pull out the window bar. Icons that include an icon of the gallery and that are of a plurality of applications that can be displayed in the split-screen manner are displayed on the window bar. The user selects the icon of the gallery to establish a window to display content of the gallery, and obtains two windows that are displayed in the split-screen manner and that are shown in FIG. 2②, to display the gallery and the note at the same time.

If the foregoing method for displaying the plurality of windows in the split-screen manner is applied to the electronic device with the large-sized display, the following problems exist. Based on a habit of holding the electronic device by the user, if the window bar can only be pulled out from the right side, or a sub-window can only be obtained by sliding from the left side, use experience of a backhand user is limited. In addition, the foregoing two sliding manners both easily conflict with an existing system return function. Moreover, if split-screen display is performed in a manner of the window bar, because a quantity of application icons that can be displayed in the window bar at a time is limited, a selection requirement of the user cannot be met. In addition, the window bar is mostly in a floating state. This blocks a currently browsed window, and affects a browsing effect of the user on currently displayed content.

To prevent these operations from causing, to the user, problems such as an inconvenient operation, a conflict with another existing operation, and affecting display of a current application, the present invention provides the following method for displaying a plurality of windows in a split-screen manner.

Figure 3:
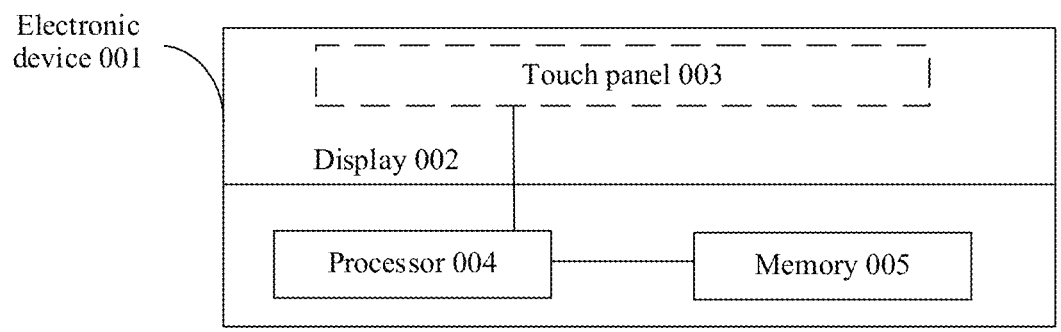
FIG. 3 is a schematic diagram of a structure of an electronic device according to the present invention.

FIG. 3 is a schematic diagram of a structure of an electronic device according to the present invention. As shown in FIG. 3, the electronic device 001 mainly includes a display 002, a touch panel 003, a processor 004, and a memory 005. The display 002, the touch panel 003, the processor 004, and the memory 005 are coupled.

The electronic device 001 may be a mobile phone, a computer, a tablet computer, or the like.

The display 002 may include an optical module layer, an adhesive layer, and an outer screen layer. The optical module layer may be a flexible optical module layer, is configured to provide light emitting and display functions for the display 002, and may use an organic light-emitting diode (Organic Light-Emitting Diode, OLED), or the like. The outer screen layer is configured to protect an internal component of the display 002, and may use inorganic glass, a colorless polyimide (Colorless Polyimide, CPI) film, or the like.

The touch panel (touch panel) 003 is attached to the display 002, or as shown in FIG. 3, is disposed inside the display 002, and is configured to sense an operation of a user on the display 002.

The processor 004 may detect an operation signal of the user, and invoke program instructions in the memory 004, to enable the electronic device 001 to perform a related method, for example, triggering a function of displaying the plurality of windows in the split-screen manner, introducing a window, replacing a window, selecting a window, or displaying a window in a split-screen manner. The processor 004 may include one or more processing units, for example, a system on a chip (SoC), a central processing unit (CPU), a microcontroller (MCU), and a storage controller. Different processing units may be independent components, or may be integrated into one or more processors.

The memory 005 may include one or more storage units, for example, may include a volatile memory, such as a dynamic random access memory (DRAM) or a static random access memory (SRAM), and may further include a non-volatile memory (NVM), for example, a read-only memory (ROM) or a flash memory. Different storage units may be independent components, or may be integrated or packaged into one or more processors or communication interfaces as a part of the processor or the communication interface.

An effect of displaying the plurality of windows in the split-screen manner is achieved by using a screen splitting operation. A specific method is as follows.

S1: Display a first window in full screen.

Full-screen display may be that a display interface of a window is filled in a corresponding displayable area on the display 002, or a display interface of a window may have an operation interface, for example, a status bar.

S2: Detect the screen splitting operation of the user on the first window.

S3: Respond to the screen splitting operation, and enable the display to display the first window and a second window in the split-screen manner.

Embodiment 1

The screen splitting operation is a continuous sliding operation, and a sliding distance of the screen splitting operation is greater than or equal to a first distance threshold, or sliding duration of the screen splitting operation is greater than or equal to a first duration threshold. In response to the screen splitting operation, the second window is displayed on one side of the first window.

FIG. 4①) to FIG. 4③ are a schematic flowchart of a first type of displaying the plurality of windows in the split-screen manner according to this embodiment of the present invention. In this embodiment, the electronic device 001 may be a foldable-display electronic device in an unfolded state, a tablet computer, a mobile phone, or the like. The first window is a window currently displayed on the display 002 when the user performs an operation. The first window may be a display interface of an application, or may be a desktop of an operating system, or the like.

As shown in FIG. 4①, when the electronic device 001 detects the screen splitting operation of the user, the display 002 displays the first window in full screen. For example, display content in the first window is a note.

The user performs a gesture operation on the first window. If the touch panel 003 detects the gesture operation of the user, and the processor 004 obtains, through analysis, that the gesture operation is the screen splitting operation (the continuous sliding operation, where the sliding distance is greater than or equal to the first distance threshold, or the sliding duration is greater than or equal to the first duration threshold), the processor 004 responds to the screen splitting operation, and displays the second window on the side of the first window. In FIG. 4① to FIG. 4③, displaying the second window on the left side of the first window is used as an example. In this way, content of a gallery and the note can be displayed in the split-screen manner.

The user can display a new window by using a continuous sliding operation, without an operation of introducing another auxiliary tool, to achieve a display effect of displaying the plurality of windows in the split-screen manner. In a process of the screen splitting operation, use of the first window by the user is not affected. In addition, the continuous sliding operation can be distinguished from an existing operation, for example, a tap, to reduce an error rate of determining an operation type, and improve accuracy of responding to the screen splitting operation by the electronic device.

Embodiment 2

In this embodiment, the screen splitting operation may be a plurality of operations, for example, the continuous sliding operation mentioned in Embodiment 1, to display the second window, or touching and holding a side edge of the first window, to display the second window. After the screen splitting operation of the user on the first window is detected, in response to the screen splitting operation, the second window is displayed on one side of the first window. In addition, second windows displayed on different sides of the first window correspond to different display content.

For example, the screen splitting operation is a continuous sliding operation. As shown in FIG. 4① to FIG. 4③, when the user continuously slides rightward on the first window, a second window is displayed on the left side of the first window, and display content in the second window is a gallery. FIG. 5① to FIG. 5③ are a schematic flowchart of a second type of displaying the plurality of windows in the split-screen manner according to this embodiment of the present invention. When the user continuously slides leftward on the first window, a second window is displayed on the right side of the first window, and display content in the second window is a desktop interface of an operating system. It can be learned that the display content in the second windows displayed from the different sides of the first window is different. Certainly, display content in a second window displayed from the top of the first window or from the bottom of the second window is also different. Details are not described herein again. A specific operation manner of a screen splitting operation in another form is not described herein again. However, regardless of which screen splitting operation is used, the display content in the second windows displayed on the different sides of the first window is different.

In this way, different screen splitting operations can correspond to different second windows, and the user can select the different screen splitting operations based on display content that needs to be displayed. For example, when wanting to display the gallery in the split-screen manner, the user can choose to continuously slide rightward, or when wanting to display the desktop interface of the operating system in the split-screen manner, the user can choose to continuously slide leftward. This can reduce a limitation on selectivity, brought to the user when the different screen splitting operations all correspond to a second window in which same display content is displayed.

Based on Embodiment 1 and Embodiment 2, when the screen splitting operations in Embodiment 1 and Embodiment 2 are both continuous sliding operations, the screen splitting operation may have the following features.

The screen splitting operation is a continuous sliding operation of the user in a specified area of the first window, and the sliding distance of the screen splitting operation is greater than or equal to the first distance threshold, or the sliding duration of the screen splitting operation is greater than or equal to the first duration threshold.

(1) As shown in FIG. 4① to FIG. 4③, the user performs a continuous sliding operation in the specified area (for example, a bottom area of the first window) on the first window. An initial position of the continuous sliding operation is a first position, and the continuous sliding operation reaches a second position through continuous sliding. A distance between the first position and the second position is greater than or equal to the first distance threshold. In this case, the continuous sliding operation may be detected by the touch panel 003 and determined by the processor 004 as a screen splitting operation. For example, the first distance threshold is 20 mm. If the distance between the first position and the second position is equal to 21 mm, the current continuous sliding operation of the user is a screen splitting operation.

(2) As shown in FIG. 4①  to FIG. 4③, the user performs a continuous sliding operation in the specified area (for example, a bottom area of the first window) on the first window. An initial position of the continuous sliding operation is a first position, and the continuous sliding operation reaches a second position through continuous sliding. A sliding duration corresponding to sliding from the first position to the second position is greater than or equal to the first duration threshold. In this case, the continuous sliding operation may be detected by the touch panel 003 and determined by the processor 004 as a screen splitting operation. For example, the first duration threshold is 3s. If the duration corresponding to sliding from the first position to the second position is 3s, the current continuous sliding operation of the user is a screen splitting operation. It should be noted that, in (2), the continuous sliding operation is an operation whose sliding distance is greater than 0. In other words, a distance between the first position and the second position needs to be greater than 0. In this way, the screen splitting operation can be distinguished from another operation of touching a same position on the display 002 for a long time by the user to trigger a corresponding feedback.

For a design idea of the screen splitting operation, refer to the following explanation.

Different functions may be triggered based on different operation areas of a same gesture operation on the first window. For example, continuously sliding upward from the bottom area of the first window triggers display of a menu bar of a shortcut setting, for example, a display interface including a Bluetooth icon, a flashlight icon, and a volume icon, and continuously sliding downward from a top area of the first window triggers display of a notification bar, for example, a display interface including a message notification corresponding to each application. Therefore, to avoid a conflict with an existing trigger effect, an operation area corresponding to the screen splitting operation needs to be distinguished from an operation area corresponding to an existing function implemented by using the continuous sliding operation, that is, the screen splitting operation may be performed in the specified area (an area other than an area that corresponds to an existing gesture operation and that is of the first window).

Correspondingly, some existing gesture operations may be performed on any area of the first window. As a result, an operation area for these gesture operations covers the specified area mentioned above. For example, the existing gesture operation is a tap operation, and may trigger a selection function of the electronic device 001, or the existing gesture operation is a quick leftward/rightward sliding operation, and may trigger a window switching function of the electronic device 001. Therefore, to avoid a conflict with these existing gesture operations, an operation manner of the screen splitting operation is set to the continuous sliding operation, so that the screen splitting operation can be distinguished from the tap operation. In addition, the sliding distance of the continuous sliding operation is greater than or equal to the first distance threshold, or the sliding duration of the continuous sliding operation is greater than or equal to the first duration threshold, so that the continuous sliding operation can be distinguished from the leftward/rightward quick sliding operation. As described above, even if the operation area corresponding to the screen splitting operation is the same as the operation area corresponding to the existing gesture operation, the screen splitting operation can be distinguished from the existing gesture operation, and a feedback conflict can be effectively avoided.

It can be learned that the screen splitting operation provided in this implementation can be effectively distinguished from the existing gesture operation, to improve accuracy of responding to the screen splitting operation by the electronic device 001, and improve effectiveness of the screen splitting operation of the user. In addition, the screen splitting operation provided in this implementation corresponds to one operation of the user on the display. Therefore, the user needs to perform only one sliding operation to implement the effect of displaying the plurality of windows in the split-screen manner, to improve efficiency of a user operation, so as to improve user experience.

A sliding direction of the screen splitting operation provided in this implementation may be, as shown in FIG. 4① to FIG. 4③, continuous sliding from the left side of the first window to the right side of the first window, to obtain a split-screen display effect that the second window is on the left side of the first window and that is shown in FIG. 4③, or may be, as shown in FIG. 5① to FIG. 5③, continuous sliding from the right side of the first window to the left side of the first window, to obtain a split-screen display effect that the second window is on the right side of the first window and that is shown in FIG. 5③, or may be, as shown in FIG. 6① to FIG. 6③, continuous sliding from an upper part of the first window to a lower part of the first window, to obtain a split-screen display effect that the second window is above the first window and that is shown in FIG. 6③, or may be, as shown in FIG. 7① to FIG. 7③, continuous sliding from a lower part of the first window to an upper part of the first window, to obtain a split-screen display effect that the second window is below the first window and that is shown in FIG. 7③. The sliding direction mentioned above is a relative concept relative to an initial position and an end position of the screen splitting operation.

In a process of the screen splitting operation, display statuses (display positions, display sizes, formats of display content, and the like) of the first window and the second window may be set to different change manners, which are specifically as follows.

In a first change manner, FIG. 4① to FIG. 4③ are used as an example. In a process of responding to the screen splitting operation, the display position of the first window is gradually moved rightward from the center position of the display 002, the display size of the first window gradually decreases, and the format of the display content in the first window remains unchanged. As a result, the right side of the display content is blocked to some extent. In addition, the display status of the second window also changes in response to the screen splitting operation. The display position of the second window on the display 002 is gradually moved rightward, the display size of the second window gradually increases, and the left side of the display content in the second window is blocked. After the screen splitting operation ends, the first window and the second window are respectively displayed on two sides of the display 002. In this case, the second window is a full-screen window, as shown in FIG. 4③. A full-screen window is a window that is displayed in a corresponding area in a manner of filling the area. In FIG. 4① to FIG. 4③, the display sizes of the first window and the second window are equal. In this case, the format of the display content in the first window is already correspondingly adjusted based on the display size. For example, to ensure recognizability of a text, on the basis of ensuring that a font size remains unchanged, a text displayed in a single line in FIG. 4①  is adjusted to be displayed in two lines. In addition, the format of the display content in the second window is also correspondingly adjusted based on the display size. A format, for example, a display ratio, of the gallery may be adjusted, to completely display a user interface of the gallery.

In this change manner, the formats of the display content in the first window and the second window are not adjusted in the process of the screen splitting operation. Therefore, the display content corresponding to the first window and the second window is blocked in the process of the screen splitting operation. However, duration of the screen splitting operation is usually short, and therefore, integrity of browsing the first window by the user is not greatly affected. In addition, in the process of the screen splitting operation, because the display content in the second window is not content that the user needs to pay attention to when performing the screen splitting operation, even if the display content in the second window is blocked, use of the user is not affected. Moreover, the processor 004 only needs to adjust the display content in the first window and the second window at a time. In this way, calculation burden of the processor 004 can be effectively reduced.

In a second change manner, in the process of performing the screen splitting operation, the format of the display content in the first window is always adjusted with the display size of the first window, to ensure that the display content in the first window is always completely displayed. In this way, for some display content that needs to be always browsed without a blocked picture, a browsing effect of the user in the process of performing the screen splitting operation may be completely not affected. The format of the display content in the second window may not be in this change manner. Because the display size of the second window is small in an introduction process, if the complete display content is forcibly displayed, the browsing effect of the user is not improved, and the calculation burden of the processor 004 increases. However, when the display size of the second window meets a minimum size for displaying the complete display content in the second window, the format of the display content in the second window may be adjusted with the screen splitting operation at any time in this change manner. In this way, the user can browse the complete display content in the second window in a more timely manner.

Figure 8:
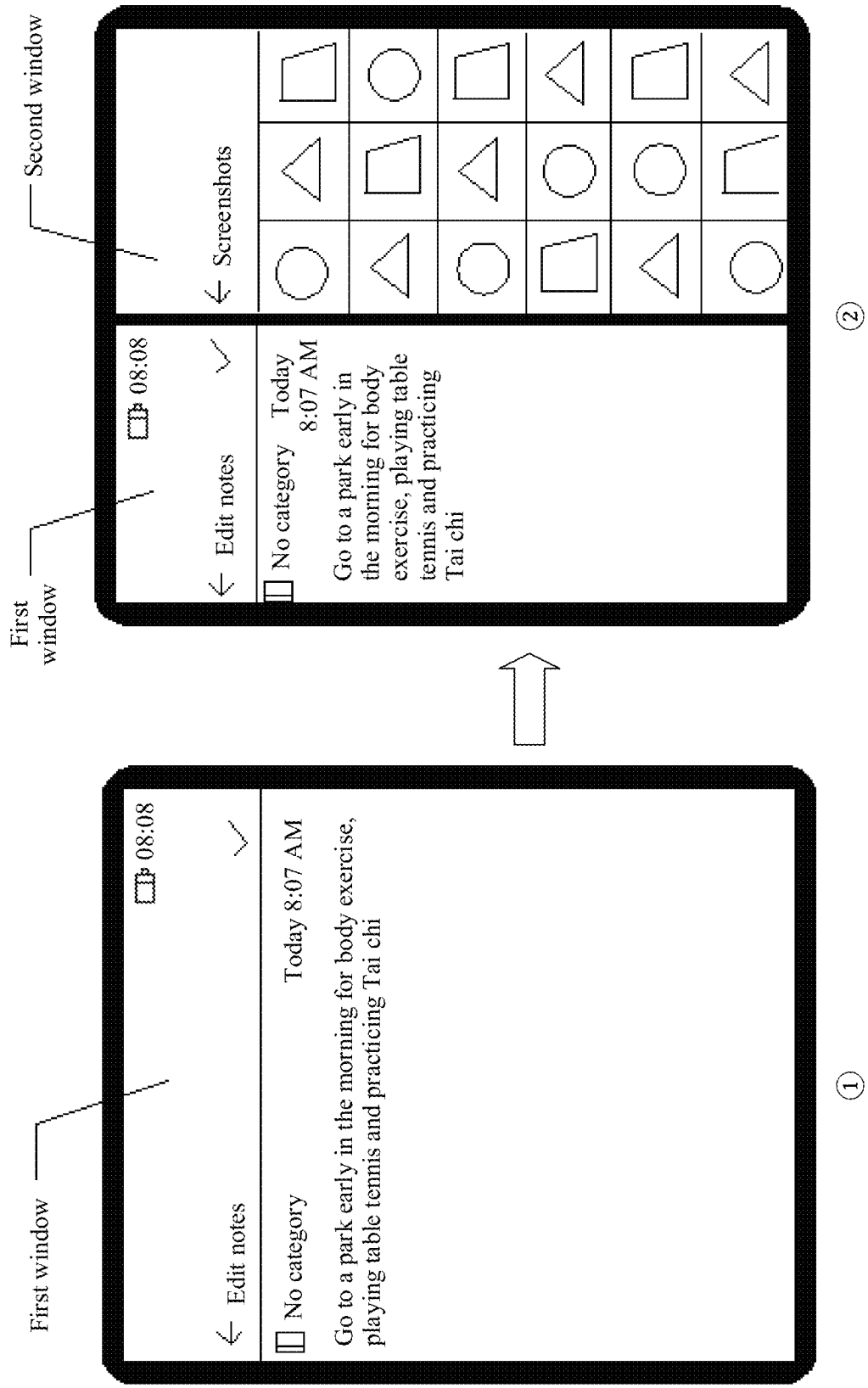
FIG. 8 is a schematic flowchart of a fifth type of displaying a plurality of windows in a split-screen manner according to an embodiment of the present invention.

In a third change manner, FIG. 8 is a schematic flowchart of a fifth type of displaying the plurality of windows in the split-screen manner according to this embodiment of the present invention. As shown in FIG. 8, when the screen splitting operation is performed, the display status of the first window does not change with the screen splitting operation. After the screen splitting operation ends, the first window and the second window are directly displayed on the display 002 in the split-screen manner. Moreover, in this case, the formats of the display content in the first window and the second window is already adjusted based on the corresponding display sizes. It can be learned that, in this change manner, in both the process of the screen splitting operation and a process of jumping to displaying the first window and the second window in the split-screen manner, browsing of the first window by the user is not affected. In addition, the processor 004 may perform format adjustment only once on the display content in the first window and the second window, to reduce the calculation burden of the processor 004.

After the first window and the second window are obtained, the display sizes of the first window and the second window may alternatively use different display occupation ratios based on a user requirement. For example, the first window and the second window are equally displayed on the display 002, or the first window occupies 40% of a display area of the display 002, and the second window occupies 60% of the display area of the display 002. A size of a window that is displayed in the split-screen manner may be set by a system before the user performs the split screen operation, or the display area of the display is evenly shared by the first window and the second window by default, or the display size is adjusted by the user after the split screen operation.

The screen splitting operation may be a single-finger continuous sliding operation or a multi-finger continuous sliding operation.

Figure 9:
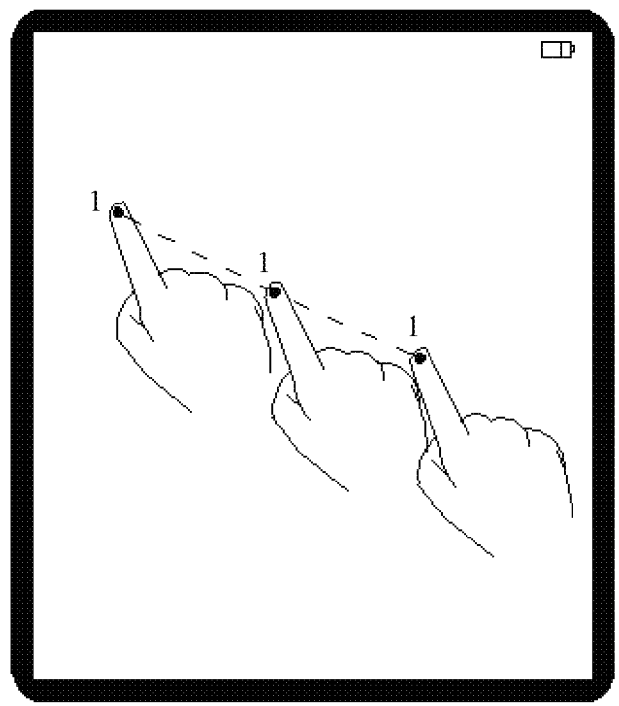
FIG. 9 is a schematic diagram of a sliding track of a single-finger continuous sliding operation according to an embodiment of the present invention.

FIG. 9 is a schematic diagram of a sliding track of a single-finger continuous sliding operation according to an embodiment of the present invention. As shown in FIG. 9, one finger performs a continuous sliding operation. In this case, a contact point between the finger and the display 002 is a point 1. The touch panel 003 detects contact between the user and the display 002, and transfers a corresponding operation signal to the processor 004. The processor 004 determines, based on the operation signal, that there is a single contact point, namely, the point 1, between the user and the display 002. The processor 004 calculates position information of the point 1 on the display 002 based on operation signals continuously fed back by the touch panel 003, and draws a sliding track of the point 1 based on the position information. The sliding track of the point 1 is shown by a dashed line in FIG. 9. In this case, the processor 004 may detect, based on the sliding track, whether the continuous single-finger sliding operation is a screen splitting operation.

Figure 10:
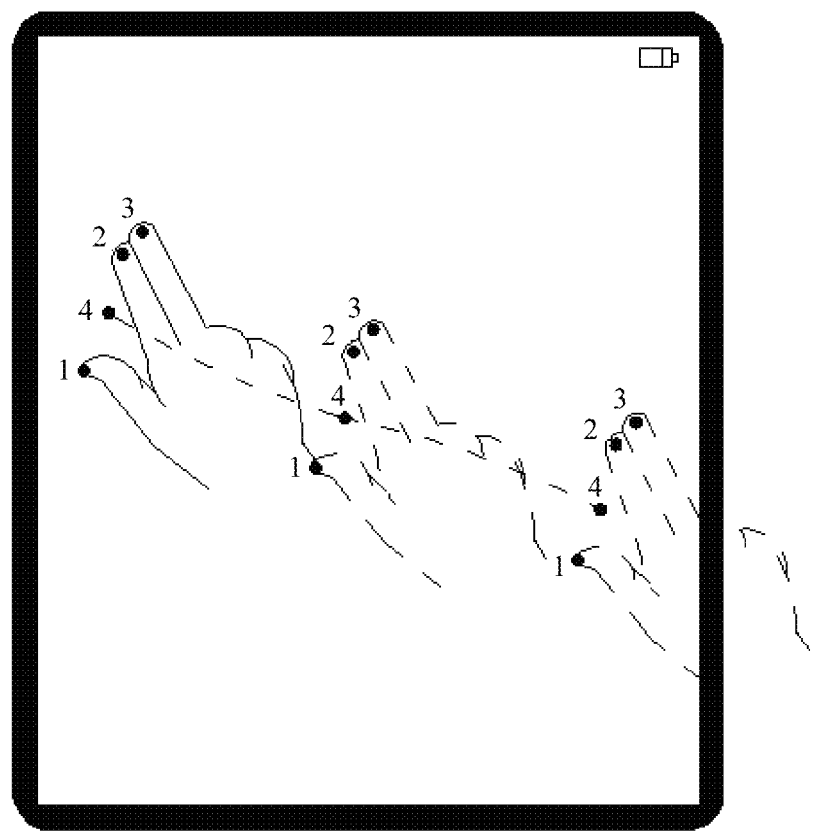
FIG. 10 is a schematic diagram of a sliding track of a multi-finger continuous sliding operation according to an embodiment of the present invention.

FIG. 10 is a schematic diagram of a sliding track of a multi-finger continuous sliding operation according to an embodiment of the present invention. As shown in FIG. 10, three fingers perform a continuous sliding operation at the same time. In this case, contact points between the three fingers and the display 002 are respectively points 1, 2, and 3. When detecting contact between the user and the display 002, the sensor 003 transfers a corresponding operation signal to the processor 004, and the processor 004 determines, based on the operation signal, that there are a plurality of contact points between the user and the display 002. In this case, the processor 004 obtains through calculation, according to a specific calculation rule, a virtual contact point associated with the plurality of contact points. For example, the virtual contact point may be a geometric center point of a geometric figure formed by the plurality of contact points. A position of the virtual contact point on the display 002 may be used to replace positions of the plurality of contact points on the display 002. The processor 004 dynamically calculates, based on operation signals continuously fed back by the touch panel 003, position information that is on the display 002 and that is of a virtual contact point corresponding to each group of operation signals, and describes a sliding track of the virtual contact point based on the position information. As shown in FIG. 10, a point 4 is a virtual contact point of points 1, 2, and 3, and a sliding track of the point 4 is shown by a dashed line in FIG. 10, and is a virtual sliding track. The virtual sliding track may be used to replace an actual sliding track of the points 1, 2, and 3 on the display 002. In this way, the multi-finger continuous sliding operation may be converted into a single-finger continuous sliding operation, and a plurality of actual sliding tracks corresponding to a plurality of fingers are simplified into one virtual sliding track, to reducing burden of detecting a screen splitting operation by the processor 004 based on a sliding track.

Further, the single-finger continuous sliding operation and the multi-finger continuous sliding operation are combined with the foregoing limitation on the specified area. The single-finger continuous sliding operation and the multi-finger continuous sliding operation may correspond to a same specified area, or may correspond to different specified areas. For example, the bottom area or the like of the display 002 may be set as a specified area for the single-finger continuous sliding operation, and an entire area of the display 002 may be set as a specified area for the multi-finger continuous sliding operation.

The displayed second window may be a full-screen window, or may be a selectable window including at least one sub-window.

First Implementation

When the second window is a full-screen window, for the displayed second window, the display content may be set based on an actual requirement of the user. Details are as follows.

① The display content may be content that is browsed by the user last time, and the content that is browsed by the user last time may be an application, the desktop of the operating system, or the like. For example, as shown in FIG. 4③, if the gallery is the content that is browsed by the user last time, the second window displays the gallery.

Figure 11:
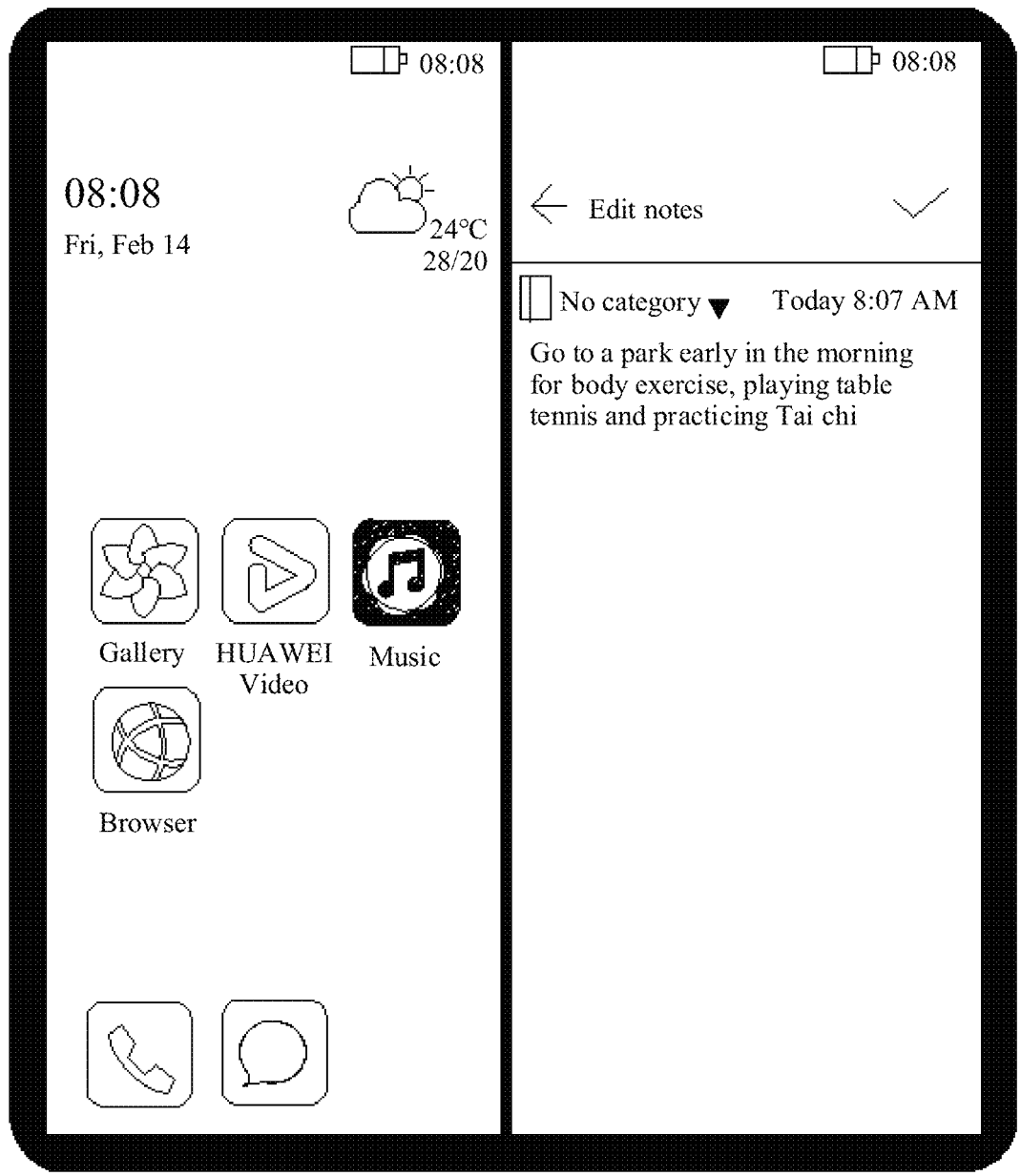
FIG. 11 is a schematic diagram of an icon in a window on a desktop of a system according to an embodiment of the present invention.

② The display content may be the desktop of the operating system. In this way, the user may display the first window and the desktop of the operating system at the same time by using the screen splitting operation, and further select, from the desktop of the operating system, an application that needs to be started. For an icon of an application that cannot be displayed in the multi-window manner and that is on the desktop of the operating system, prompt processing, for example, graying processing or shadowing processing, may be performed, to prompt the user not to select the icon. FIG. 11 is a schematic diagram of an icon in a window on a desktop of a system according to an embodiment of the present invention. As shown in FIG. 11, an icon corresponding to an application, namely, music, is displayed in gray through graying processing, and is in an inoperable state, indicating that the music is an application that cannot be used for split-screen display.

③ The display content may be an application that is most frequently browsed by the user in a recent period of time. For example, the application that is most frequently browsed by the user in the recent period of time is the gallery. As shown in FIG. 4③, the interface of the gallery is displayed in the second window. Generally, the application that is most frequently browsed is also an application that is more likely to be used by the user in the future. If the second window uses the setting manner ③, the display content in the second window may be closer to a preference of the user. This can also effectively reduce time for the user to search for an application that needs to be displayed, and improve user experience.

④ The display content may be a set of icons of some or all applications that can be used for split-screen display.

In this way, the user may directly select, from the set, an application that needs to be browsed, without first distinguishing whether each application can be displayed in the split-screen manner, to save time.

For the screen splitting method disclosed in Embodiment 1, display content in second windows obtained by using different screen splitting operations may be the same. In this case, if display content in a second window that the user wants to obtain each time almost remains unchanged, the user may obtain, from any sliding direction, the display content in the second window that the user needs. Especially, when an action of the user is limited by a holding manner or the like, the display content in the second window may also be obtained in a comfortable manner. According to the screen splitting method disclosed in Embodiment 1, display content in second windows obtained by using different screen splitting operations may be alternatively different. For the screen splitting method disclosed in Embodiment 2, display content in second windows obtained by using different screen splitting operations needs to be different. Based on the foregoing two cases, the screen splitting operation and the display content may be set correspondingly based on an actual requirement of the user. For example, display content in a second window corresponding to a continuous leftward sliding operation is set to the desktop interface of the operating system, and display content in a second window corresponding to a continuous rightward sliding operation is set to the content that is browsed by the user last time. The user may perform setting before performing the screen splitting operation. In this way, the user can obtain, based on a setting of the user, second windows with different display content by using different screen splitting operations, to improve a degree of conformity between the screen splitting operation and the user requirement.

In addition to the foregoing disclosed setting manner, the display content in the second window may be alternatively set in other manners, which are not listed one by one herein.

Further, the display content in the second window and the first window may be the same. In this way, the user can browse and operate a same application. For example, the gallery is displayed in both the first window and the second window, a picture A in the gallery is displayed in the first window, and a picture B in the gallery is displayed in the second window. In this case, the user may browse or edit the picture A and the picture B. The display content in the second window and the first window may be different. In this way, the user can browse different applications and perform a further interaction operation. For example, as shown in FIG. 4③, content of a note is displayed in the first window, and describes an event of going to a park early in the morning for body exercise. In this case, content of the gallery is displayed in the second window, and includes information about various screenshots. The user can not only continue to edit the note, or browse and edit a picture, but also further select, from the information about these screenshots, a picture or a video corresponding to the content of the note, and insert the selected picture or video into the content of the note through copying and pasting, or direct drag from the second window to the first window, to complete editing of the note.

Figure 12:
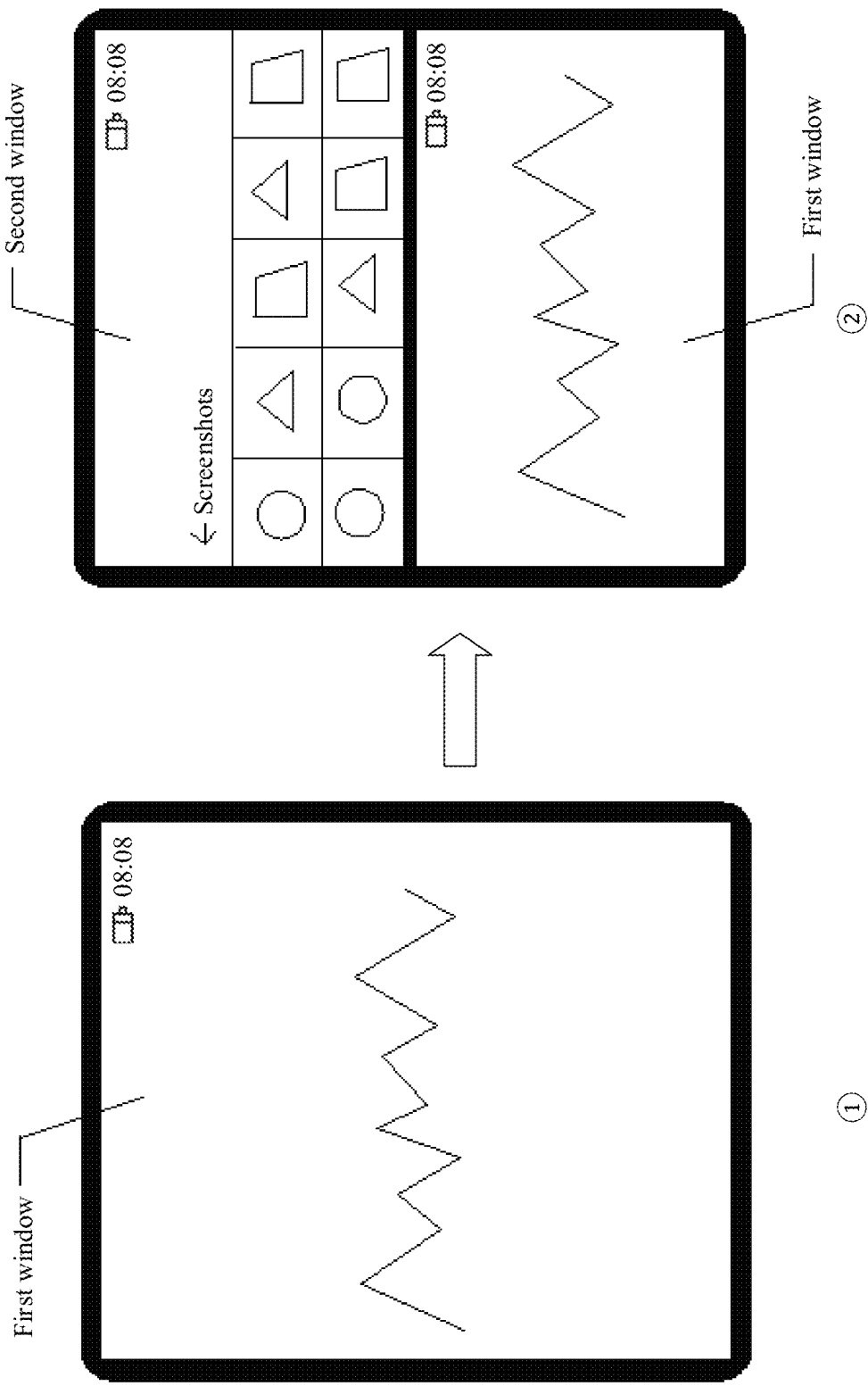
FIG. 12 is a schematic flowchart of horizontal split-screen display according to an embodiment of the present invention.

After the screen splitting operation, the first window and the second window need to share the display area of the display 002. Therefore, a display size corresponding to each window is relatively reduced. However, changes of the display size due to different sliding directions are different. For example, a horizontal size of the display 002 is less than a vertical size. FIG. 12 is a schematic flowchart of horizontal split-screen display according to an embodiment of the present invention. As shown in ① in FIG. 12, the display content in the first window is a line chart that needs to be horizontally displayed. In this case, to ensure a browsing effect of the user, on one hand, the user may directly select a continuous sliding operation from an upper part of the display 002 to a lower part of the display 002, to obtain an up-down split-screen mode in which the first window is displayed below and the second window is displayed above, as shown in ② in FIG. 12, Alternatively, the user may directly select continuous sliding operation from a lower part of the display 002 to an upper part of the display 002, to obtain an up-down split-screen mode in which the first window is displayed above and the second window is displayed below. Both the two screen splitting operations retain a horizontal size of the first window, to meet a requirement for displaying the line chart. On another hand, the user may use a screen splitting operation in any sliding direction. If the processor 004 detects that a requirement of the format of the display content in the first window does not match the sliding direction of the screen splitting operation, for example, the user uses a continuous sliding operation from the right side of the display 002 to the left side of the display 002, if the screen splitting operation selected by the user is performed, the first window and the second window are enabled to be in a left-right split-screen display mode, a vertical size of the first window is retained, and a horizontal size of the first window is sacrificed. As a result, a horizontal display requirement of the line chart cannot be met. In this case, the processor 004 may generate an operation prompt, for example, pop up a text "Whether the window display position needs to be adapted to the display content", to prompt the user to select an appropriate split-screen mode. If the user selects "Yes", after detecting the screen splitting operation of the user, the processor 004 may display, in an up-down split-screen manner, the first window and the second window that should be displayed in a left-right split-screen manner.

It should be noted that, in this embodiment, it is considered that the display content in the first window is display content that can be displayed in the split-screen manner. If the display content in the first window is display content that cannot be displayed in the split-screen manner, the electronic device 001 does not respond to the screen splitting operation. In this case, the user may be prompted, in a manner, for example, making no operation response, popping up a prompt box, for example, "The current application cannot be displayed in the split-screen manner", coloring an edge of the first window, or graying the first window, that the display content in the first window cannot be displayed in the split-screen manner.

Second Implementation

When the second window is a selectable window including at least one sub-window, display content in the sub-windows included in the second window is different. The display content in these sub-windows may be one or more of an application that is recently browsed by the user, the desktop of the operating system, a set of icons of frequently used applications, and an application that is most frequently browsed by the user in a recent period of time. The display content in each sub-window may be a default interface of each application (for example, a default interface of a browser is a home page of the browser), or may be a screenshot or the like of a corresponding user interface when the user stops using each application. It can be learned that, in this implementation, a selectable window that can be used by the user to select display content can be first generated by using the screen splitting operation, and then the user continues to determine a window that is finally to be displayed in the split-screen manner, to provide a more flexible choice for the user.

The sub-windows in the second window may be in different arrangement manners, to provide a more flexible selection manner for the user. Details are as follows.

Figure 13:
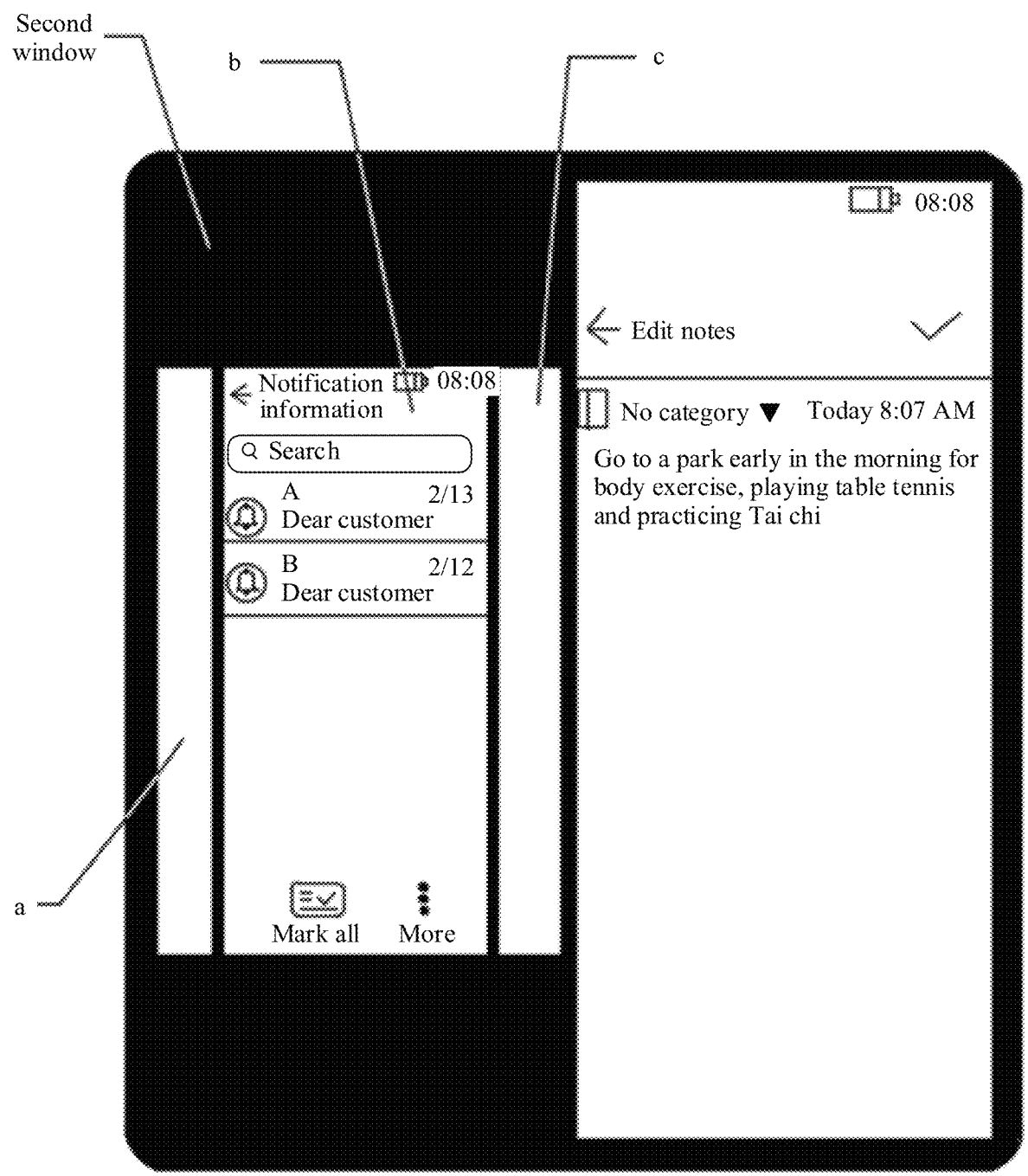
FIG. 13 is a schematic diagram of a structure of a first type of a second window according to an embodiment of the present invention.

(1) FIG. 13 is a schematic diagram of a structure of a first type of second window according to an embodiment of the present invention. As shown in FIG. 13, the sub-windows are in a single-row arrangement form. A sub-window b occupying a main display position of the second window blocks a right part of a sub-window a, and blocks a left part of a sub-window c. In this way, a larger display area can be provided for the sub-window b, so that the user clearly identifies display content in the sub-window b. Further, the user may slide leftward/rightward on an area corresponding to the second window, to scroll the sub-windows, and make the sub-windows located at the main display position of the second window one by one, so that the user clearly identifies the display content in each sub-window, to select a required sub-window.

Certainly, when the sub-windows are in the single-row arrangement form, the sub-windows may be in an unblocked arrangement manner.

Figure 14:
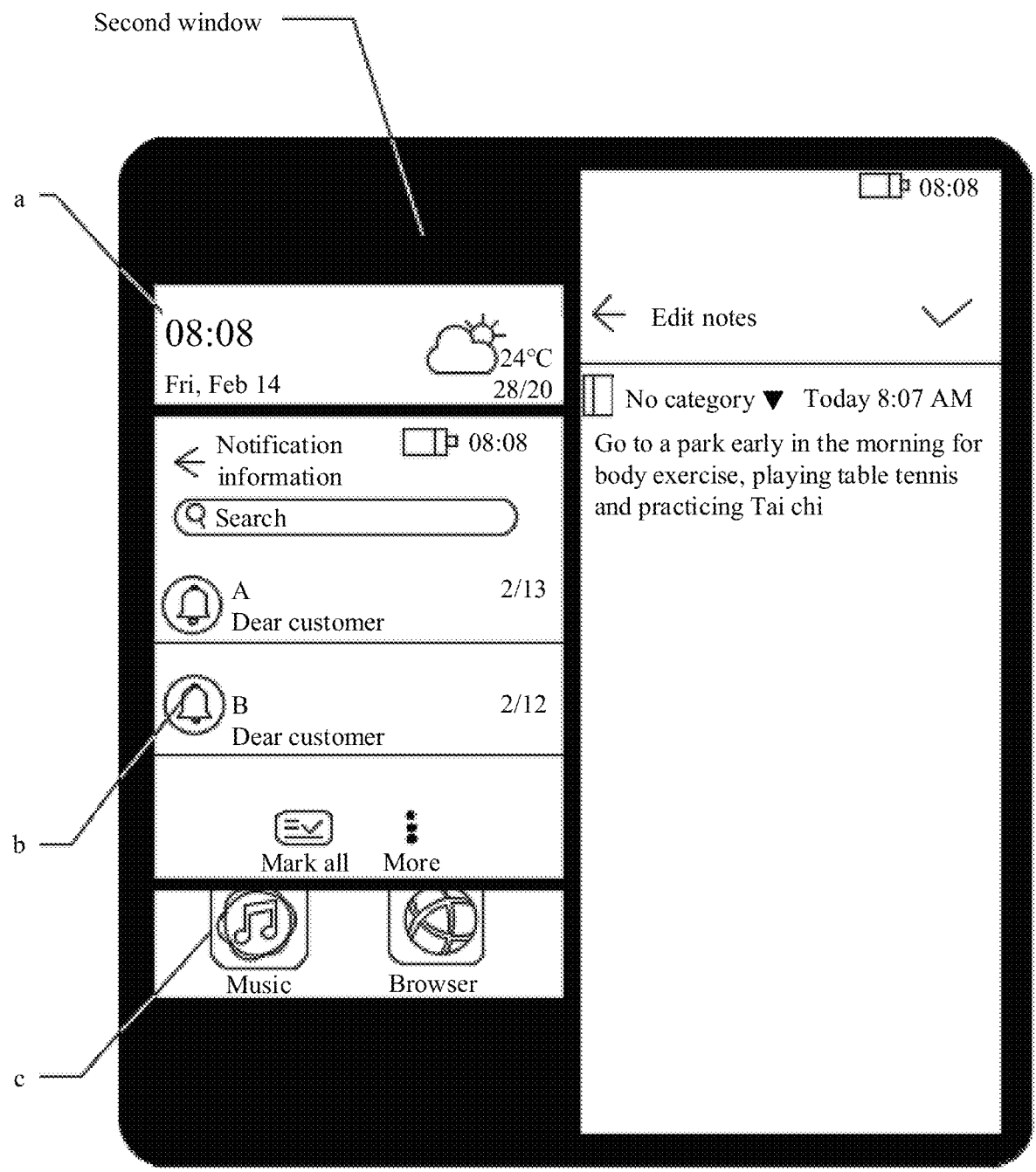
FIG. 14 is a schematic diagram of a structure of a second type of a second window according to an embodiment of the present invention.

(2) FIG. 14 is a schematic diagram of a structure of a second type of second window according to an embodiment of the present invention. As shown in FIG. 14, the sub-windows are in a single-column arrangement form. A sub-window b occupying a main display position of the second window blocks a lower part of a sub-window a, and blocks an upper part of a sub-window c. In this way, a larger display area is provided for the sub-window b, so that the user clearly identifies display content in the sub-window b. Further, the user may slide upward/downward on an area corresponding to the second window, to scroll the sub-windows, and make the sub-windows located at the main display position of the second window one by one, so that the user clearly identifies the display content in each sub-window, to select a required sub-window.

Certainly, when the sub-windows are in the single-column arrangement form, the sub-windows may be in an unblocked arrangement manner.

Figure 15:
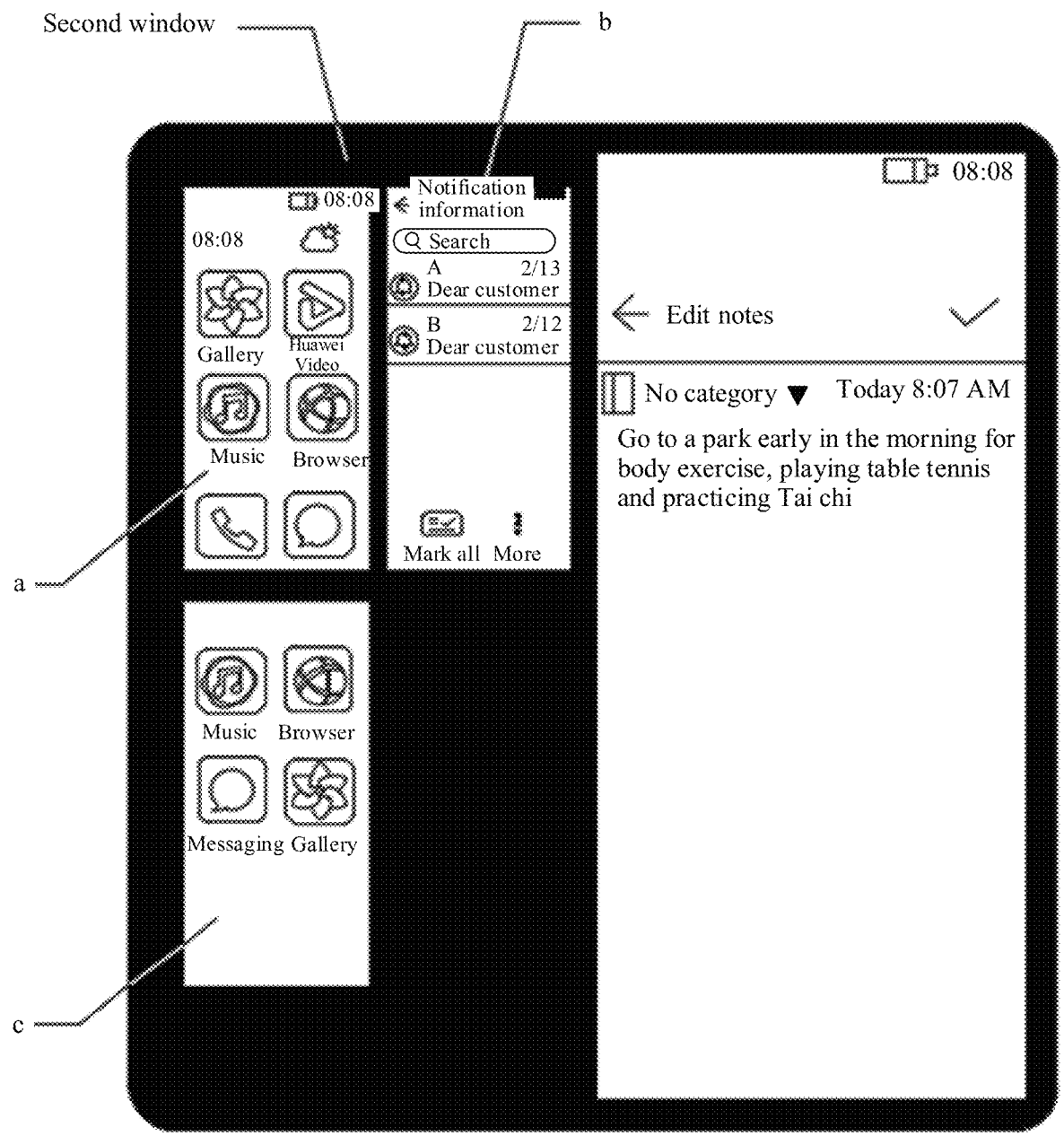
FIG. 15 is a schematic diagram of a structure of a third type of a second window according to an embodiment of the present invention.

(3) FIG. 15 is a schematic diagram of a structure of a third type of second window according to an embodiment of the present invention. As shown in FIG. 15, the sub-windows are in a multi-row and multi-column arrangement form, and all the sub-windows are distributed in a display area of the second window. When a quantity of the sub-windows is greater than a maximum quantity of sub-windows that can be displayed at a time on a current page of the second window, an extra sub-window is placed on a next page of the second window for display. The second window may use a manner of upward/downward page flipping or leftward/rightward page flipping. The user may slide upward/downward or slide leftward/rightward on an area corresponding to the second window, to perform page flipping, so as to browse each sub-window and select a required sub-window.

In the structures of the foregoing three second windows, the sub-windows may be arranged in an arrangement sequence based on a user setting or a system setting. For example, if an application that is browsed by the user last time, for example, information, is preferably arranged, because display content in the sub-window b is the information, as shown in FIG. 13, the sub-window b may be preferably displayed in a main display area of the second window. Alternatively, if the desktop interface of the operating system is preferably arranged, because display content in the sub-window a is the desktop interface of the operating system, as shown in FIG. 15, the sub-window a may be arranged at the first position, so that the user may preferably select the sub-window a.

Further, as shown in FIG. 13, FIG. 14, and FIG. 15, a total display size of sub-windows that are being displayed in the second window may be slightly less than the display size of the second window (there is a black area). In this way, a window proportion of each sub-window does not need to be forcibly changed to fill the second window, to avoid deformation of the display content in the sub-window. In addition, in such a display manner, this can effectively prompt the user that a current window is the second window (selectable window), and reduce a probability that the user performs a misoperation by using the current window as a common window.

It should be noted that the sub-windows in the second window may include a sub-window in which display content the same as that in the first window is displayed. In this way, the user can browse different content in a same application at the same time by selecting the sub-window. For specific descriptions, refer to the foregoing descriptions of that the display content in the second window is the same as the display content in the first window. Details are not described herein again.

If the screen splitting operation is a continuous sliding operation, when the screen splitting operation is performed, the display statuses of the first window and the second window change as follows.

Figure 16:
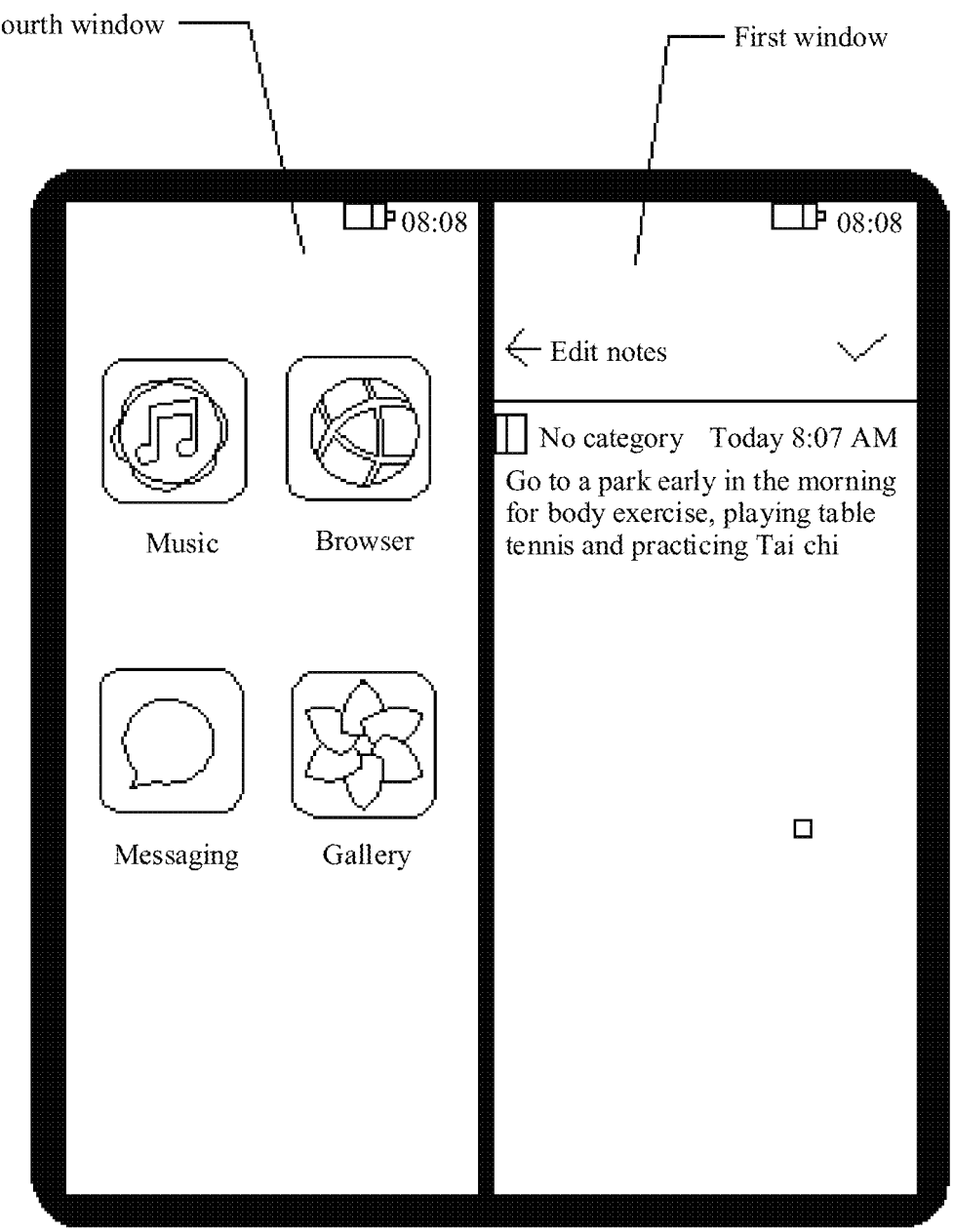
FIG. 16① to FIG. 16③ are a schematic flowchart of a sixth type of displaying a plurality of windows in a split-screen manner according to an embodiment of the present invention.

In a first change manner, FIG. 16①  to FIG. 16③ are used as an example. In the process of responding to the screen splitting operation, the first window does not need to change the display status. After the screen splitting operation ends, the second window and the first window that are displayed in the split-screen manner and that are shown in FIG. 16② are directly obtained.

In a second change manner, FIG. 17① to FIG. 17③ are a schematic flowchart of a seventh type of displaying the plurality of windows in the split-screen manner according to this embodiment of the present invention. As shown in FIG. 17②, in the process of responding to the screen splitting operation, the first window changes the display status, and at the same time, a window is displayed on the left side of the first window. The window is a sub-window in the second window, for example, information. The window is gradually moved rightward with the screen splitting operation, and as shown in FIG. 17③, is switched to the second window when a sliding distance reaches the first distance threshold or sliding duration reaches the first duration threshold. The sub-window that is preferably displayed in the second window may be the foregoing displayed window, for example, a sub-window in which display content is the information, or may be a sub-window located first in the sub-windows in the second window in the foregoing arrangement manner.

In addition to the foregoing provided case in which the second window is displayed from the left side of the first window, another sliding direction for displaying the second window may be alternatively selected based on the requirement of the format of the display content in the first window, for example, the second window is displayed from the right side, the top, or the bottom of the first window.

After the second window is displayed on the side of the first window, the first window and the second window are displayed on the display 002 in the split-screen manner. A split-screen display manner of the first window and the second window is specifically as follows.

First Implementation

When the second window is a full-screen window, as shown in FIG. 4③, the first window and the second window may be directly displayed on the display 002 on in the split-screen manner.

Further, based on this implementation, a secondary screen splitting operation may be further performed. Details are as follows.

In an implementation,

S4: Detect the secondary screen splitting operation of the user on the second window.

S5: Replace the second window with a third window in response to the secondary screen splitting operation. The third window is a full-screen window or an operable window including at least one sub-window.

The secondary screen splitting operation may be in the following manners.
  (1) The secondary screen splitting operation may be a continuous sliding operation. A sliding distance of the secondary screen splitting operation is greater than or equal to a second distance threshold, or sliding duration of the secondary screen splitting operation is greater than or equal to a second duration threshold.

In an implementation, the third window obtained after the secondary screen splitting operation is a full-screen window.

FIG. 18① to FIG. 18③ are a schematic flowchart of an eighth type of displaying the plurality of windows in the split-screen manner according to this embodiment of the present invention. As shown in FIG. 18①, when the user performs the secondary screen splitting operation, the display 002 displays the first window and the second window in the split-screen manner. As shown in FIG. 18②, when responding to the secondary screen splitting operation, the processor 004 changes the display statuses of the first window and the second window as a whole window, the first window and the second window are moved rightward at the same time, and the third window is displayed from the left side of the second window. As shown in FIG. 18③, after the secondary screen splitting operation ends, the second window is replaced with the third window, and the display 002 displays the third window and the first window in the split-screen manner.

FIG. 19① to FIG. 19③ are a schematic flowchart of a ninth type of displaying the plurality of windows in the split-screen manner according to this embodiment of the present invention. As shown in FIG. 19①, when the user performs the secondary screen splitting operation, the display 002 displays the first window and the second window in the split-screen manner. For example, the secondary screen splitting operation is a continuous sliding operation from left to right. When the processor 004 detects the secondary screen splitting operation of the user, as shown in FIG. 19②, the second window is moved rightward with the secondary screen splitting operation, and the third window is gradually introduced on the left side of the second window, and the display status of the first window remains unchanged. As shown in FIG. 19③, after the secondary screen splitting operation ends, the third window is completely displayed on the left side of the display 002, and the second window completely slides out of the left side of the display 002, and is no longer displayed. In this case, the display 002 displays the third window and the first window in the split-screen manner.

FIG. 19①and FIG. 19② are a schematic flowchart of a tenth type of displaying the plurality of windows in the split-screen manner according to this embodiment of the present invention. As shown in FIG. 20①, when the user performs the secondary screen splitting operation, the display 002 displays the first window and the second window in the split-screen manner. When the user performs the secondary screen splitting operation, both the display statuses of the first window and the second window remain unchanged. When the screen splitting operation ends, as shown in FIG. 20②, the second window is directly replaced with the third window.

In another implementation, the third window obtained after the secondary screen splitting operation is an operable window including at least one sub-window.

FIG. 21① to FIG. 21③ are a schematic flowchart of an eleventh type of displaying the plurality of windows in the split-screen manner according to this embodiment of the present invention. As shown in FIG. 21①, when the user performs the secondary screen splitting operation, the display 002 displays the first window and the second window in the split-screen manner. As shown in FIG. 21②, when responding to the secondary screen splitting operation, the processor 004 changes the display statuses of the first window and the second window as a whole window, the first window and the second window are moved rightward at the same time, a sub-window in the third window is introduced from the left side of the second window. As shown in FIG. 21③, after the secondary screen splitting operation ends, the second window is replaced with the third window, and the display 002 displays the third window and the first window in the split-screen manner.

FIG. 22① to FIG. 22③ are a schematic flowchart of a twelfth type of displaying the plurality of windows in the split-screen manner according to this embodiment of the present invention. As shown in FIG. 22①, when the user performs the secondary screen splitting operation, the display 002 displays the first window and the second window in the split-screen manner. As shown in FIG. 22②, when the processor 004 responds to the secondary screen splitting operation, the display status of the first window remains unchanged, and the display status of the second window changes. When the secondary screen splitting operation ends, as shown in FIG. 22③, the first window and the third window are displayed in the split-screen manner.

FIG. 23① and FIG. 23② are a schematic flowchart of a thirteenth type of displaying the plurality of windows in the split-screen manner according to this embodiment of the present invention. As shown in FIG. 23①, when the user performs the secondary screen splitting operation, the display 002 displays the first window and the second window in the split-screen manner. As shown in FIG. 23②, when the processor 004 responds to the secondary screen splitting operation, both the display statuses of the first window and the second window remain unchanged. When the screen splitting operation ends, as shown in FIG. 23③, the second window is directly replaced with the third window.

(2) The secondary screen splitting operation may be a continuous sliding operation, and the secondary screen splitting operation and the screen splitting operation are a continuous operation. A sum of sliding distances of the screen splitting operation and the secondary screen splitting operation is greater than or equal to a third distance threshold, or a sum of sliding duration of the screen splitting operation and the secondary screen splitting operation is greater than or equal to a third duration threshold.

The secondary screen splitting operation and the screen splitting operation may be two independent sliding operations. In this way, the user can replace the second window by using two continuous sliding operations. When a size of the display 002 is small and does not meet a long sliding distance, a secondary screen splitting function can also be implemented.

The secondary screen splitting operation and the screen splitting operation may be alternatively one continuous operation. In this case, the user may implement a secondary screen splitting function by using only one continuous sliding operation, to simplify the user operation.

(3) The secondary screen splitting operation may be sliding from any corner of the second window to the inside of the second window.

FIG. 24① and FIG. 24② are a schematic flowchart of a fourteenth type of displaying the plurality of windows in the split-screen manner according to this embodiment of the present invention. As shown in FIG. 24①, the secondary screen splitting operation is sliding from the any corner of the third window to the inside of the third window. Before the user performs the secondary screen splitting operation, the display 002 displays the first window and the third window in the split-screen manner, and a case in which a response object of the secondary screen splitting operation is the third window is analyzed. The secondary screen splitting operation is an operation of sliding from the any corner (the lower left corner of the third window in this example) of the third window to the third window. In this case, duration and a distance of sliding are not limited. In a process of responding to the secondary screen splitting operation, the display status of the first window remains unchanged. As shown in FIG. 24②, after the secondary screen splitting operation ends, the third window is replaced with the second window, and the second window is an operable window including at least one sub-window. For some applications, some error responses may be generated to a sliding operation. For example, the display content in the third window is a drawing. In this case, if a continuous sliding operation is performed on the third window to trigger a screen splitting effect, because an operation area is located on a canvas, the processor 004 is likely to identify the operation as an operation of performing editing on the canvas instead of a screen splitting operation. However, the secondary screen splitting operation provided in this implementation may be distinguished from an operation in these specific applications, to improve accuracy of responding to the secondary screen splitting operation. In addition, because action amplitude of the secondary screen splitting operation is small, the user operation is more convenient.

(4) The secondary screen splitting operation may be that at least two fingers slide to the inside of the second window at the same time.

FIG. 25① and FIG. 25② are a schematic flowchart of a fifteenth type of displaying the plurality of windows in the split-screen manner according to this embodiment of the present invention. As shown in FIG. 25①, the secondary screen splitting operation is that the at least two fingers act on the third window and slide to the inside of the third window at the same time. Before the user performs the secondary screen splitting operation, the display 002 displays the first window and the third window in the split-screen manner, and a case in which a response object of the secondary screen splitting operation is the third window is analyzed. The secondary screen splitting operation is a convergence and sliding operation of the at least two fingers on the third window. As shown in FIG. 25①, three fingers are used as an example. The three fingers slide from a position, that is shown in the figure, in an arrow direction, and a distance between the fingers reduces, to generate a convergence effect. In a process of responding to the secondary screen splitting operation, the display status of the first window remains unchanged. As shown in FIG. 25②, after the secondary screen splitting operation ends, the third window is replaced with the second window, and the second window is an operable window including at least one sub-window.

(5) The secondary screen splitting operation may be sliding upward from a specified area at the bottom of the second window or sliding downward from a specified area at the top of the third window.

FIG. 26① and FIG. 26② are a schematic flowchart of a sixteenth type of displaying the plurality of windows in the split-screen manner according to this embodiment of the present invention. As shown in FIG. 26①, the secondary screen splitting operation is sliding upward from the specified area at the bottom of the third window or sliding downward from the specified area at the top of the third window. Before the user performs the secondary screen splitting operation, the display 002 displays the first window and the third window in the split-screen manner, and a case in which a response object of the secondary screen splitting operation is the third window is analyzed. The secondary screen splitting operation is an operation of sliding from the specified area at the top or the specified area at the bottom of the third window to the inside of the third window. In this case, duration and a distance of sliding are not limited. In a process of responding to the secondary screen splitting operation, the display status of the first window remains unchanged. As shown in FIG. 26②, after the secondary screen splitting operation ends, the third window is replaced with the second window, and the second window is an operable window including at least one sub-window. The specified area at the top and the specified area at the bottom need to be distinguished from the operation area corresponding to the existing gesture operation. For example, the existing gesture operation is sliding downward from the top of the display 002 to drag out a shortcut menu bar. Generally, the operation area corresponding to the existing gesture operation is a middle area at the top of the display 002. Therefore, for distinction, a specified operation area for the secondary screen splitting operation may be set to an area other than the middle area at the top of the display 002. As shown in FIG. 26①, the specified operation area is a left area (a dashed-line box area) at the top of the third window.

The secondary screen splitting operation provided in (1), (2), (3), (4), and (5) can effectively simplify an operation of the user, and can improve accuracy of responding to the secondary screen splitting operation by the processor 004.

In a case in which the third window obtained by the secondary screen splitting operation is an operable window including at least one sub-window, a relationship between the second window and the third window may be as follows.

(1) The second window may be used as a sub-window in the third window. The second window may be directly and preferably displayed at a main display position of the third window. For example, if the display content in the second window is the gallery, a sub-window in which display content is the gallery is first displayed at the main display position of the third window obtained after replacement. Alternatively, the second window is located in a given sub-window arrangement sequence of the third window, and a sub-window located first in the sub-window arrangement sequence is first displayed at a main display position of the third window obtained after replacement. As shown in FIG. 21① to FIG. 21③, the display content in the second window is screenshots. However, in the given sub-window arrangement sequence of the third window, a set of the frequently used applications is a sub-window that is located first. Therefore, the set of the frequently used applications is first located at the main display position of the third window. It can be learned that, when the second window is used as a sub-window of the third window, the user may still select, as a window that is displayed in the split-screen manner, a sub-window corresponding to the second window. In this way, once the user mistakenly replaces the second window with the third window, the user can further reselect, by using a further selection process, the sub-window corresponding to the second window for display.

(2) The second window is no longer used as a sub-window in the third window for selection by the user. Generally, it may be considered that, if the user still chooses to replace the second window with the third window for further selection on the basis of already displaying the second window, it indicates that the user prefers to browse a window other than the second window, and no longer continues to switch the second window to a sub-window in the third window for display. This can effectively reduce time for the user to browse and identify display content in a sub-window, thereby improving selection efficiency of the user.

In another implementation,

S6: Detect the secondary screen splitting operation of the user on the second window.

S7: Display a third window on one side of the second window in response to the secondary screen splitting operation. The third window is a full-screen window or an operable window including at least one sub-window.

The secondary screen splitting operation is a continuous sliding operation, and the secondary screen splitting operation and the screen splitting operation are two independent operations. A sliding distance of the secondary screen splitting operation is greater than or equal to a second distance threshold, or sliding duration of the secondary screen splitting operation is greater than or equal to a second duration threshold. (The second distance threshold and the second duration threshold in this implementation are not associated with the second distance threshold and the second duration threshold in the previous implementation.)

Alternatively, the secondary screen splitting operation is a continuous sliding operation, and the secondary screen splitting operation and the screen splitting operation are a continuous operation. A sum of sliding distances of the secondary screen splitting operation and the screen splitting operation is greater than or equal to a third distance threshold, or a sum of sliding duration of the secondary screen splitting operation and the screen splitting operation is greater than or equal to a third duration threshold. (The third distance threshold and the third duration threshold in this implementation are not associated with the third distance threshold and the third duration threshold in the previous implementation.)

When the processor 003 responds to the secondary screen splitting operation, the third window is displayed on the side of the second window. A specific display manner is as follows.

In one case, both the first window and the second window respond to the secondary screen splitting operation. To be specific, after the secondary screen splitting operation, both the display statuses of the first window and the second window change.

(1) FIG. 27① to FIG. 27③ are a schematic flowchart of a seventeenth type of displaying the plurality of windows in the split-screen manner according to this embodiment of the present invention. As shown in FIG. 27①, the display 002 displays the second window and the first window in the split-screen manner. As shown in FIG. 27②, the third window is displayed on the left side of the second window. After the secondary screen splitting operation, as shown in FIG. 27③, the third window, the second window, and the first window are displayed on the display 002 in the split-screen manner. In this case, the third window is a full-screen window.

Figure 28B:
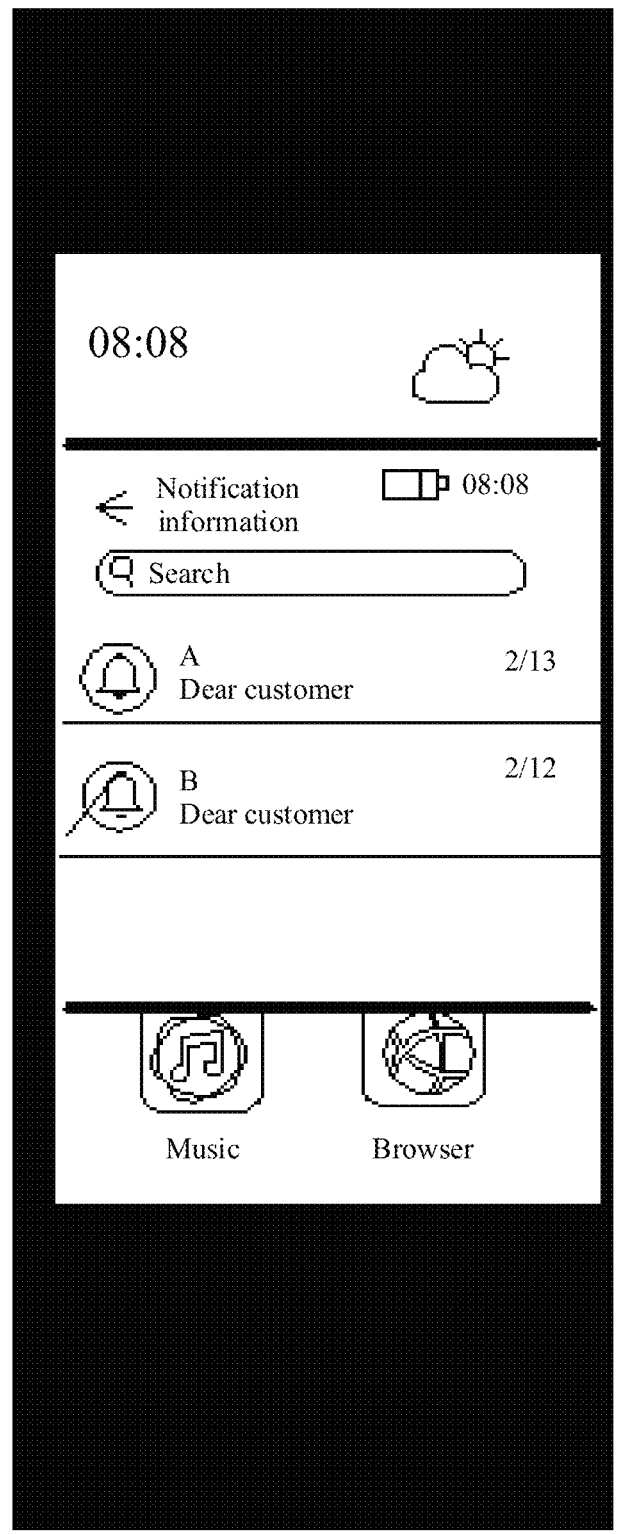
FIG. 28b is a schematic enlarged diagram of a third window in FIG. 28a① to FIG. 28a③ according to an embodiment of the present invention.

(2) FIG. 28a① to FIG. 28a③ are a schematic flowchart of an eighteenth type of displaying the plurality of windows in the split-screen manner according to this embodiment of the present invention. As shown in FIG. 28a①, the display 002 displays the second window and the first window in the split-screen manner. As shown in FIG. 28a②, the third window is displayed on the left side of the second window. After the secondary screen splitting operation, as shown in FIG. 28a③, the third window, the second window, and the first window are displayed on the display 002 in the split-screen manner. In this case, the third window is an operable window including at least one sub-window.

In another case, only one of the first window and the second window responds to the secondary screen splitting operation. For example, the second window responds to the secondary screen splitting operation. After the secondary screen splitting operation, only the display status of the second window changes, and the display status of the first window remains unchanged.

Figure 29B:
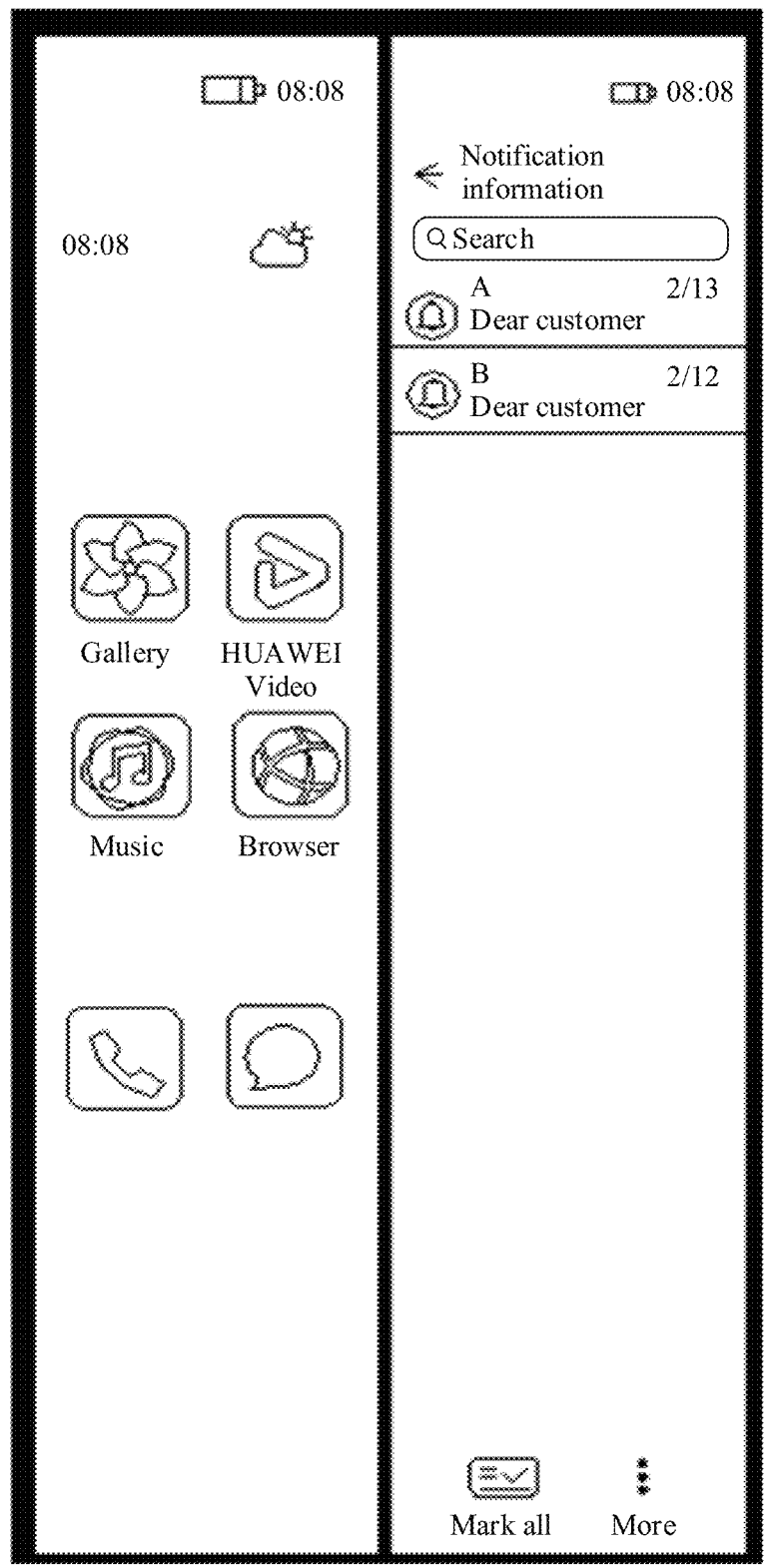
FIG. 29b is a schematic enlarged diagram of a third window and a second window in FIG. 29a③ according to an embodiment of the present invention.

(3) FIG. 29a① to FIG. 29a③ are a schematic flowchart of a nineteenth type of displaying the plurality of windows in the split-screen manner according to this embodiment of the present invention. As shown in FIG. 29a①, the display 002 displays the second window and the first window in the split-screen manner. As shown in FIG. 29a②, the third window is displayed on the left side of the second window, but the display status of the first window remains unchanged. After the secondary screen splitting operation, as shown in FIG. 29a③, the third window, the second window, and the first window are displayed on the display 002 in the split-screen manner. In this case, the third window is a full-screen window, and the third window and the second window are equivalent to being displayed in the area corresponding to the original second window.

Figure 30B:
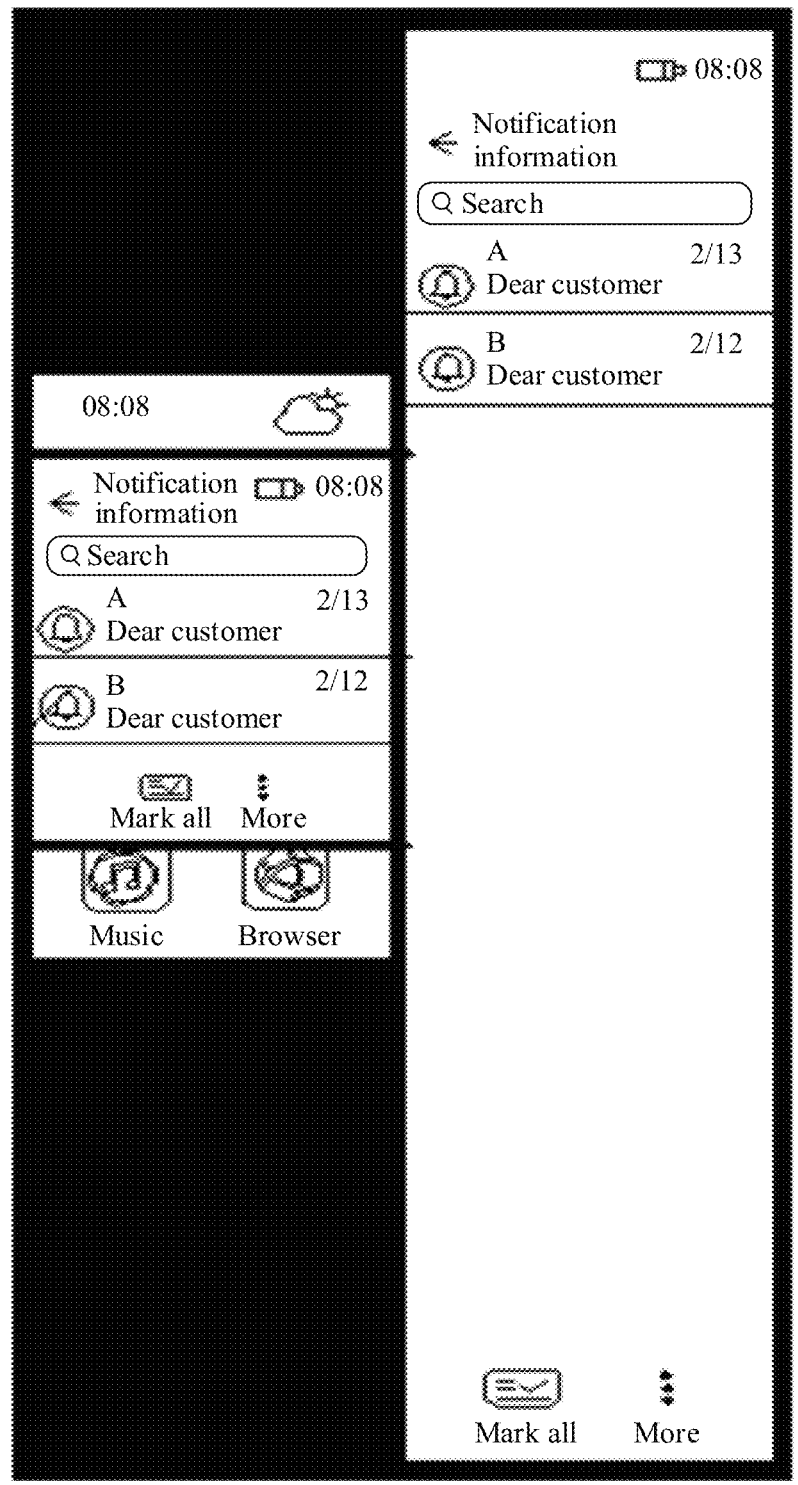
FIG. 30b is a schematic enlarged diagram of a third window and a second window in FIG. 30a③ according to an embodiment of the present invention.

(4) FIG. 30a① to FIG. 30a③ are a schematic flowchart of a twentieth type of displaying the plurality of windows in the split-screen manner according to this embodiment of the present invention. As shown in FIG. 30a①, the display 002 displays the second window and the first window in the split-screen manner. As shown in FIG. 30a②, the third window is displayed on the left side of the second window, but the display status of the first window remains unchanged. After the secondary screen splitting operation, as shown in FIG. 30a③, the third window, the second window, and the first window are displayed on the display 002 in the split-screen manner. In this case, the third window is an operable window including at least one sub-window, and the third window and the second window are equivalent to being displayed in the area corresponding to the original second window.

Optionally, when the user performs the secondary screen splitting operation described in S6 and S7, a corresponding split-screen mode may be consistent with or inconsistent with a split-screen mode of a window currently displayed on the display 002. A split-screen mode is a distribution manner of windows on the display 002, for example, left-right distribution or up-down distribution.

For example, the split-screen mode corresponding to the secondary screen splitting operation of the user in FIG. 27① to FIG. 30 and a split-screen mode of the first window and the second window are consistent, and are both a split-screen mode in which windows are distributed in a left-right manner.

FIG. 31① and FIG. 31② are a schematic flowchart of a twenty-first type of displaying the plurality of windows in the split-screen manner according to this embodiment of the present invention. Before the user performs the secondary screen splitting operation, as shown in FIG. 31①, the display 002 displays the first window and the second window in the split-screen manner, and the first window and the second window are in a left-right split-screen mode. The secondary screen splitting operation is performed on the second window, and a split-screen mode corresponding to the screen splitting operation is a split-screen mode in which windows are distributed up and down. As shown in FIG. 31②, after the secondary screen splitting operation, the third window is displayed below the second window, that is, the second window and the third window are displayed in the split-screen manner in the area corresponding to the original second window, and the second window and the third window are in a split-screen mode of up-down distribution. In this way, as shown in FIG. 31① and FIG. 31②, if the display content in the second window is content whose horizontal size needs to be retained, for example, the line chart, this screen splitting manner can effectively ensure display integrity of the display content in the second window, to reduce impact on browsing of the user.

In an implementation, if the display 002 already displays the first window and the second window in the split-screen manner when the user performs the screen splitting operation for the first time, and both the first window and the second window are full-screen windows, the secondary screen splitting operation provided in the foregoing two implementations may be used as the screen splitting operation, to split the first window and the second window. It should be noted that the foregoing processes are all described by using the secondary screen splitting operation for the second window as an example. Similarly, the secondary screen splitting operation may be alternatively performed on the first window. A process is the same as that described above. Details are not described herein again.

After the second window (an operable window including at least one sub-window) is obtained by using the foregoing screen splitting operation, and the third window (the operable window including the at least one sub-window) is obtained by using the secondary screen splitting operation, the user may continue to select, from the second window or the third window by using a selection operation, a sub-window that is to be finally displayed in the split-screen manner. A specific process is as follows.

(1) For the second window (an operable window including at least one sub-window)

S8: Detect a first selection operation of the user on the second window.

S9: In response to the first selection operation, select a fourth window from the sub-windows in the second window.

S10: Display the first window and the fourth window in the split-screen manner.

(2) For the third window (an operable window including at least one sub-window)

S11: Detect a second selection operation of the user on the third window.

S12: In response to the second selection operation, select a fifth window from the sub-windows in the third window.

S13: Display the first window and the fifth window in the split-screen manner.

The following uses the first selection operation as an example for description.

(1) The first selection operation includes a first sub-operation and a second sub-operation. The first sub-operation may be a sliding operation. For example, the user slides in the area corresponding to the second window, so that different sub-windows are displayed in the main display area of the second window. In this way, the user can carefully identify display content in the different sub-windows. FIG. 16①to FIG. 16③ are used as an example. The second window shown in FIG. 16② is obtained by using the screen splitting operation. It can be seen that the second window is an operable window in which a plurality of sub-windows are displayed in a single row, display content in a sub-window currently located at a main display position of the second window is an interface of a set of icons of applications that can be displayed in the split-screen manner, display content in a sub-window located on the left side of the sub-window may be an interface of the desktop of the operating system (if there are a plurality of interfaces of the desktop of the operating system, the interface may be any one of the interfaces, or may be one preset by the user), and display content in a sub-window located on the right side of the sub-window may be a screenshot of an interface of the application that is browsed by the user last time. In this way, the user can slide leftward or rightward in the area corresponding to the second window, so that these sub-windows are displayed in the main display area of the second window.

The second sub-operation may be a tap operation. The user selects, by using a tap, a sub-window that is to be finally displayed in the split-screen manner as the fourth window. It is continued from the foregoing example. As shown in FIG. 16③, the user selects, by using a tap, the sub-window in which the display content is the interface of the set of the icons of the applications that can be displayed in the split-screen manner, and uses the sub-window as the fourth window for split-screen display together with the first window.

(2) The first selection operation is a continuous sliding operation. For example, the user slides on the second window. When the sliding operation stops, a sub-window that stays in the main display area of the second window is the fourth window. If a sub-window in which display content is an interface of a set of icons of applications that can be displayed in the split-screen manner and that is in FIG. 16② is the sub-window that stays in the main display area of the second window when the sliding operation stops, as shown in FIG. 16③, the sub-window is used as the fourth window for split-screen display together with the first window.

The first selection operation provided in (2) and the screen splitting operation may be one continuous operation, or may be two independent operations. When the screen splitting operation and the first selection operation are one continuous operation, the user may implement, by using a minimum quantity of times of operations, an effect of displaying the plurality of windows in the split-screen manner, to simplify an operation manner of the user. When the screen splitting operation and the first selection operation are two independent operations, a display in a small size may be adapted. For example, when the size of the display 002 cannot meet an operation distance required for using the screen splitting operation and the first selection operation as one continuous operation, or when it is difficult for the user to perform long-distance continuous sliding when the user holds the electronic device 001, an effect of displaying the plurality of windows in the split-screen manner can still be implemented by using a plurality of independent operations.

The second selection operation may also include two operation manners. (1) The second selection operation includes a third sub-operation and a fourth sub-operation. For specific operation manners of the third sub-operation and the fourth sub-operation, refer to the first sub-operation and the second sub-operation. (2) The second selection operation is a continuous sliding operation. In this case, for a specific operation manner of the second selection operation, refer to an operation manner when the first selection operation is a continuous sliding operation. A difference lies in that the second selection operation and the secondary screen splitting operation may be one continuous operation, or may be two independent operations.

Optionally, before the screen splitting operation, a trigger operation may be further included. The trigger operation may be a continuous sliding operation, and a sliding distance of the trigger operation is greater than or equal to a fourth distance threshold, or sliding duration of the trigger operation is greater than or equal to a fourth duration threshold. The fourth distance threshold is less than the first distance threshold, and the fourth duration threshold is less than the first duration threshold.

The processor 004 responds to the trigger operation, to trigger the electronic device 001 to enable the function of displaying the plurality of windows in the split-screen manner. In a process of performing the trigger operation, the display status of the first window remains unchanged. After the trigger operation is completed, the electronic device 001 correspondingly enables the function of displaying the plurality of windows in the split-screen manner. In this case, the first window is in a state in which the first window may be displayed in the split-screen manner. To be specific, the display size, the display position, the format of the display content, and the like may be changed with a subsequent screen splitting operation of the user.

An end position of the trigger operation and the initial position of the screen splitting operation may be a same position or different positions on the display 002. A sliding direction of the trigger operation and the sliding direction of the screen splitting operation may be a same direction or different directions. In other words, the trigger operation and the screen splitting operation may be one continuous operation or two independent operations.

It should be explained that, when the trigger operation and the screen splitting operation are one continuous operation, in the continuous operation, a sliding operation whose sliding distance from an initial position to a middle position of the continuous operation meets the fourth distance threshold may be considered as the trigger operation by default, and a sliding operation from the middle position to an end position may be considered as the screen splitting operation by default. In other words, the user performs a continuous sliding operation on the display 002, and the processor 004 analyzes an operation signal transferred by the touch panel 003. If it is detected that a sliding distance from an initial position to a middle position of the continuous sliding operation of the user is equal to the fourth distance threshold, or sliding duration from an initial position to a middle position of the continuous sliding operation is equal to the fourth duration threshold, a continuous sliding operation of the user from the initial position to the middle position is equivalent to the trigger operation, and the function of displaying the plurality of windows in the split-screen manner by the electronic device 001 may be successfully triggered. In this case, the processor 004 continues to analyze the operation signal transferred by the touch panel 003. If it is detected that a distance from the middle position to an end position of the continuous sliding operation of the user is greater than or equal to the first distance threshold, or duration from the middle position to an end position of the continuous sliding operation is greater than or equal to the first duration threshold, a continuous sliding operation of the user from the middle position to the end position is equivalent to the screen splitting operation. This can successfully implement the effect of displaying the plurality of windows in the split-screen manner.

In a manner in which the trigger operation and the screen splitting operation are one continuous operation, an operation step of the user can be effectively simplified, and operation efficiency of the user can be improved.

In a manner in which the trigger operation and the screen splitting operation are two independent operations, if the size of the display is small, and it is difficult to meet an operation distance required for using the trigger operation and the screen splitting operation as one continuous operation, or when it is difficult for the user to perform long-distance continuous sliding when the user holds the electronic device, the effect of displaying the plurality of windows in the split-screen manner may still be implemented by using a plurality of independent operations.

In this implementation, a prerequisite for implementing the screen splitting operation is that the trigger operation is performed, and there is no other operation between the screen splitting operation and the trigger operation. In other words, as long as the electronic device 001 is enabled, by using the trigger operation, to enable the function of displaying the plurality of windows in the split-screen manner, if the user continues to perform the screen splitting operation, the effect of displaying the plurality of windows in the split-screen manner is achieved. However, if there is another operation between the trigger operation and the screen splitting operation, for example, a tap operation, the trigger operation becomes invalid.

Further, after the trigger operation is successfully enabled, the electronic device 001 is continuously in a preparation status for responding to the screen splitting operation, and therefore, corresponding power consumption is generated. To reduce such power consumption, a specific expiration time period may be set. To be specific, after the trigger operation succeeds, if the user performs no screen splitting operation within a preset duration range on a basis of the fact that there is no other operation other than the screen splitting operation, the electronic device 001 may disable the function of displaying the plurality of windows in the start, to make the trigger operation invalid. If the user needs to display the plurality of windows in the split-screen manner, the user needs to perform a corresponding operation again from the trigger operation.

Embodiment 3

This embodiment is specific to a foldable-display electronic device in a folded state.

Figure 32B:
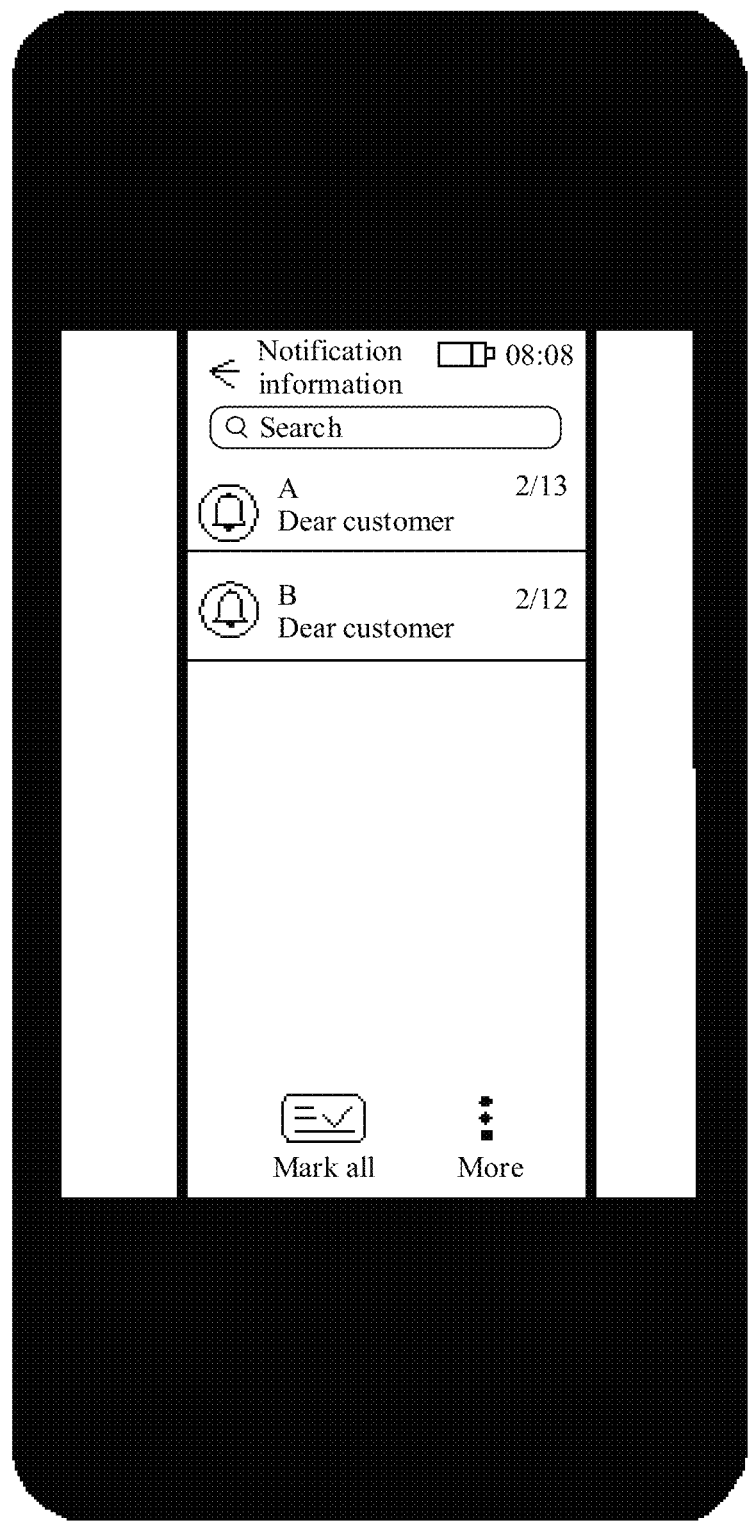
FIG. 32b is a schematic enlarged diagram of FIG. 32a③ according to an embodiment of the present invention.

FIG. 32a① to FIG. 32a④ are a schematic flowchart of an application switching method for a foldable-display electronic device in a folded state according to an embodiment of the present invention. As shown in FIG. 32a①, the figure shows a side display on which the foldable-display electronic device works, and the screen splitting operation of the user is performed on the side display. In this embodiment, the screen splitting operation is used to replace the first window with the second window, and the second window is an operable window including at least one sub-window. The user continues to perform a selection operation, and the selection operation is used to select a third window from the sub-windows in the second window, and display the third window on the side display. As shown in FIG. 32a①, the first window is a window displayed on the side display before the user performs the screen splitting operation. As shown in FIG. 32a②, the first window changes a display status with the screen splitting operation, and the second window is displayed from the left side. As shown in FIG. 32a③, the first window is replaced with the second window. As shown in FIG. 32a4, the user continues to perform the selection operation, and may select the third window from the sub-windows for display on the side display. In the foregoing process, an example in which the screen splitting operation is a continuous sliding operation is used. A sliding distance of the continuous sliding operation is greater than or equal to a first distance threshold, or sliding duration of the continuous sliding operation is greater than or equal to a first duration threshold. The first distance threshold and the first duration threshold in this embodiment are not associated with the first distance threshold and the first duration threshold in Embodiment 1 and Embodiment 2.

In this embodiment, the screen splitting operation and a corresponding screen splitting effect may also be the same as the screen splitting operation and a corresponding screen splitting effect provided in Embodiment 1 and Embodiment 2. For details, refer to descriptions in Embodiment 1 and Embodiment 2. Details are not described herein again.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A method, comprising:
displaying a first window in full screen;
detecting a screen splitting operation of a user on the first window, wherein the screen splitting operation is a continuous sliding operation, and a sliding distance of the screen splitting operation is greater than or equal to a first distance threshold, or a sliding duration of the screen splitting operation is greater than or equal to a first duration threshold;

responding to the screen splitting operation, and displaying a second window on a first side of the first window, wherein the second window is a full-screen window or an operable window comprising at least one sub-window;

displaying the first window and the second window in a split-screen manner; and when the second window is the full-screen window, after responding to the screen splitting operation, and detecting a secondary screen splitting operation of the user on the second window, and replacing the second window with a third window in response to the secondary screen splitting operation, wherein the third window is a full-screen window or an operable window comprising at least one sub-window; and wherein:
  the secondary screen splitting operation is a continuous sliding operation, and a sliding distance of the secondary screen splitting operation is greater than or equal to a second distance threshold, or a sliding duration of the secondary screen splitting operation is greater than or equal to a second duration threshold; or
  the secondary screen splitting operation is a continuous sliding operation, the secondary screen splitting operation and the screen splitting operation are a continuous sliding operation, and a sum of sliding distances of the screen splitting operation and the secondary screen splitting operation is greater than or equal to a third distance threshold, or a sum of a sliding duration of the screen splitting operation and the secondary screen splitting operation is greater than or equal to a third duration threshold; or
  the secondary screen splitting operation is an operation of sliding from any corner of the second window to an inside of the second window; or
  the secondary screen splitting operation is an operation of at least two fingers sliding to the inside of the second window at the same time; or
  the secondary screen splitting operation is an operation of sliding upward from a specified area at a bottom of the second window or sliding downward from a specified area at a top of the third window.

2. The method according to claim 1, wherein in a process of displaying the second window on the first side of the first window, display statuses of the first window and the second window change as follows:
  in a process of the screen splitting operation, display positions of the first window and the second window are moved in a sliding direction of the screen splitting operation, a display size of the first window decreases, and a display size of the second window increases; or
  in a process of the screen splitting operation, a format of display content in the first window changes with the screen splitting operation, in a manner that the format of the display content in the first window adapts to a display size of the first window; or
  in a process of the screen splitting operation, a display position and a display size of the first window remain unchanged; and
  wherein after the screen splitting operation ends, the second window is directly displayed on the first side of the first window.

3. The method according to claim 1, wherein the second window is the full-screen window, and display content in the second window is one of the following: content that is browsed by the user most recently, a desktop of an operating system, an application that is most frequently browsed by the user in a recent period of time, a set of icons of applications that are usable for split-screen display, or the display content in the first window; or
  the second window is the operable window comprising at least one sub-window, and the display content in the sub-window comprised in the second window is at least one of the following: content that is browsed by the user most recently, a desktop of an operating system, an application that is most frequently browsed by the user in a recent period of time, a set of icons of applications that are usable for split-screen display, or the display content in the first window.

4. The method according to claim 3, wherein an application corresponding to an icon comprised on the desktop of the operating system cannot be displayed in the split-screen manner, and the icon corresponding to the application that cannot be displayed in the split-screen manner is displayed in gray.

5. The method according to claim 1, wherein an arrangement manner of the sub-windows is a single-row arrangement manner, a single-column arrangement manner, or a multi-row and multi-column arrangement manner.

6. The method according to claim 1, wherein responding to the screen splitting operation comprises:
  detecting whether a window split-screen mode corresponding to the screen splitting operation matches a format of display content in the first window, wherein the window split-screen mode is an arrangement manner in which the first window and the second window are displayed in the split-screen manner; and
  when the window split-screen mode corresponding to the screen splitting operation does not match the format of the display content in the first window, prompting the user to change the screen splitting operation, to change the corresponding window split-screen mode.

7. The method according to claim 1, wherein before detecting the screen splitting operation of the user on the first window, the method further comprises:
  detecting a trigger operation of the user on the first window, wherein the trigger operation is a continuous sliding operation, a sliding distance of the trigger operation is greater than or equal to a fourth distance threshold, or a sliding duration of the trigger operation is greater than or equal to a fourth duration threshold, the fourth distance threshold is less than the first distance threshold, and the fourth duration threshold is less than the first duration threshold; and
  in response to the trigger operation, enabling a split-screen display function of an electronic device.

8. An electronic device, comprising:
  a display, at least one processor, and at least one memory, wherein the display, the at least one processor, and the at least one memory are coupled, and the at least one processor invokes program instructions in the at least one memory based on an operation signal, to enable the electronic device to perform operations comprising:
  displaying a first window in full screen;
  detecting a screen splitting operation of a user on the first window, wherein the screen splitting operation is a continuous sliding operation, and a sliding distance of the screen splitting operation is greater than or equal to a first distance threshold, or a sliding duration of the screen splitting operation is greater than or equal to a first duration threshold;
  responding to the screen splitting operation, and displaying a second window on a first side of the first window, wherein the second window is a full-screen window or an operable window comprising at least one sub-window;

displaying the first window and the second window in a split-screen manner; and when the second window is the full-screen window, detecting a secondary screen splitting operation of the user on the second window, and replacing the second window with a third window in response to the secondary screen splitting operation, wherein the third window is a full-screen window or an operable window comprising at least one sub-window; and wherein:
- the secondary screen splitting operation is a continuous sliding operation, and a sliding distance of the secondary screen splitting operation is greater than or equal to a second distance threshold, or a sliding duration of the secondary screen splitting operation is greater than or equal to a second duration threshold; or
- the secondary screen splitting operation is a continuous sliding operation, the secondary screen splitting operation and the screen splitting operation are a continuous sliding operation, and a sum of sliding distances of the screen splitting operation and the secondary screen splitting operation is greater than or equal to a third distance threshold, or a sum of sliding duration of the screen splitting operation and the secondary screen splitting operation is greater than or equal to a third duration threshold; or
- the secondary screen splitting operation is an operation of sliding from any corner of the second window to the an inside of the second window; or
- the secondary screen splitting operation is an operation of at least two fingers sliding to the inside of the second window at the same time; or
- the secondary screen splitting operation is an operation of sliding upward from a specified area at a bottom of the second window or sliding downward from a specified area at a top of the third window.

9. The electronic device according to claim 8, wherein:
in a process of the screen splitting operation, display positions of the first window and the second window are moved in a sliding direction of the screen splitting operation, a display size of the first window decreases, and a display size of the second window increases; or in a process of the screen splitting operation, a format of display content in the first window changes with the screen splitting operation, in a manner that the format of the display content in the first window adapts to a display size of the first window; or in a process of the screen splitting operation, a display position and a display size of the first window remain unchanged, and after the screen splitting operation ends, the second window is directly displayed on the first side of the first window.

10. The electronic device according to claim 8, wherein the second window is the full-screen window, and display content in the second window is one of the following: content that is browsed by the user most recently, a desktop of an operating system, an application that is most frequently browsed by the user in a recent period of time, a set of icons of applications that can be used for split-screen display, or the display content in the first window; or the second window is the operable window comprising at least one sub-window, and display content in the sub-window comprised in the second window is at least one of the following: content that is browsed by the user most recently, a desktop of an operating system, an application that is most frequently browsed by the user in a recent period of time, a set of icons of applications that can be used for split-screen display, or the display content in the first window.

11. The electronic device according to claim 10, wherein an application corresponding to an icon comprised on the desktop of the operating system cannot be displayed in the split-screen manner, and the icon corresponding to the application that cannot be displayed in the split-screen manner is displayed in gray.

12. The electronic device according to claim 8, wherein an arrangement manner of the sub-windows is a single-row arrangement manner, a single-column arrangement manner, or a multi-row and multi-column arrangement manner.

13. The electronic device according to claim 8, the operations further comprising:
detecting whether a window split-screen mode corresponding to the screen splitting operation matches a format of display content in the first window, wherein the window split-screen mode is an arrangement manner in which the first window and the second window are displayed in the split-screen manner; and when the window split-screen mode corresponding to the screen splitting operation does not match the format of the display content in the first window, prompting the user to change the screen splitting operation, to change the corresponding window split-screen mode.

14. The electronic device according to claim 8, the operations further comprising:
detecting a trigger operation of the user on the first window, wherein the trigger operation is a continuous sliding operation, a sliding distance of the trigger operation is greater than or equal to a fourth distance threshold, or a sliding duration of the trigger operation is greater than or equal to a fourth duration threshold, the fourth distance threshold is less than the first distance threshold, and the fourth duration threshold is less than the first duration threshold; and in response to the trigger operation, enabling a split-screen display function of the electronic device.

* * * * *